(12) United States Patent
Foiles et al.

(10) Patent No.: US 11,810,216 B1
(45) Date of Patent: Nov. 7, 2023

(54) AIR QUALITY MONITORS MINIMIZATION SYSTEM AND METHODS

(71) Applicant: Project Canary, PBC, Denver, CO (US)

(72) Inventors: William J. Foiles, Denver, CO (US); Nathan C. Eichenlaub, Denver, CO (US); Kieran J. Lynn, Denver, CO (US); Ray K. Mistry, Denver, CO (US)

(73) Assignee: PROJECT CANARY, PBC, Denver, CO (US)

( * ) Notice: Subject to any disclaimer, the term of this patent is extended or adjusted under 35 U.S.C. 154(b) by 0 days.

(21) Appl. No.: 18/205,465

(22) Filed: Jun. 2, 2023

Related U.S. Application Data

(63) Continuation of application No. 18/104,746, filed on Feb. 1, 2023, now Pat. No. 11,727,519.

(51) Int. Cl.
 *G06Q 50/26* (2012.01)
 *G01W 1/10* (2006.01)

(52) U.S. Cl.
 CPC .............. *G06Q 50/26* (2013.01); *G01W 1/10* (2013.01)

(58) Field of Classification Search
 CPC ................................ G06Q 50/26; G01W 1/10
 USPC ....................................................... 73/170.16
 See application file for complete search history.

(56) References Cited

U.S. PATENT DOCUMENTS

| | | | |
|---|---|---|---|
| 3,206,982 A | 9/1965 | Blondfield | |
| 3,662,171 A | 5/1972 | Brengman et al. | |
| 3,780,566 A | 12/1973 | Smith et al. | |
| 3,817,108 A | 6/1974 | Principe et al. | |
| 4,135,092 A | 1/1979 | Milly | |
| 4,551,719 A | 11/1985 | Carlin et al. | |
| 5,132,968 A | 7/1992 | Cephus | |
| 5,281,816 A | 1/1994 | Jacobson et al. | |
| 5,406,265 A | 4/1995 | Trozzo et al. | |
| 5,479,359 A | 12/1995 | Rogero et al. | |
| 5,568,121 A | 10/1996 | Lamensdorf | |

(Continued)

FOREIGN PATENT DOCUMENTS

| | | |
|---|---|---|
| CH | 703014 A2 | 10/2011 |
| CN | 107782374 A | 3/2018 |

(Continued)

OTHER PUBLICATIONS

"Operational risk management in the energy industry," 2014, Management Solutions, 10 pages (Year: 2014).

(Continued)

*Primary Examiner* — Nathaniel T Woodward
(74) *Attorney, Agent, or Firm* — Stephen B. Katsaros; Patent Engineering, LLC

(57) ABSTRACT

In one illustrative configuration, a system and method of air quality monitor minimization/optimization is disclosed. The method may include providing at least a first air quality monitor on a site. The first air quality monitor may be configured to generate a first set of attached parameters. The method may further include providing a SCADA system, on the site, configured to generate a set of SCADA data. The SCADA data, the first set of attached parameters may be processed to determine a redundant/sub-optimized air quality monitor, which may be removed. In other illustrative configurations, the system and method may be utilized to locate and/or quantify emissions.

20 Claims, 32 Drawing Sheets

(56) References Cited

U.S. PATENT DOCUMENTS

| | | | |
|---|---|---|---|
| 5,604,298 A | 2/1997 | Dosoretz et al. |
| 6,061,141 A | 5/2000 | Goldenberg et al. |
| 6,114,964 A | 9/2000 | Fasano |
| 6,167,766 B1 | 1/2001 | Dunn et al. |
| 6,169,488 B1 | 1/2001 | Ketler |
| 6,252,510 B1 | 6/2001 | Dungan |
| 6,259,956 B1 | 7/2001 | Myers et al. |
| 6,317,029 B1 | 11/2001 | Fleeter |
| 6,415,646 B1 | 7/2002 | Kessel et al. |
| 6,490,530 B1 | 12/2002 | Wyatt |
| 6,794,991 B2 | 9/2004 | Dungan |
| 6,865,926 B2 | 3/2005 | O'Brien et al. |
| 7,075,653 B1 | 7/2006 | Rutherford |
| 7,080,544 B2 | 7/2006 | Stepanik et al. |
| 7,805,271 B2 | 9/2010 | Nojima et al. |
| 7,949,615 B2 | 5/2011 | Ehlers et al. |
| 8,197,752 B2 | 6/2012 | Nojima et al. |
| 8,485,019 B2 | 7/2013 | Groves |
| 8,510,059 B2 | 8/2013 | Prince |
| 8,712,335 B2 | 4/2014 | Mathur et al. |
| 8,714,035 B2 | 5/2014 | Mihaylav et al. |
| 8,949,037 B2 | 2/2015 | Prince et al. |
| 9,018,963 B2 | 4/2015 | Sim et al. |
| 9,075,016 B2 | 7/2015 | Groves |
| 9,188,503 B2 | 11/2015 | Kloepper et al. |
| 9,210,541 B2 | 12/2015 | Root et al. |
| 9,430,644 B2 | 8/2016 | Gonzalez et al. |
| 9,754,472 B2 | 9/2017 | Johnson et al. |
| 9,878,656 B2 | 1/2018 | Gergets et al. |
| 9,978,251 B2 | 5/2018 | Gonia et al. |
| 10,021,466 B2 | 7/2018 | Guglielmo et al. |
| 10,031,040 B1 | 7/2018 | Smith et al. |
| 10,089,849 B2 | 10/2018 | Liu et al. |
| 10,119,890 B2 | 11/2018 | Massengale et al. |
| 10,190,976 B2 | 1/2019 | Waxman et al. |
| 10,210,738 B2 | 2/2019 | Johnson, Jr. et al. |
| D842,134 S | 3/2019 | Doi et al. |
| 10,371,682 B2 | 8/2019 | Berndt et al. |
| 10,634,558 B1 | 4/2020 | Scott et al. |
| 10,671,772 B2 | 6/2020 | Luquist et al. |
| 10,697,947 B1 | 6/2020 | Armitage |
| 10,814,028 B2 | 10/2020 | Becker et al. |
| 10,876,890 B2 | 12/2020 | Scott et al. |
| 11,132,752 B2 | 9/2021 | Finkel et al. |
| 11,193,822 B2 | 12/2021 | Scott et al. |
| 11,215,593 B2 | 1/2022 | Armitage |
| 11,366,057 B2 | 6/2022 | Scott et al. |
| 11,408,870 B2 | 8/2022 | Armitage |
| 11,573,157 B2 | 2/2023 | Cyrus |
| 2001/0040509 A1 | 11/2001 | Dungan |
| 2002/0070321 A1 | 6/2002 | Womack |
| 2002/0153134 A1 | 10/2002 | Newman |
| 2004/0056771 A1 | 3/2004 | Dungan |
| 2006/0155486 A1 | 7/2006 | Walsh et al. |
| 2007/0289635 A1 | 12/2007 | Ghazarian et al. |
| 2008/0048853 A1 | 2/2008 | Leach et al. |
| 2008/0231857 A1 | 9/2008 | Depeursinge et al. |
| 2008/0281528 A1 | 11/2008 | Relle, Jr. |
| 2009/0089075 A1 | 4/2009 | Noujima et al. |
| 2009/0319058 A1 | 12/2009 | Rovaglio et al. |
| 2010/0094565 A1 | 4/2010 | Prince et al. |
| 2010/0268480 A1 | 10/2010 | Prince |
| 2010/0295673 A1 | 11/2010 | Ahmad |
| 2011/0219891 A1 | 9/2011 | Mihaylov et al. |
| 2012/0012066 A1 | 1/2012 | Beery et al. |
| 2012/0109583 A1 | 5/2012 | Bartlett et al. |
| 2012/0212347 A1 | 8/2012 | Boone |
| 2012/0227983 A1 | 9/2012 | Lymberopoulos et al. |
| 2012/0270205 A1 | 10/2012 | Patel et al. |
| 2014/0058775 A1 | 2/2014 | Siig et al. |
| 2014/0196788 A1 | 7/2014 | Taft |
| 2014/0368354 A1 | 12/2014 | Skourlis |
| 2015/0048232 A1 | 2/2015 | Hallauer et al. |
| 2015/0185194 A1 | 7/2015 | Prince et al. |
| 2015/0369013 A1 | 12/2015 | Weatherhead et al. |
| 2016/0232612 A1 | 8/2016 | Spalenka et al. |
| 2017/0130480 A1 | 5/2017 | Perkins |
| 2017/0154509 A1 | 6/2017 | Prabhakar et al. |
| 2017/0277829 A1 | 9/2017 | Weggler et al. |
| 2017/0336281 A1 | 11/2017 | Waxman et al. |
| 2018/0266933 A1 | 9/2018 | Tamraz et al. |
| 2018/0284735 A1 | 10/2018 | Cella et al. |
| 2019/0110444 A1 | 4/2019 | Boehm |
| 2019/0166413 A1 | 5/2019 | Klinger et al. |
| 2019/0206068 A1 | 7/2019 | Stark et al. |
| 2019/0324435 A1* | 10/2019 | Cella ................... G05B 13/028 |
| 2019/0360311 A1 | 11/2019 | Cardenas et al. |
| 2020/0005236 A1 | 1/2020 | Borgerson et al. |
| 2020/0333307 A1 | 10/2020 | Armitage |
| 2020/0355580 A1 | 11/2020 | Asher |
| 2021/0072080 A1 | 3/2021 | Scott et al. |
| 2021/0123768 A1 | 4/2021 | Rezvani et al. |
| 2021/0397312 A1 | 12/2021 | Haupt et al. |
| 2022/0034762 A1 | 2/2022 | Cyrus et al. |
| 2022/0091026 A1 | 3/2022 | Scott et al. |
| 2022/0164877 A1 | 5/2022 | Kamkar et al. |
| 2022/0277261 A1 | 9/2022 | Stollman et al. |

FOREIGN PATENT DOCUMENTS

| | | |
|---|---|---|
| CN | 207351764 U | 5/2018 |
| CN | 109521162 A | 3/2019 |
| CN | 110726431 A | 1/2020 |
| CN | 209979311 U | 1/2020 |
| CN | 112084231 A | 12/2020 |
| CN | 212159251 U | 12/2020 |
| CN | 113283630 A | 8/2021 |
| CN | 214667980 U | 11/2021 |
| CN | 214749208 U | 11/2021 |
| CN | 113919448 A | 1/2022 |
| CN | 111859800 B | 10/2022 |
| DE | 10226305 C1 | 10/2003 |
| DE | 102006034731 A1 | 1/2008 |
| EP | 1882917 A1 | 1/2008 |
| EP | 2687844 A2 | 1/2014 |
| EP | 3001115 A2 | 3/2016 |
| OA | 2001042052 A | 2/2001 |
| WO | 2011013803 A1 | 2/2011 |
| WO | 17633 A | 5/2017 |
| WO | 2022023226 A1 | 2/2022 |
| WO | 2022056152 A1 | 3/2022 |

OTHER PUBLICATIONS

Aber, James S. et al. Small-format aerial photography: Principles, techniques and geoscience applications Elsevier, 2010.

Center for Chemical Process Safety, "Guidelines for Chemical Process Quantitative Risk Analysis, Second Edition," "Chapter 1, Chemical Process Quantitative Risk Analysis," 2010, American Institute of Chemical Engineers, pp. 1-55 (Year: 2010).

Center for Chemical Process Safety, "Guidelines for Chemical Process Quantitative Risk Analysis, Second Edition," "Chapter 3, Event Probability and Failure Frequency Analysis," 2010, American Institute of Chemical Engineers, pp. 297-393 (Year: 2010).

Collier-Oxandale, et al., "Understanding the ability of low-cost MOx sensors to quantify ambient VOCs", Atmospheric Measurement Techniques, Mar. 5, 2019, pp. 1441-1460, vol. 12, Copernicus Publications on behalf of the European Geosciences Union, 20 pages.

Control Effectiveness, May 2014, Broadleaf Capital International Pty Ltd, 7 pages (Year: 2014).

Ebermann et al., "Design, Operation and Performance of a Fabry-Perot-Based MWIR Microspectrometer," access date: Nov. 9, 2018, pp. 1-6.

F. I. Khan et al., "Safety weighted hazard index (swehi) a new, user-friendly tool for swift yet comprehensive hazard dentification and safety evaluation in chemical process industries," 2001, Transactions of the Institution of Chemical Engineers, vol. 79 Part B, 16 pages (Year: 2001).

Faisal I. Khan et al., "Multivariate hazard identification and ranking system," 1998, Process Safety Progress, vol. 17, No. 3, 14 pages (Year: 1998).

(56) References Cited

OTHER PUBLICATIONS

FAQ, Meet Clair Site, access date: Nov. 9, 2018, pp. 1-8.
International Search Report and Written Opinion from the US International Search Authority for International Application No. PCT/US2020/012247 dated Mar. 10, 2020, 13 pages.
ISA/US, International Search Report and Written Opinion for PCT/US21/49702, received Feb. 7, 2022, 36 pages.
Jim Joy et al., "National minerals industry safety and health risk assessment guideline" 2007, http://www.nost.edu.au/icms_docs/286339_National_M inerals_Industry _Safety_and_Health_Risk_Assessment_Guideline _-_ J im_Joy.pdf, 164 pages (Year: 2007).
JJS Technical Services, "BW Technologies Rig Rat III Gas Detector (Non-Wireless Version)", , retrieved from the Internet Jul. 19, 2019, 3 pages.
Maureen Hassall, "What is a control?," Aug. 31, 2015, 2015 NSW Mining-Health, Safety, Environment and Community Conference, 33 pages (Year: 2015).
Mohammad Javad Jafari et al., "The credit of fire and explosion index for risk assessment of iso-max unit in an oil refinery," 2012, International Journal of Occupational Hygiene, vol. 4, No. 1, pp. 10-16 (Year: 2012).
RESTEK Pure Chromatography "TO-Can Canister With Rave Valve cat.# 27416, 27417, 27418, 27419, 27420, 27421, 27422, 27423" Catalog #500-10-002 Date Oct. 2020.
S.M. Miri Lavasani et al., "Fuzzy risk assessment of oil and gas offshore wells," 2011, Process Safety and Environmental Protection , vol. 89, pp. 277-294 (Year: 2011).
Sam Mannan, "Lee's loss prevention in the process industries," 2012, Butterworth-Heinemann, 8 pages (Year: 2012).
Scott et al., "An Air Quality Sensor Network for Greater Baltimore," access date: Nov. 9, 2018, pp. 1-8.
Scott, Meet Clair Site, What causes trouble breathing indoors?blog, access date: Nov. 9, 2018, pp. 1-8.
U.S. Environmental Protection Agency, "Determination of Volatile Organic Compounds (VOCs) in Air Collected in Specially Prepared Canisters and Analyzed by Gas Chromatography-Mass Spectrometry (GC-MS)" Sep. 2019.
United States Environmental Protection Agency, "SPod Fenceline Sensors Under Development", , retrieved from the Internet Jul. 19, 2019, 1 page.
United States Environmental Protection Agency, "Tracking Emissions Using New Fenceline Monitoring Technology", published Jun. 18, 2018, , retrieved from the Internet Jul. 19, 2019, 3 pages.
Werden, Benjamin Seth "Chemical Source Apportionment of Ambient Particulate matter in the Kathmandu Valley, Nepal" Drexel University, 2021.
Wisconsin Department of Natural Resources, "Evaluation of Passive Sampling Techniques for Monitoring Roadway and Neighborhood Exposures to Benzene and Other Mobile Source VOCs" WDNR Publication AM-384 2007.
Zimmerman et al., Atmospheric Measurement Techniques, "A machine learning calibration model using random forests to improve sensor performance for lower-cost air quality monitoring," Jul. 25, 2017, pp. 291-313.

\* cited by examiner

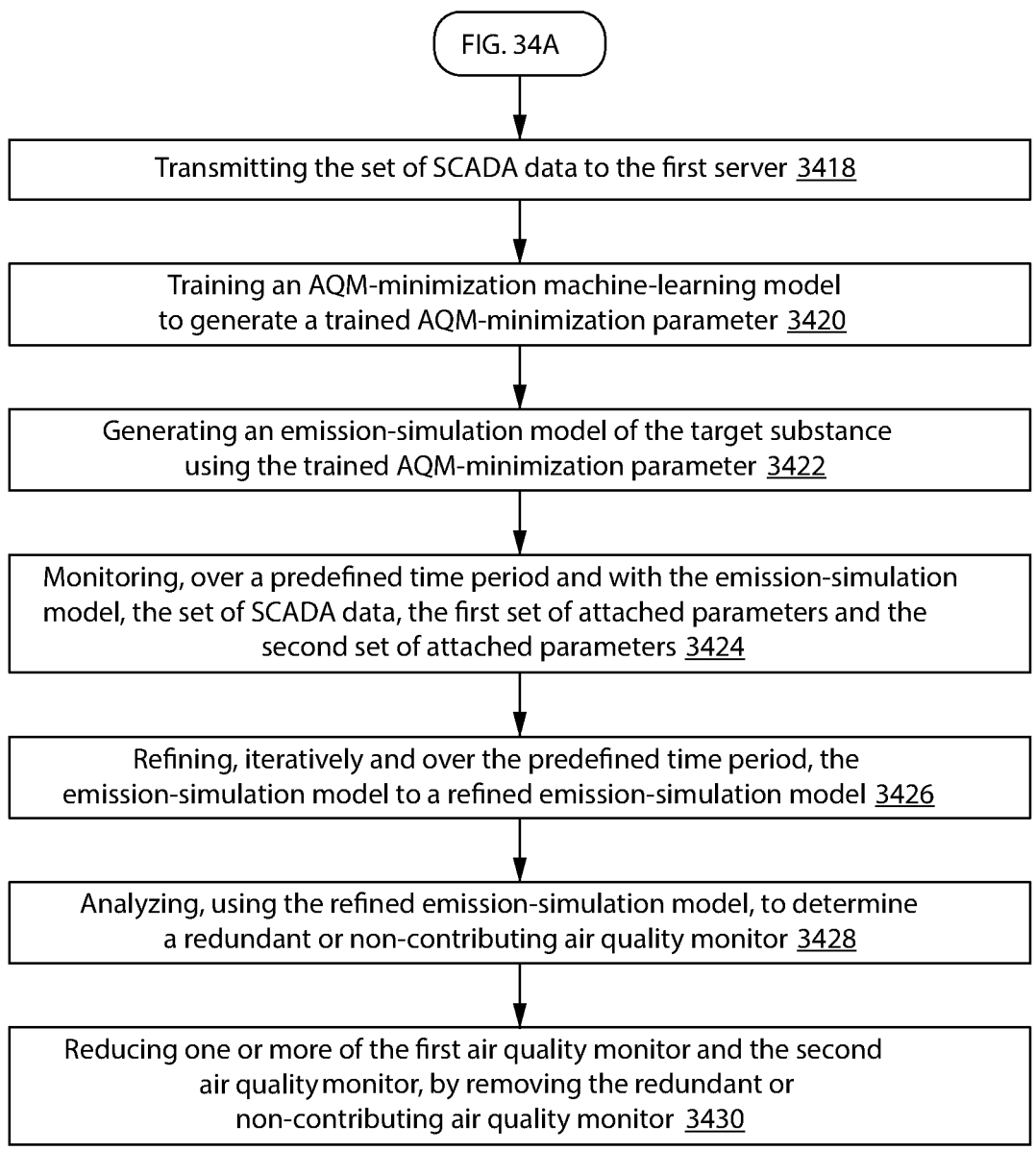

AIR QUALITY MONITORS MINIMIZATION SYSTEM AND METHODS

CROSS REFERENCE TO RELATED APPLICATIONS

This application is a continuation of an allowed U.S. patent application Ser. No. 18/104,746, filed on Feb. 1, 2023, entitled "AIR QUALITY MONITORS MINIMIZATION SYSTEM AND METHODS", which is related to pending U.S. patent application Ser. No. 17/813,585, filed on Jul. 19, 2022, entitled "EMISSIONS DETECTION SYSTEM AND METHODS," a second co-pending U.S. patent application Ser. No. 17/813,602, filed on Jul. 19, 2022, entitled "EMISSIONS DETECTION SYSTEM AND METHODS," and both of these applications claim the benefit of a third U.S. Provisional Patent Application Ser. No. 63/323,703, filed on Mar. 25, 2022, entitled "EMISSIONS DETECTION SYSTEM AND METHODS." All of the above applications are hereby expressly incorporated by reference in their entirety for all purposes.

A portion of the disclosure of this patent document contains material which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

TECHNICAL FIELD

This disclosure pertains generally, but not by way of limitation, to systems and methods for monitoring and controlling of oil-producing facilities that often emit gases.

BACKGROUND

Air quality is important for the health of a population. Countries worldwide spend significant resources on monitoring air quality and controlling air pollution. One of the major problems is that instruments that can accurately monitor air quality are expensive and typically require expertise to operate properly. Currently, air quality monitoring is mainly performed by government agencies and dedicated organizations using specialized instrumentation. As a result, general air quality data often does not provide the fidelity necessary to pinpoint issues at a scale smaller than a regional level. Real-time air quality monitoring at a finer scale may be cost-prohibitive because air quality monitoring instruments can be expensive.

SUMMARY

At least one method of minimizing air quality monitors, locating, and quantifying emissions from a site are disclosed. The above methods are based on obtaining certain parameters using at least one air quality monitors provided at the site. These at least one air quality monitors may include various sensors (as discussed in detail in the subsequent sections of the disclosure) that are able to obtain various atmospheric parameters like wind speed, wind direction, temperature, pressure, and humidity at the site. These at least one air quality monitors further obtain concentrations of a target substance, for example, methane gas, from at least one potential emission sources that may leak the target substance.

In addition to the certain parameters from the air quality monitors, the at least one methods are also based on obtaining of various physical factors and operational factors from at least one device from the site, using a supervisory control and data acquisition system (hereinafter referred to as SCADA system). The physical operational factors signify the physical conditions of the at least one device, by way of an example, any device subjected to explosion, or physical damages that results in a fire outbreak. The operational parameters of the at least one device in the oil facilities signify data on operation of the at least one device. By way of an example, the operational factors for at least one device such as a compressor indicates the maximum pressure or the minimum pressures (in bars) observed during operation of the compressor.

The at least one methods are further based on obtaining a data from the SCADA system. The SCADA data includes data from the air quality monitors, such as, for example, an emissions data from a leak detected from the site. The SCADA data, the certain parameters from the air quality monitors, and the physical factors and operational factors from the at least one device in the site are used to train at least one machine learning model.

The machine learning models include an air quality minimization model, an emissions models and an emissions-quantification model. The aforementioned models are configured to generate respective trained model parameters. By way of an example, the air quality minimization model is configured to generate a trained air quality minimization parameters. These parameters are used to generate simulation models such as an emission-simulation model and an emissions-quantification simulation model. These models are refined frequently in a pre-defined time period, and are analysed for reducing air quality monitors, locating the emission sources, and quantifying the emissions from the site.

The above methods therefore provide for an accurate and computationally easier method of minimizing air quality monitors, locating the emission source and quantifying the emissions of the target substance at the site.

In one configuration, an air quality monitor minimization method for reducing at least one air quality monitors from a site is disclosed. The air quality minimization method may include providing a first air quality monitor. The first air quality monitor may include a first sensor responsive to a target substance, and located at a first location on a site. The air quality minimization method may further include sensing a first set of attached parameters at the first location. The air quality minimization method may further include transmitting the first set of attached parameters to a first server. The air quality minimization method may further include providing a second air quality monitor. The second air quality monitor may include a second sensor responsive to the target substance, and located at a second location on a site. The air quality minimization method may further include sensing a second set of attached parameters at the second location. The air quality minimization method may further include transmitting the second set of attached parameters to the first server. The air quality minimization method may include providing a SCADA system at the site. The SCADA system may be configured to supervise a physical factor and an operational factor of at least a first device and at least a second device at the site. Further, the air quality minimization method may include acquiring a set of SCADA data from the first device and the second device. Further, the air quality minimization method may include transmitting the set of SCADA data to the first server. The air quality minimization method may include training an air quality monitor minimization machine learning model (hereinafter referred to as AQM-minimization machine-learning model), the first set of attached parameters sensed by the first air quality monitors, the second set of attached parameters sensed by the second air quality monitor, and the set of SCADA data. The AQM-minimization machine-learning model may be configured to generate an emission simulation model using the trained AQM-minimization parameter. Further, the air quality minimization method may include monitoring the set of SCADA data with the emission-simulation model over a predefined time period. Further, the air quality minimization method may include refining the emission simulation model based on the monitoring of the SCADA data to a refined emission-simulation model. The air quality minimization method may further include analyzing the refined emission-simulation model, to determine a redundant or non-contributing air quality monitor from the first air quality monitor and the second air quality monitor. The air quality minimization method may further include reducing the at least one of the first air quality monitor and the second air quality monitor, by removing the redundant or non-contributing air quality monitor.

In another illustrative configuration, the air quality minimization method may include obtaining an output from the refined emission-simulation model. The air quality minimization method may further include analyzing the output of the refined emission-simulation model with the set of SCADA data, the first set of attached parameters, and the second set of attached parameters. The analysis may include comparing, over a predefined time period, the output of the refined emission-simulation model. The air quality minimization method may further include determining redundancy or non-contribution of the first air quality monitor and the second air quality monitor, based on analyzing the output of the refined emission-simulation model.

In another illustrative configuration, the air quality minimization method may include sensing of the first set of attached parameters by the first air quality monitor. The method of sensing the first set of attached parameters may include sensing a substance concentration of the target substance at the first location using the first air quality monitor. The method of sensing the first set of attached parameters may further include sensing a set of atmospheric readings using the first air quality monitors. The method may include training the AQM-minimization machine-learning model with the concentration of the target substance and the set of atmospheric readings at a first location.

In another illustrative configuration, the air quality minimization method may include sensing of the second set of attached parameters by the second air quality monitor. The method of sensing the second set of attached parameters may include sensing a substance concentration of the target substance at the second location using the second air quality monitor. The method of sensing the second set of attached parameters may further include sensing a set of atmospheric readings using the second air quality monitors. The method may include training the AQM-minimization machine-learning model with the concentration of the target substance and the set of atmospheric reading at the second location.

In another illustrative configuration, the air quality minimization method may include sensing the set of atmospheric readings for the first location and the second location using the first air quality monitor and the second air quality monitor. The set of atmospheric readings may include a barometric pressure, an air temperature, and a humidity level related to the first location and the second location.

In another illustrative configuration, the air quality minimization method may include obtaining a location map of a plurality of emission sources at the site. Each of the emission source may include a location of the emission source, and the range of the emission. The training of AQM-minimization machine-learning model may be bound by the source location and the emissions range of each emission source.

In another illustrative configuration, the air quality minimization method may further include procuring a weather prediction model on a second server. The weather prediction model may include a height of a pressure boundary layer (hereinafter referred to as hPRBL). Further, the height of the pressure boundary layer acquired from the second server may be utilized for training the AQM-minimization machine-learning model. The second server may be a High Resolution Rapid Refresh (HRRR) maintained by National Oceanic and Atmospheric Administration (NOAA).

In another illustrative configuration, the air quality minimization method may include increasing a power of transmission for transmitting the at least one of the first set of attached parameters and the second set of attached parameters to the first server.

In one illustrative configuration, an air quality monitor minimization system for reducing at least one air quality monitors from a site is disclosed. The air quality minimization system may include a first air quality monitor. The first air quality monitor may include a first sensor responsive to a target substance. The first air quality monitor may be located at a first location in the site. The first air quality monitor may be configured to sense a first set of attached parameters at the first location, and transmit the first set of attached parameters to a first server. The air quality monitor minimization system may further include a second air quality monitor. The second air quality monitor may include a second sensor responsive to the target substance. The second air quality monitor may be located at a second location in the site. The second air quality monitor may be configured to sense a second set of attached parameters at the second location, and transmit the second set of attached parameters to the first server. The air quality monitor minimization system may include a SCADA system installed at the site. The SCADA system is configured to supervise a physical factor and an operational factor of at least a first device and at least a second device at the site. The SCADA system is also configured to acquire the physical factor and the operational factor from the first device and the second device at the site. The SCADA system may be configured to generate a set of SCADA data from the first device and the second device. Further, the air quality monitor minimization system may include a processing unit connected to the first server. The processing unit may be connected to a memory. The memory may include a set of machine-learning instructions. The processing unit may be configured to execute the set of machine-learning instructions to train an AQM-minimization machine-learning model, with the first server, the first set of attached parameters, and the second set of attached parameters. The AQM-minimization machine-learning model may generate a trained AQM-minimization parameter. The processing unit may be configured to generate an emission-simulation model of a plume of the target substance using the trained AQM-minimization parameter. Post generation, the processing unit may be configured to monitor the set of SCADA data using the SCADA system and the emission-simulation model over a predefined time period. As a response to monitoring, the processing unit may be further configured to refine the emission-simulation model to a refined emission-simulation model. The processing unit may be further configured to analyze the refined emission-simulation model to determine a redundant or non-contributing air quality monitor from the first air quality monitor and the second air quality monitor. Based on the analysis, at least one of the first air quality monitor and the second air quality monitor may be reduced by removing the redundant or non-contributing air quality monitor.

In one illustrative configuration, an emission location method for identifying an emission source of a target substance at the site is disclosed. The emission location method may include providing a first air quality monitor. The first air quality monitor may include a first sensor responsive to a target substance, and located at a first location on a site. The emission location method may further include sensing a first set of attached parameters at the first location. The emission location method may further include transmitting the first set of attached parameters to a first server. The emission location method may include providing a SCADA system at the site. The SCADA system may be configured to supervise a physical factor and an operational factor of at least a first device and at least a second device at the site. Further, the emission location method may include acquiring a set of SCADA data from the first device. Further, the emission location method may include transmitting the set of SCADA data to the first server. The emission location method may include training an emission location machine learning model with the first server, the first set of attached parameters sensed by the first air quality monitors, and the set of SCADA data. The emission location machine learning model may generate a first trained emissions-model parameter using the trained emission location machine-learning model. The emission-location machine learning model may generate an emissions-simulation model of a plume of the target substance using the first trained emissions-model parameter. The emission-location method may further include monitoring the set of SCADA data and the first trained emissions-model parameter using the emissions-simulation model over a predefined time period. The emission-location method may further include refining, iteratively, the emissions-simulation model based on the monitoring to a refined emissions-simulation model over the predefined time period. The emission-location method may further include locating the emission source of the target substance at the site with the refined emissions-simulation model, the set of SCADA data, and the first trained emissions-model parameter.

In another illustrative configuration, the emission location method may further include providing a second air quality monitor. The second air quality monitor may include a second sensor responsive to the target substance, and located at a second location on a site. emission location method may further include sensing a second set of attached parameters at the second location. The emission location method may further include transmitting the second set of attached parameters to the first server. The emission-location method may include providing a SCADA system at the site. The SCADA system is configured to supervise a physical factor and an operational factor of at least the first device and at least a second device at the site. Further, the SCADA system is configured to acquire the physical factor and the operational factor from the first device and the second device at the site. Further, the emission-location method may include acquiring the set of SCADA data from the first device and the second device. Further, the emission-location method may include transmitting the set of SCADA data to the first server. Further, the emission-location method may include training an emissions-location machine learning model with the first server, the first set of attached parameters sensed by the first air quality monitor, the second set of attached parameters sensed by the second air quality monitor, and the set of SCADA data. The emissions-location machine learning model may generate a trained emissions-model parameter. The emissions-location method may include monitoring the set of SCADA data, the first set of attached parameters, and the second set of attached parameters with the emissions-simulation model over a predefined time period. Further, emission-location method may include iteratively refining the emission simulation model based on the monitoring, to a refined emissions-simulation model. The emission-location method may further include locating the emission source of the target substance at the site with the refined emissions-simulation model, the set of SCADA data, and the first trained emissions-model parameter.

In another illustrative configuration, the emission-location method may further include analyzing the refined emissions-simulation model, to determine a redundant or non-contributing air quality monitor from the first air quality monitor and the second air quality monitor. The air quality minimization method may further include reducing the at least one of the first air quality monitor and the second air quality monitor, by removing the redundant or non-contributing air quality monitor.

In another illustrative configuration, an emission location system for identifying an emission source of a target substance at a site is disclosed. The emission location system may include a first air quality monitor. The first air quality monitor may include a first sensor responsive to the target substance and installed at a first location at which the first air quality monitor is located on the site. The first air quality monitor is configured to sense a first set of attached parameters at the first location, and transmit the first set of attached parameters to a first server. The emission location system may further include a SCADA system installed at the site. The SCADA system may be configured to supervise a physical factor and an operational factor of at least a first device at the site, and acquire the physical factor and the operational factor from the first device at the site. The SCADA system may be further configured to generate a set of SCADA data from the first device, and transmit the set of SCADA data to the first server. The emission-location system may include a processing unit connected to the first server. The processing unit may be connected to a memory comprising a set of machine-learning based set of instructions. The machine-learning based set of instructions, when executed by the processor unit, enable the processing unit to train an emissions-location machine learning model with the first server, the first set of attached parameters sensed by the first air quality monitor, and the set of SCADA data. The emissions-location machine learning model may be configured to generate a trained emissions-model parameter. Further, the processing unit may be configured to generate an emissions-simulation model of a plume of the target substance using the trained emissions-model parameter. The processing unit may be configured to monitor, over a predefined time period and with the emissions-simulation model, the set of SCADA data, and the trained emissions-model parameter. The processing unit may be configured to refine, iteratively, based on the monitoring, and over the predefined time period, the emissions-simulation model to a refined emissions-simulation model. Further, the processing unit may be configured to locate the emission source of the target substance at the site with the refined emissions-simulation model, the set of SCADA data, and the trained emissions-model parameter.

In one illustrative configuration, an emission quantification method for quantifying an emission source of a target substance at the site is disclosed. The emission quantification method may include providing a first air quality monitor. The first air quality monitor may include a first sensor responsive to a target substance, and located at a first location on a site. The emission quantification method may further include sensing a first set of attached parameters at the first location. The emission quantification method may further include transmitting the first set of attached parameters to a first server. The emission quantification method may include providing a SCADA system at the site. The SCADA system may be configured to supervise a physical factor and an operational factor of at least a first device and at least a second device at the site. Further, the emission quantification method may include acquiring a set of SCADA data from the first device. Further, the emission quantification method may include transmitting the set of SCADA data to the first server. The emission quantification method may include training an emission-quantification machine-learning model with the first server, the first set of attached parameters sensed by the first air quality monitors, and the set of SCADA data. The emission-quantification machine learning model may generate a first trained emission-quantification-model parameter using the trained emission location machine-learning model. The emission quantification machine learning model may include generating an emission-quantification-simulation model of a plume of the target substance using the first trained emissions-model parameter. The emission quantification method may further include monitoring the set of SCADA data and the first trained emission-quantification-model parameter using the emission-quantification-simulation model over a predefined time period. The emission quantification method may further include refining, iteratively, the emission-quantification-simulation model based on the monitoring to a refined emission-quantification-simulation model over the predefined time period. The emission quantification method may further include quantifying emissions from the emission source of the target substance at the site with the refined emission-quantification-simulation model, the set of SCADA data, and the first trained emissions-model parameter.

In another illustrative configuration, the emission quantification method may further include providing a second air quality monitor. The second air quality monitor may include a second sensor responsive to the target substance, and located at a second location on a site. Emission quantification method may further include sensing a second set of attached parameters at the second location. The emission quantification method may further include transmitting the second set of attached parameters to the first server. The emission quantification method may include providing a SCADA system at the site. The SCADA system is configured to supervise a physical factor and an operational factor of at least the first device and at least a second device at the site. Further, the SCADA system is configured to acquire the physical factor and the operational factor from the first device and the second device at the site. Further, the emission quantification method may include acquiring the set of SCADA data from the first device and the second device. Further, the emission quantification method may include transmitting the set of SCADA data to the first server. Further, the emission quantification method may include training an emissions-location machine learning model with the first server, the first set of attached parameters sensed by the first air quality monitor, the second set of attached parameters sensed by the second air quality monitor, and the set of SCADA data. The emissions-location machine learning model may generate a trained emissions-model parameter. The emissions-location method may include monitoring the set of SCADA data, the first set of attached parameters, and the second set of attached parameters with the emission-quantification-simulation model over a predefined time period. Further, emission quantification method may include iteratively refining the emission simulation model based on the monitoring, to a refined emission-quantification-simulation model. The emission quantification method may further include quantifying emissions from the emission source of the target substance at the site with the refined emission-quantification-simulation model, the set of SCADA data and the trained emission-quantification-model parameter.

In another illustrative configuration, the emission quantification method may further include analyzing the refined emission-quantification-simulation model, to determine a redundant or non-contributing air quality monitor from the first air quality monitor and the second air quality monitor. The air quality minimization method may further include reducing the at least one of the first air quality monitor and the second air quality monitor, by removing the redundant or non-contributing air quality monitor.

In another illustrative configuration, an emission location system for identifying an emission source of a target substance at a site is disclosed. The emission location system may include a first air quality monitor. The first air quality monitor may include a first sensor responsive to the target substance and installed at a first location at which the first air quality monitor is located on the site. The first air quality monitor is configured to sense a first set of attached parameters at the first location, and transmit the first set of attached parameters to a first server. The emission location system may further include a SCADA system installed at the site. The SCADA system may be configured to supervise a physical factor and an operational factor of at least a first device at the site, and acquire the physical factor and the operational factor from the first device at the site. The SCADA system may be further configured to generate a set of SCADA data from the first device, and transmit the set of SCADA data to the first server. The emission-location system may include a processing unit connected to the first server. The processing unit may be connected to a memory comprising a set of machine-learning based set of instructions. The machine-learning based set of instructions, when executed by the processor unit, enable the processing unit to train an emissions-location machine learning model with the first server, the first set of attached parameters sensed by the first air quality monitor, and the set of SCADA data. The emissions-location machine learning model may be configured to generate a trained emissions-model parameter. Further, the processing unit may be configured to generate an emission-quantification-simulation model of a plume of the target substance using the trained emissions-model parameter. The processing unit may be configured to monitor, over a predefined time period and with the emission-quantification-simulation model, the set of SCADA data, and the trained emissions-model parameter. The processing unit may be configured to refine, iteratively, based on the monitoring, and over the predefined time period, the emission-quantification-simulation model to a refined emission-quantification-simulation model. Further, the processing unit may be configured to quantify the emissions from the emission source of the target substance at the site with the refined emission-quantification-simulation model, the set of SCADA data, and the trained emissions-model parameter.

Further areas of applicability of the present disclosure will become apparent from the detailed description provided hereinafter. It should be understood that the detailed description and specific examples, while indicating various configuration, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include:

FIGS. 34A-34B illustrates a flowchart of air quality monitor minimization method for reducing at least one air quality monitors from the site;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations and other implementations are possible without departing from the spirit and scope of the disclosed configurations. It is intended that the following detailed description be considered as exemplary only, with the true scope and spirit being indicated by the following claims.

Figure 1:
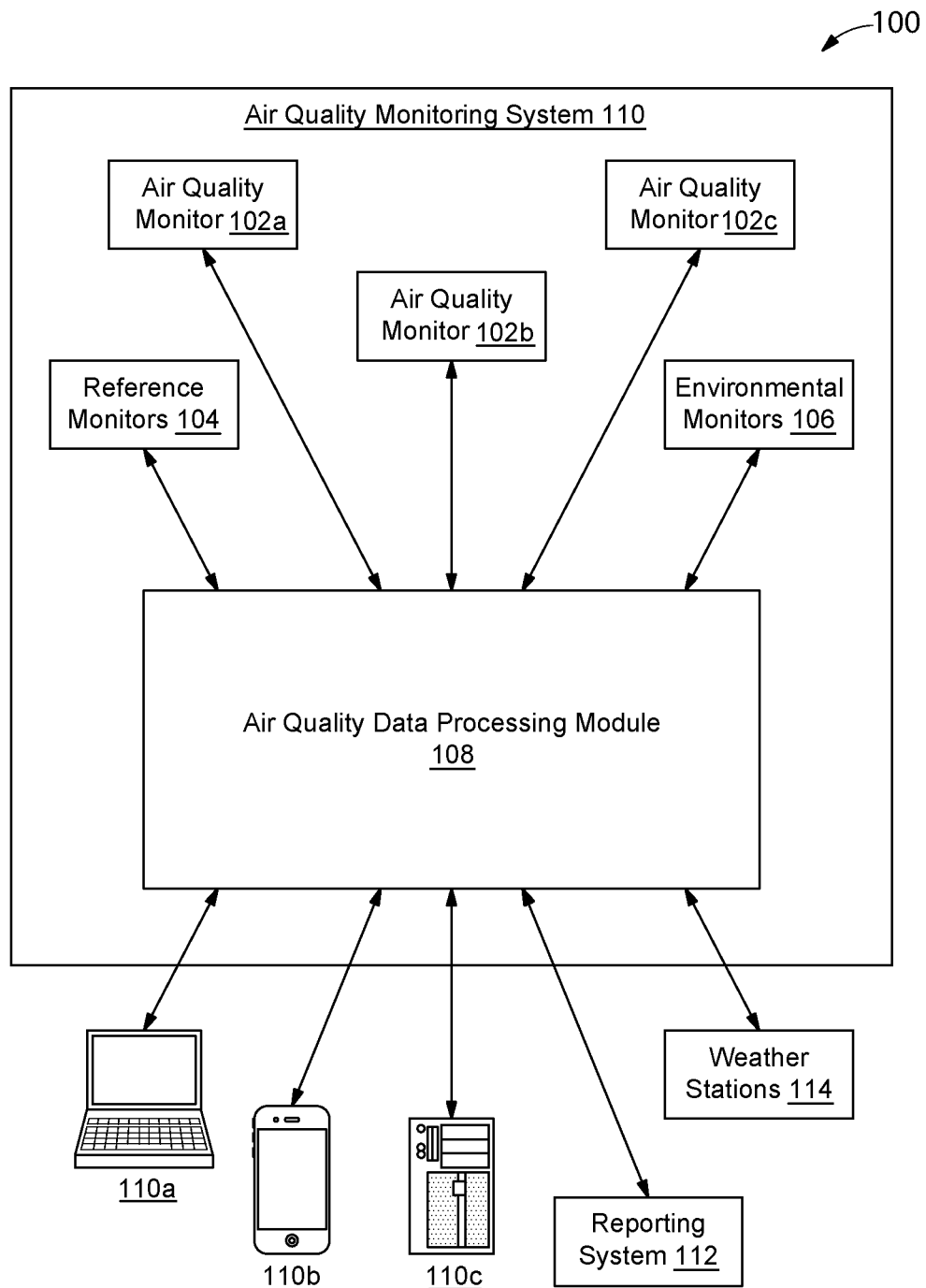
FIG. 1 illustrates an example of an air quality monitoring system.

FIG. 1 shows an example of an air quality monitoring system 110, which handles air quality data from different sources. As illustrated in FIG. 1, the air quality monitoring system 110 may include an air quality data processing module 108, a plurality of air quality monitors 102a, 102b, and 102c, reference monitors 104 and environmental monitors 106. Air quality monitors 102a, 102b, and 102c can include at least one chemical sensor configured to detect and measure chemicals such as ozone, nitrogen oxide, carbon dioxide, sulfur dioxide, volatile organic compounds, methane or other hydrocarbons and other chemicals in gaseous state (herein described as "gaseous chemicals"). Air quality monitors 102a, 102b, and 102c can also include at least one particle sensor configured to detect and measure the presence of suspended particles in air such as dust, smoke, pollen, or soot (herein collectively described as "particulate matter" or "PM"). Air quality monitors 102a, 102b, and 102c may include an enhanced gaseous chemical sensor having a multi-pass cell for light rays as will be described in more detail below. Air quality monitors 102a, 102b, and 102c may be located at multiple different locations. For example, multiple monitors may be distributed across a sizable area such as a county, a city, or a neighborhood. Several instruments may also be located within a building or a dwelling.

Reference monitors 104 include precision gaseous chemical sensors and are configured to provide measurements for use in calibrating the gaseous chemical sensors in air quality monitors 102a, 102b, and 102c. Environmental monitors 106 are configured to measure environmental conditions such as humidity, temperature, atmospheric pressure, air density, ambient light, geographic location, wind speed and direction and the like.

Air quality data processing module 108 is configured to communicate with air quality monitors 102a, 102b, and 102c, reference monitors 104, and environmental monitors 106. For example, air quality data processing module 108 may receive data from these monitors such as measurements. Air quality data processing module 108 may also transmit data to these monitors such as calibration data. Air quality data processing module 108 can correct measurements from air quality monitors 102a, 102b, and 102c using cross-calibration factors as will be explained below. Air quality data processing module 108 is also configured to process the data from monitors and perform analyses to calculate or infer additional air quality data such as the amount of various gaseous chemicals in various locations, sources of those gaseous chemicals and recommendations based on elicited requirements or preferences of end users. Air quality data processing module 108 is configured to communicate with mobile devices 110b, computing devices 110a and server devices 110c to receive data and provide received, calculated, and inferred air quality data. For example, air quality data processing module 108 may receive user-input data and use that data to derive additional air quality data relevant to the area of analysis. Air quality data processing module 108 is also configured to communicate with other sources of data such as reporting system 112 and weather stations 114. Air quality data processing module 108 may be implemented in any appropriate physical or virtual computing platform such as a networked server and may operate and act through any suitable interface such as a cloud computing platform.

Air quality monitoring system 110 may also be configured to process incoming data to provide a variety of outputs. For example, air quality monitoring system 110 may analyze measurements from air quality monitors 102a, 102b, and 102c to determine sources of the gaseous chemicals being detected. Air quality monitoring system 110 may provide actionable steps to affect the chemical sources such as ways to reduce the release of those chemicals or ways to minimize exposure to those chemicals. It may do so by making use of stated preferences or user requirements and/or ancillary (e.g., topological, geological, meteorological or demographic) datasets relevant to the area of investigation.

Figure 2:
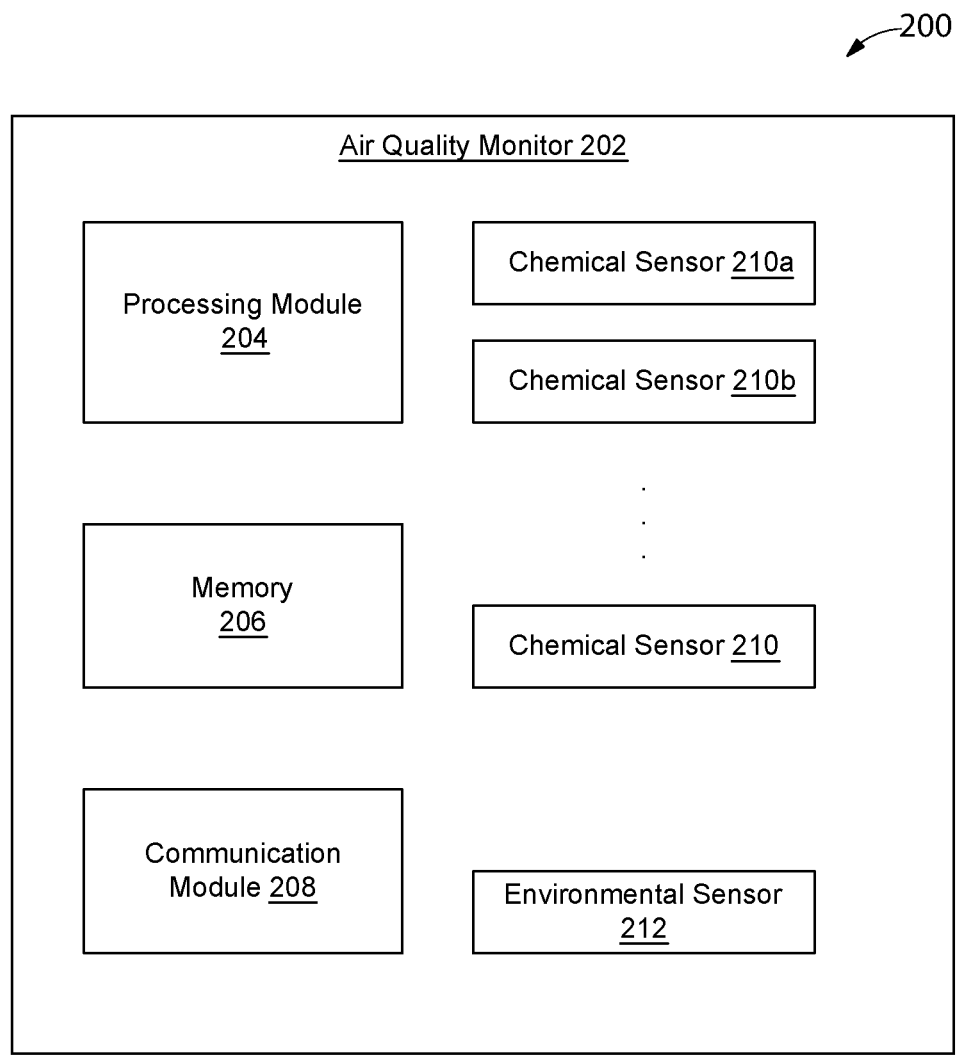
FIG. 2 illustrates an example air quality monitor and select example components that may be included.

FIG. 2 shows a layout 200 of an example air quality monitor 202 (such as air quality monitors 102a, 102b and 102c in FIG. 1) and some example components that may be included therein. Air quality monitor 202 may include processing module 204, memory 206, communication module 208 and at least one gaseous chemical sensor such as chemical sensor 210a or 210b . . . (hereinafter collectively referred to as "chemical sensors 210"), and environmental sensor 212. Processing module 204 processes computing tasks and controls other components. The computing tasks may include calibration. Memory 206 stores data such as measurement data from gaseous chemical sensors 210 and calibration data such as cross-calibration factors. Chemical sensors 210 are configured to measure gaseous chemicals and particulates in analyte gas such as gas under sampling by air quality monitor 202. Environmental sensor 212 measures environment conditions such as temperature, pressure, humidity, location, wind speed and the like. Communication module 208 handles communication with other devices. For example, communication module 208 may handle communication between air quality monitor 202 and air quality data processing module 108 of FIG. 1, other air quality monitors, user-devices such as mobile devices 110b and computing devices 110a and 110c and the like. Communication module 208 may communicate through any of a variety of wired and wireless mechanisms such as Wi-Fi, Bluetooth, mobile networks, long-range radio, satellite and the like. Air quality monitor 202 may also be configured to measure time, position, and other relevant information for computing devices. The components, functionality, and configuration of the sensor can be selected based on desired monitoring capabilities. At least one air quality monitor may also measure various onsite atmospheric parameters such as the measured substance concentration of a target substance or a set of individual atmospheric readings. The set of individual atmospheric readings may include at least one of the following: barometric pressure, air temperature or humidity level.

Figure 3:
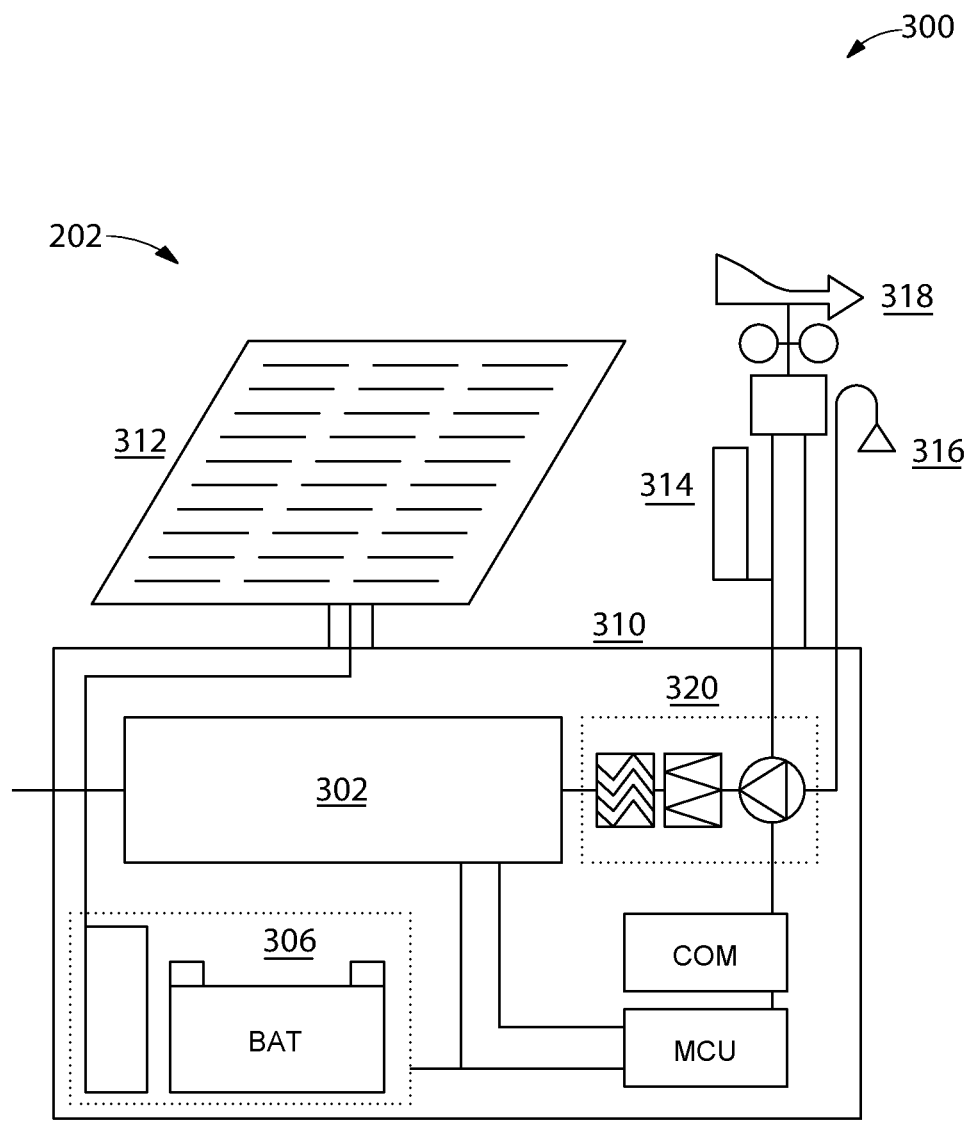
FIG. 3 illustrates a sensor system deployed at a site.

FIG. 3 illustrates a particular configuration of a sensor system 300 capable of measuring a target compound and at least one environmental parameter (e.g., a weather condition) in a collocated and contemporaneous manner. The compound measurement function of the sensory system of FIG. 3 is performed by the compound sensor or sensors 302. These sensor(s) are point sensors, which means that their function is to measure a particular physical-chemical property of the target compounds to distinguish them from background atmospheric composition. Targeted compounds may include but are not limited to gases and aerosols emitted by industrial, anthropogenic or natural activities. In particular, one configuration focuses on hydrocarbons and other greenhouse gases that absorb energy from radiation in the mid-IR region of the electromagnetic (EM) spectrum with wavelength between 1um and 5 um. In one configuration, compound sensor 302 is an absorption spectrophotometer that can measure mid-infrared absorption in the 3 um to 5 um range of the EM spectrum. Without loss of generality, compound sensor 302 may comprise other sensor technologies that may be similarly used for the measurement of target compounds.

To capture a sample for analysis, a sampling cane 316 may be used to pump an air sample at a specific height and to avoid sampling water in the case of precipitation or other foreign agents of large size. The sample may be pumped and conditioned by a sample-pumping and conditioning system 320. The system depicted may include a pump for sampling the air for the compound sensor 302, a filter for the removal of particulate matter and a coalescent filter for the removal of water. The system may further include desiccant filters, temperature and pressure adjustment systems, valves, and additional drain pumps to facilitate moisture removal, temperature conditioning of the sample, flushing or other filter-regeneration tasks. The purpose of this is to provide a properly conditioned sample based on the sensor system requirements while limiting the necessary maintenance of the pumping and conditioning system in the sampling cane 320.

In some configuration, the compound sensor 302 may use an open path in order to avoid the necessity of pumping or conditioning samples. The sample may then be naturally transported into the sensing area by weather patterns without the use of a cane 316 or sampling pumping and conditioning system 320.

The sensor system of FIG. 3 further includes a weather sensor system 318 collocated with the sampling point of the compound sensor 302 around the sampling cane 316. The weather sensor system should at least include sensing elements to measure wind speed and direction. Further sensing about temperature, pressure, hygrometry, insolation and precipitation may also be used to refine the subsequent modeling effort. The wind speed and direction may be measured by a combination of a wind vane and an anemometer or by an ultrasonic anemometer alone. The wind direction measurement may be made in two or three dimensions. Temperature may be measured using MEMS sensors, thermistors or other suitable sensing technology. Pressure may be measured using a barometer sensor and hygrometry may be measured using a moisture sensor. The sensors for temperature, pressure and moisture may be connected to improve each of the measures as they are interdependent. Insolation may be measured using a photodiode or any other appropriate light-sensitive sensor. Precipitation may be measured using a precipitation sensor with auto-draining capability. While collocating the weather measurement with the sampling point is important for the purpose of accurately characterizing emissions, it is not absolutely necessary for performing the method as long as weather measurements are collected in close proximity to the sensor system (i.e., within 100m). This conformation, i.e., being collocated, minimizes measurement error and is the illustrative configuration of the present disclosure.

The data collected by the compound sensor 302 and weather sensor system 318 may be collected and processed by a local computing unit 312. The local computing unit may also control the execution of the main sampling and measurement program and the actuation and controlling of any subsystem of the sensor system 300. The local computing unit 312 runs the main firmware, which schedules and collects data from compound sensor 302 and weather sensor system 318, conditions the sensor signals into a rational format, performs data preprocessing, locally stores data, formats and prepares messages and generates diagnostic and metadata pertaining to the identification, time stamping and operational diagnostics of the sensor system and supporting circuitry. The messages may be encrypted and transferred to a communication unit 308, and messages may be received from remote assets. The communication unit 308 includes a modem or other interface that conditions the message to the right protocol for communication or receives external messages to be communicated to the computing unit 312. The communication protocol may be wired as in a SCADA system or wireless using Bluetooth®, Wi-Fi, LoRa, cellular, satellite, other radiofrequency, optical line of sight or other wireless data-transmission protocol. If a wireless protocol is employed, the data may be relayed using a communication antenna 314 if appropriate. In general, a communication system, which may consist of a communication antenna 314 and communication unit 308, has a role that includes the communication of the measurement to a remote or centralized node and the receipt of communications related to settings and operations changes or firmware updates. The communication system may be used to relay messages to and from other sensor systems such as in a daisy chain, star or mesh configuration in order to reduce the communication cost when relying on external communication infrastructure such as cellular or satellite communication networks. In case of communication error or other cases that warrant it, the messages may be stored by the computing unit 312 to communicate at a later, more opportune time. For example, when communication services may be interrupted, multiple channels of communication (such as multiple wireless data-transmission protocols) may be used to attempt to alert the computing unit 312 to changes of operating conditions and to receive instructions.

The deployment of sensors in the field may require the exposure of the equipment to harsh outdoor conditions with no external support such as power access and communication infrastructure. The sensing system is housed in an enclosure 310 to protect the system from the environment and from tampering. Hazards may include but are not limited to precipitation, moisture, surface water and flooding, high temperature and insolation, low temperature, high wind, storms, hurricanes, typhoons, tornadoes, lightning, external impact and vibration, robbery, defacement, damage, earthquakes, light or electromagnetic interference, foreign agents or fauna and flora disturbance or intrusion. The enclosure 310 may also be highly visible by day and reflective at night to avoid accidental damage. The enclosure 310 may be directly on the ground, mounted on a foundation or pole mounted.

The sensor system in FIG. 3 may produce and manage its own power. In one configuration, the sensor system may include a solar power system 312 and a power conversion and storage system 306. The solar power system 304 and power conversion and storage system 306 are designed to provide sufficient power to the various other subsystems and to provide sufficient reserves and capacity to ensure proper functioning of the sensor system in most environmental conditions present in the field. Solar power system 304 may be replaced by wind- or gas-based power generation or any other form of compact power generation system if the conditions warrant it. For instance, at high latitudes, wind-based power generation may be preferable to solar on account of low insolation. The power conversion and storage system 306 may include a battery storage bank and a charge controller. The power conversion and storage system 306 may further include power converters for providing appropriate power to the various systems, relays, fuses, breakers and switches appropriate for the power protection, function, and physical interfacing required by a particular configuration of the sensor system. The battery storage bank may include lithium-ion (such as LiFePO4 cells), lead acid (such as a deep-cycle sealed battery) or any other appropriate battery technology that can operate nominally in conditions that may include high and low temperatures and irregular charging profiles. The charge controller may use Pulse-Width Modulation (PWM), Maximum Power Point Tracking (MPPT) or other technology appropriate to convert the raw energy from the solar power system 304 to the battery storage bank charging requirements. All subsystems of FIG. 4 may be modular in nature to facilitate replacement of subsystems with minimal tools in the case of maintenance.

Figure 6:
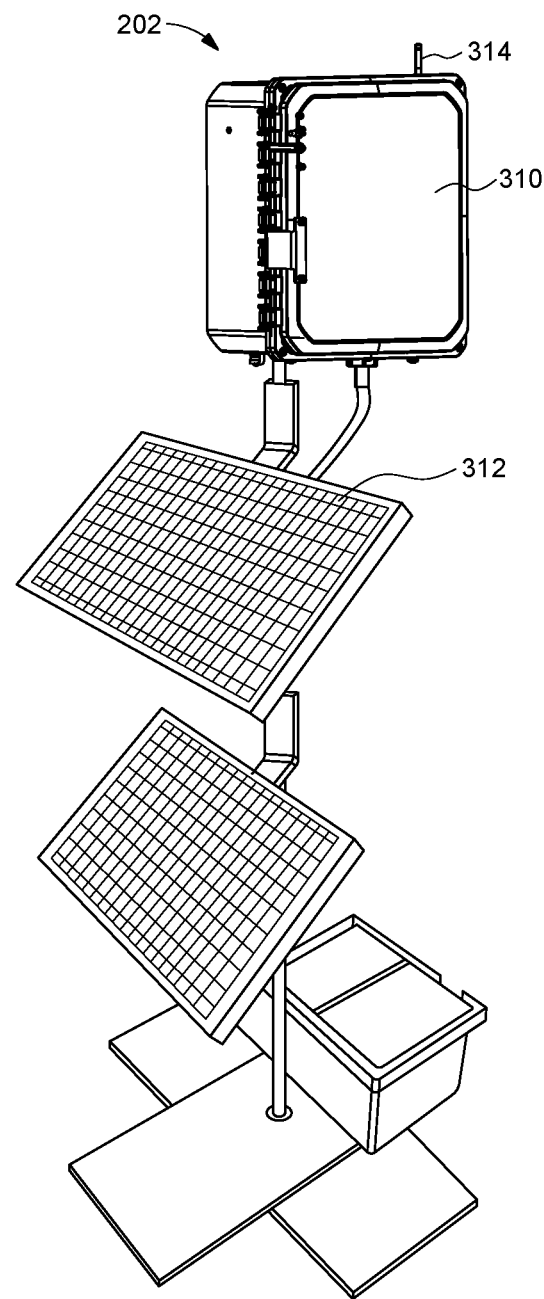
FIG. 6 illustrates another view of the configuration of the sensor system of FIG. 3.

FIG. 6 shows another view 600 of the configuration of the sensor system of FIG. 3. The system includes enclosure 310, sampling cane 316 and solar power system 312.

Figure 5:
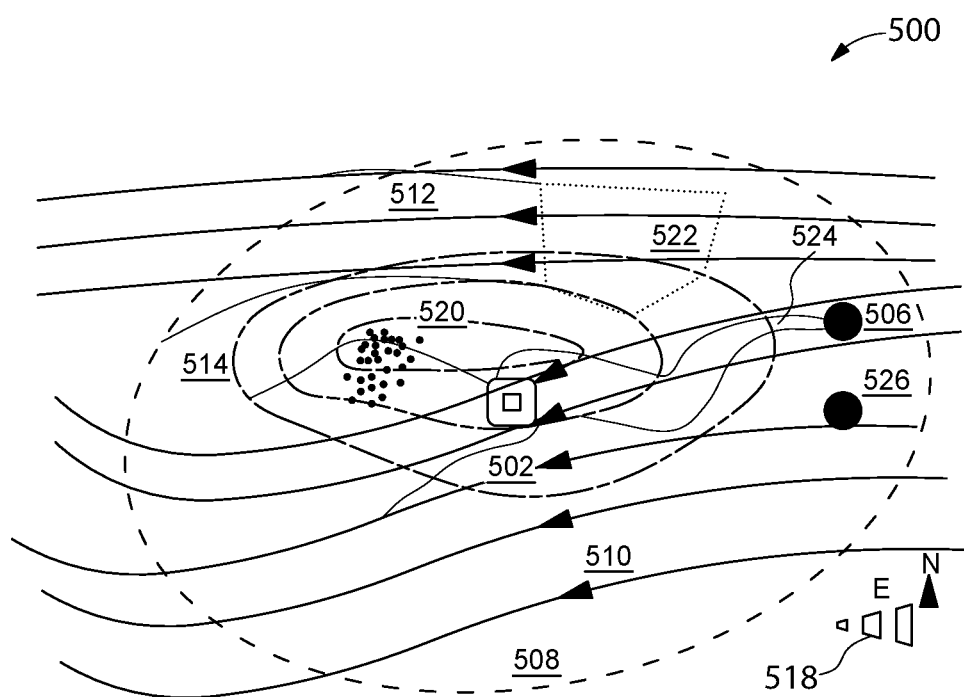
FIG. 5 illustrates a symbolic map representation of a sensor deployment amid the field where emission sources are present.

The configuration of the system as in FIGS. 3 and 6 or any other sensor system configuration capable of measuring target gas and weather measurements in a collocated manner may be deployed in a field where prospective emission sources are present. A symbolic map 500 of a prospective field deployment is presented in FIG. 5. In FIG. 5, a sensor system 502, as depicted by a rounded-corner square, is deployed in the field to detect emissions plumes 512, 524 of target compounds depicted by gradients. These emissions plumes 512, 524 may be emitted by point sources 506, 526 depicted by circles or by area source 522 depicted by a polygon. The plumes 512, 524 are transported by advection by an air flow as denoted by streamline arrows 510 and by buoyancy and diffusion of the compound in air. Typically, the air flow is of a complex, three-dimensional geometry and depends on many parameters including but not limited to terrain, surface roughness and obstacles, temperature and pressure differential, insolation and inversion layer position, turbulence and atmospheric boundary conditions or other atmospheric conditions forced by large-scale weather patterns. The streamlines 510 are a simplified view of the average transport (with turbulence represented by an average) of air parcels during the sampling time. Note that the streamlines 510 are influenced by the effect of a terrain 514 as noted by isoclines and by the presence of obstacles 520 (e.g., trees) represented by the small black dots. In this specific snapshot, the point source 506 is emitting the target gas, thereby producing plume 524 which is transported by the air flow 510 to the sensor system 502. Note that the cross section of the plume 524 increases when further from the source 506 due to diffusion and turbulent mixing. Plume 524 can also appear to have a tortuosity due to the dynamic change in wind speed and direction during the transport. In this example, point source 526 is not emitting, and area source 522 is emitting but its plume 512 does not intersect the position of the sensor system 502 in this particular snapshot. Note that plumes are typically three dimensional and may vary in vertical cross sections, though this is not displayed in this figure.

It may therefore be necessary to have precise wind measurement collocated at the sensor system with a modeling of the emission transport that considers terrain, obstacles, rugosity and other field parameters that can affect transport. For instance, in the specific snapshot presented in FIG. 5, local wind pattern 518 at long distance come approximately from the east before entering the field of interest. The wind measurement collocated at sensor system 502 indicated an approximately northeast direction as denoted with streamline 510 intersecting sensor system 502. From the perspective of sensor system 502, diffusing area source 522 is located in the northeast sector, point source 506 is located in the east-northeast sector and point source 526 is in the east sector. Only plume 524 from point source 506 is measured by sensor 502 in this particular snapshot.

If a model only accounted for a wind direction and/or speed from a local weather pattern such as the distant wind measurement of local wind pattern 518, errors could be made. For example, the perceived source of plume 524 detected by sensor system 502 would be the east sector, and this would lead to the incorrect guess that point source 526 is the source emitting plume 524. However, if the collocated measurement of wind direction at sensor system 502 is considered, plume 524 appears to be coming from area source 522, which is also incorrect. Note that a simple linear, local back-tracing of the wind parcel from the perspective of the wind sensor in sensor system 502 would have led to the same bad conclusion that area source 522 is the source since the terrain is the main source of the non-linear wind flux geometry. What this example shows is that identifying sources from wind speed and direction measurements alone is difficult without a large number of wind measurements.

Figure 4:
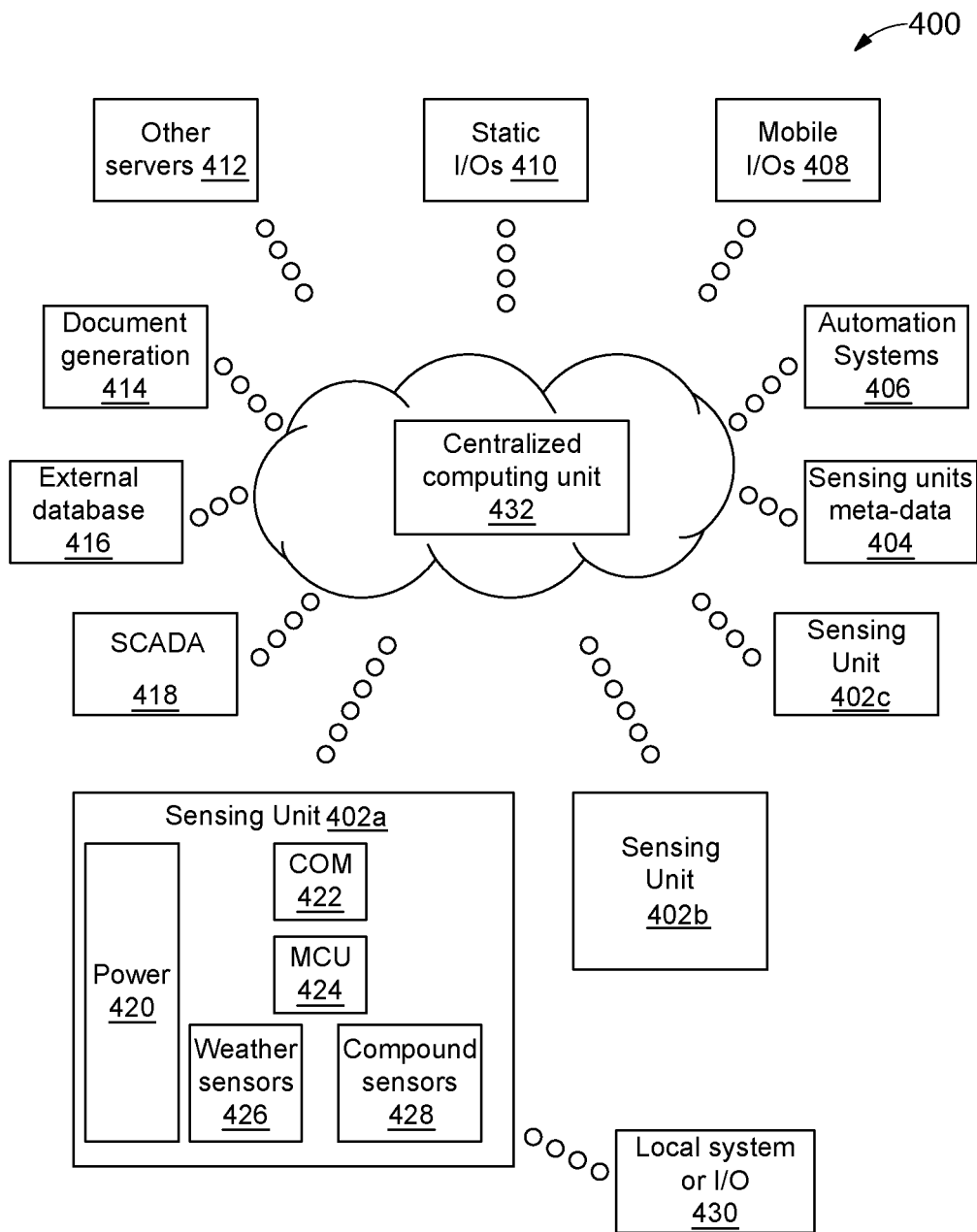
FIG. 4 illustrates a communication architecture of the sensor system of FIG. 3.

Multiple sensor systems as described in FIGS. 3, 5, and 6 may be deployed in a field for the acquisition of weather measurement and compound measurements. The sensor system takes these measurements and relays messages related to these measurements with timestamps, identifiers and other metadata regarding sensor operations to a centralized computing unit 432 in FIG. 4, which illustrates a communication architecture of the sensor system of FIG. 3. The communication of data and commands is represented in FIG. 4. Sensing unit 402a, which may or may not be the same as that described in FIG. 3, can incorporate components such as a power system 420, weather sensors 426, compound sensors 428, a computing unit 424 and a communication unit 422. Sensing unit 402a can relay messages as described above to centralized computing unit 432 using a network layer. The network layer may rely on existing communication infrastructure such as cellular or satellite, or it might use dedicated infrastructure such as custom wired or wireless systems including but not limited to Wi-Fi, Bluetooth®, LoRa and other telemetry and data-transmission systems. The data transmission may rely on other network infrastructure such as the internet or on dedicated networks such as intranet or LAN. Sensing unit 402a may also directly transmit messages to non-networked systems or to local systems 430 as may be the case for a local interface used by the sensor system user. The message from sensing unit 402a may be relayed through other sensor units as in daisy-chained or starred sensor system networks or through a dedicated unit for the local storage, scheduling and packaging of messages from various sensing systems 402a, 402b deployed in the vicinity of each other. This may be done to amortize the cost of expensive transmission technology such as satellite links.

Once data reaches centralized computing unit 432, message processing is performed to transform raw data into actionable data. This may involve simple tasks such as data formatting or more complex tasks such as creating a maintenance-tracking system for the operator. In one configuration, the data processing is the conversion of weather and compound measurements into the detection, localization, quantification and qualification of target compound emissions. In addition to the detection, localization, quantification and qualification of the emissions, the centralized computing unit 432 may also be configured to minimize the number of air quality monitors. This is illustrated in detail in the successive configuration. To transform the raw compound measurements into speciation and concentrations, an external database 416 such as the HiTRAN database may be queried for reference spectra, or internal databases of calibration measurements taken with the specific sensing unit 402a during calibration runs may be queried.

In one configuration, a supervisory control and data acquisition system (sometimes referred to herein as a SCADA system 418) may be provided at the site. The SCADA system 418 may be deployed in a control room or in an on-site field office. Further, the SCADA system 418 may be connected to at least one on-site device including but not limited to pressure sensors, pressure vessels, separators, drills and the like. The supervisory control and data acquisition system (SCADA) may be configured to monitor and supervise at least one device. The monitoring would preferably including the physical condition and operational condition of that device. Supervisory control and data acquisition systems (SCADA) may rely on a control system architecture comprising computers, networked data communications and graphical user interfaces for high-level supervision of machines and processes. It may also refer to sensors and other devices, such as programmable logic controllers, which interface with process plant or machinery. An operator may monitor and issue process commands (e.g., controller set point changes, operation of interfaced devices, etc.). The subordinated operations, e.g., the real-time control logic or controller calculations, may be performed by networked modules connected to the field sensors and actuators. SCADA systems are generally a means of remote-access to a variety of local control modules, which may be supplied by different manufacturers but according to standard automation protocols.

In one illustrative configuration, physical conditions monitored and supervised by the SCADA system 418 may include the pressure levels of the pressure vessels, the flow rate from the drill, etc. The physical conditions may be acquired as a physical factor by the SCADA system 418, which indicates parametric values of the pressure levels, flow rates, etc. In another illustrative configuration, the operational conditions monitored and supervised by the SCADA system 418 may be acquired as an operational factor. The operational factor may refer to a parametric value of the operational conditions. The operational conditions may include operating setpoints, controlling flow rates or even boundary conditions associated with at least one device beyond which the operation of the at least one device may cease. In another illustrative configuration, the SCADA system 418 may be communicably coupled to a first server (not shown in the figure). The SCADA system 418 may be configured to transmit the acquired operational factor and the physical factor to the first server.

In one configuration, the centralized computing unit 435 may use information from another sensing unit 402b for enhanced localization, quantification and qualification of the emissions. Sensing unit 402b may include multiple sensing units and may be of the same type as sensing unit 402a or any other sensing unit present on the sites. For example, sensing unit 402b may be a flare lighting sensor used as an indicator to help attribute an emission detected by sensing unit 402a to a flare misfiring.

Actuator commands may be used as a sensor feed as well. For example, the actuation of pneumatic equipment at oil sites may result in a predictable emission; therefore, command signals from actuators may be used to help predict expected emissions from an oil site. An example in the landfill industry may be variation in the pressure head of wells, which may be correlated with a local emission hotspot. This concept can be extended to all existing command signals and process sensors already present in equipment associated with potential emissions sources.

Once the detection, quantification, qualification and localization of sources are obtained by the centralized computing unit 432, actionable data may be generated. Actionable data may be data necessary to take a corrective action including but not limited to generating emission reports, creating maintenance lists or updating maintenance tracking and emissions-reduction tracking tools. The actionable data may further be used in commands or scripts for automation systems 406. For example, actuators on a site may be automatically put in a safe position if an explosive concentration of a flammable compound is detected. Another example would be the operation of equipment such as sirens or visual cues that alert operators to perform emergency evacuation if a toxic compound is detected. At times, robotic or automated inspection and repair systems or equipment maintenance systems may be deployed in response to a command. For example, a drone may be deployed to perform a precise, automated inspection of a certain area identified by sensing unit 402a or to perform fine-scale equipment-leakage detection. Another example would be automated excavation equipment deployed to place additional ground cover on a detected emission hotspot at a landfill. Yet another example would be the triggering of an automated self-diagnostic system in a continuous production environment that requires a lot of computation to identify process problems.

Actionable data may be used to generate automated reports in document generation task 414. For example, the sensor data may be used to generate with or without operator intervention regulation-mandated emission inventory reporting and edit auto-completed reports to be physically or digitally sent to the concerned agency.

Actionable data, emission data and raw data may be transmitted to other servers 412 that may be internal or external. The purpose of this may be to relate raw data for archiving or post-processing or to send data to servers behind a firewall in specific user instances in which proprietary data is collected and requires different levels of encryption. In that case, raw encrypted data may not be decrypted in the centralized computing unit 432 for data safety reasons and may only be safely decrypted behind a client's firewall.

Actionable data such as triage information, reports, maintenance and abatement data may be communicated through emails, text messages, dashboards or dynamic notebooks to static I/Os 430 and mobile I/Os 408. Static I/Os 410 can include PCs and other fixed computing units such as those found in the office of the field manager. Mobile I/Os 408 can include pagers, PDAs, phones, tablets or laptop computing units and equivalents such as the phone of a field operator (such as a pumper) or a field foreman in the case of oil and gas applications.

Figure 7:
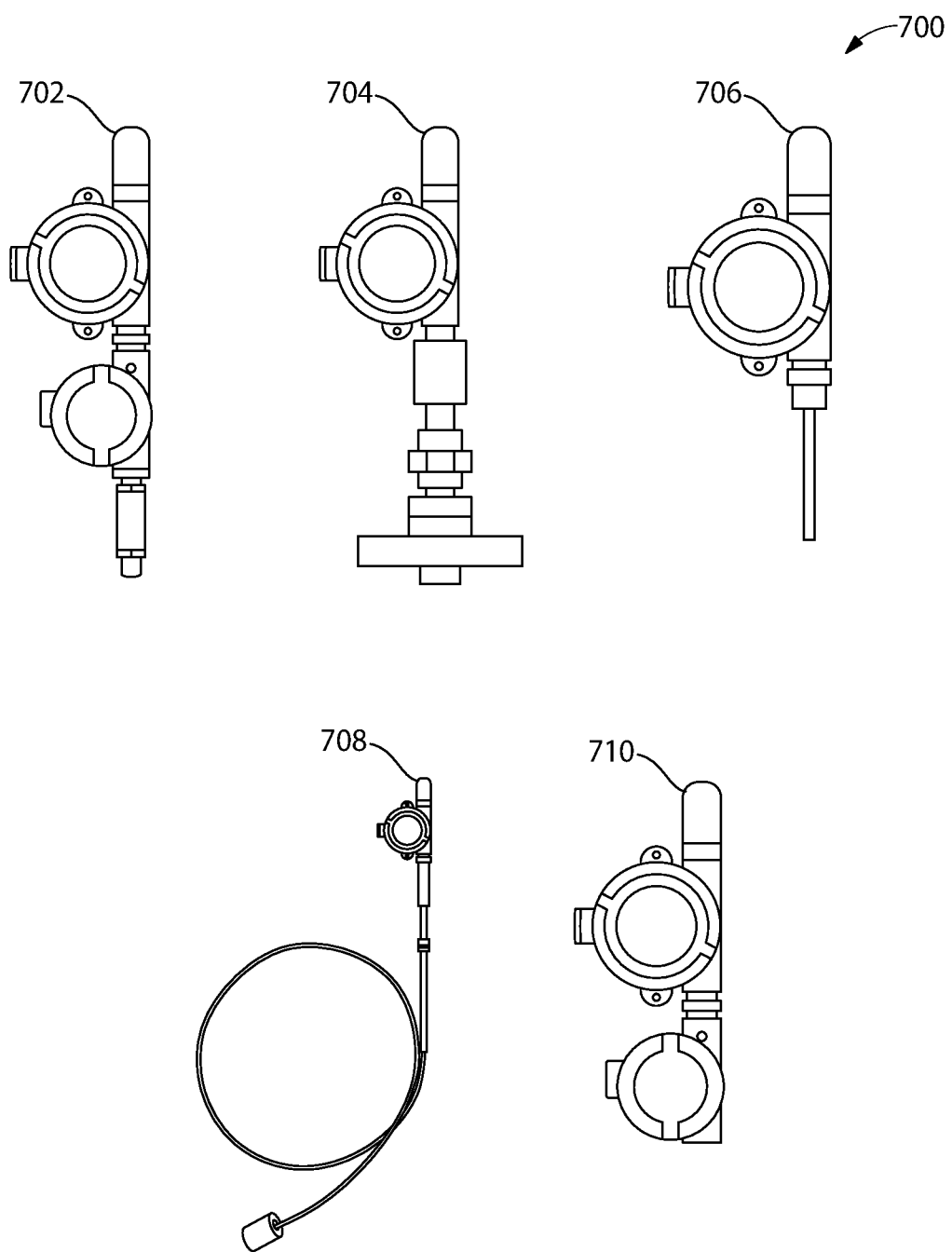
FIG. 7 illustrates at least one device deployed at the site.

In one illustrative configuration shown in FIG. 7, the at least one device deployed at the site is illustrated. The at least one device may include pressure sensors 702, flow sensors 704, temperature sensors 706, level sensors 708 and other discrete sensors 710. The at least one device may be installed at the site as explained in detail in conjunction with FIG. 9. Again referring to FIG. 7 and by way of an example, the pressure sensors 702 may include pressure switches, piezoelectric sensors, manometers and the like. The pressure sensors may be deployed at a compressor or a wellhead pressure head and may be configured to generate a signal in response to the pressure of a fluid maintained in the aforementioned units. Similarly, flow sensors 704, temperature sensors 706, level sensors 708 and other discrete sensors 710 may be configured to generate electric signals representative of the flow rate, temperature, level and other parameters of the fluid, respectively.

Figure 8:
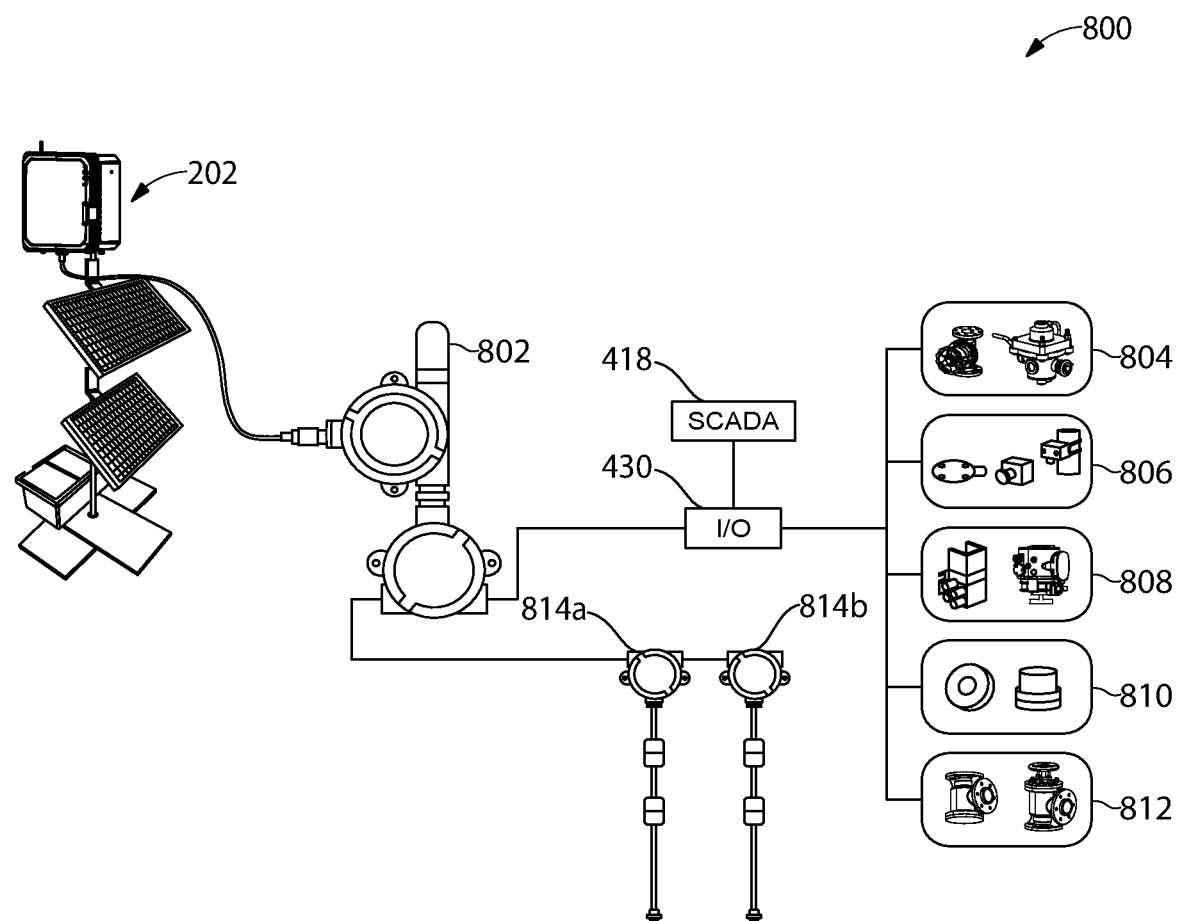
FIG. 8 illustrates a communication architecture of a SCADA system connected with the sensor systems deployed at the site.

In one illustrative configuration, the electric signals from the sensors of FIG. 7 may be acquired as operational factors by the SCADA system 418. FIG. 8 illustrates an exemplary architecture of the SCADA system 418 connected to the air quality monitor 100 and the at least one sensor deployed on the site. In the same configuration, the at least one device may be connected to the at least one sensor 804, at least one control valve 806, at least one solenoid 808, at least one alarm 810 and at least one discrete sensor 812. The at least one sensor may be configured to sense and determine one or more operational factor of the one or more devices and may further transmit the operational factors to the input/output module 430. The SCADA system 418 may be connected to an input/output module 430. The input/output module 430 may be further connected to the air quality monitor 100 via a master communication unit 802. The master communication module 802 may be further connected to the slave communication modules 814a, 814b. The air quality monitor 100 may be configured to create historical data related to emissions in view of the topology of the site, and it further may be configured to transmit the historical data to the input/output module 430. The SCADA system 418 may be configured to acquire both the historical data from the input/output module 430 as a set of SCADA data and the operational factors, and it may transmit the set of SCADA data to the first server. Further, the slave communication modules 814a, 814b may be connected to a master communication module of other air quality monitors (not shown in figure) positioned on site. Similarly, the SCADA system 418 may be configured to acquire SCADA data from the other air quality monitors 100 via the slave communication module 814a, 814b. Further, it must be noted that the compound sensor may be the sensor 204a explained in conjunction with FIG. 2.

Figure 9:
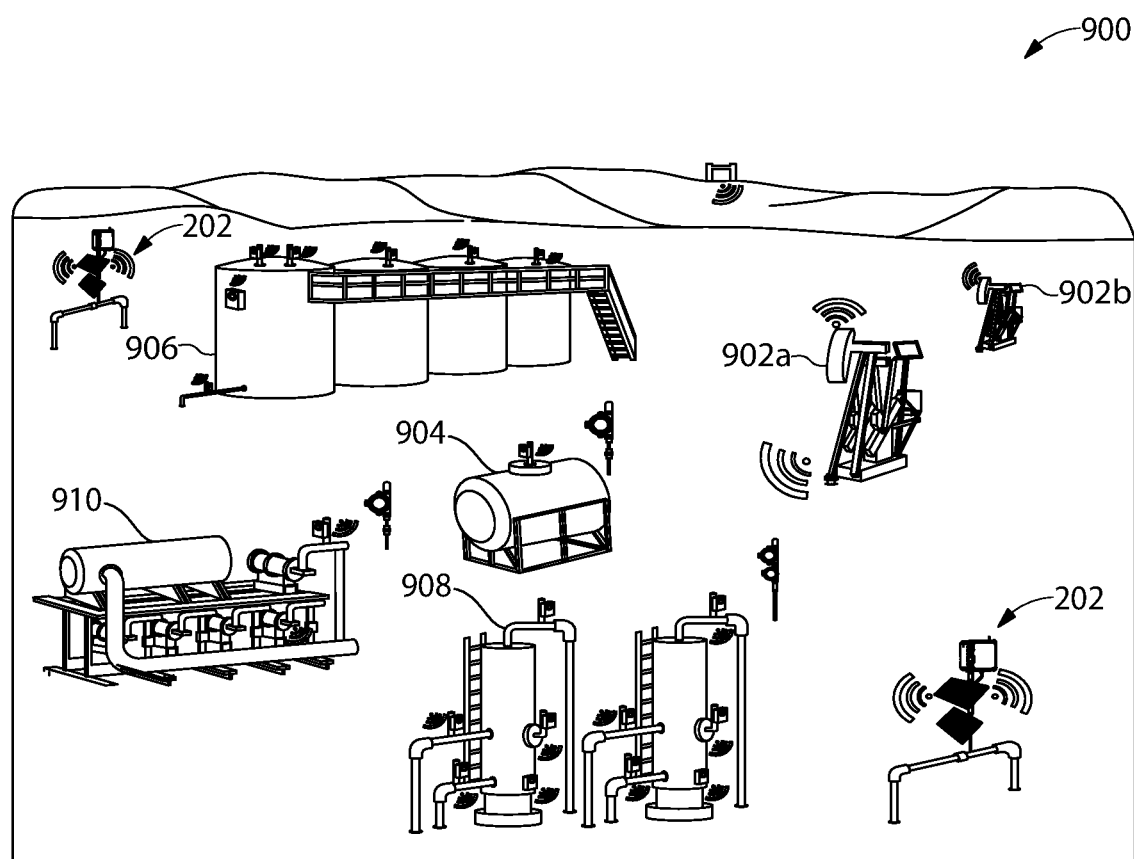
FIG. 9 illustrates a layout of the site.

Another illustrative configuration is given in FIG. 9, which illustrates an exemplary layout 900 of the site. The site may include at least one pumpjack 902a, 902b. The pumpjack 902a, 902b may be fluidically coupled to a chemical tank 904, a production tank 906, a separator unit 908 and/or a compressor 910. As illustrated in the figure, at least one of the devices installed on the site may be connected to at least one sensor illustrated by FIGS. 7 and 8. For example, the chemical tank 904 may be connected to a fluid level sensor 708. The production tank 906 may be connected to at least one sensor such as the pressure sensor 702 or the flow sensor 704. The separator unit 908 and the pumpjack 902a, 902b may be connected to discrete sensor 710. The compressor 910 may be connected to the pressure sensor 702. The sensors connected to the devices may be configured to sense the operational parameters of the devices at the site such as pressure, flow rates and the like.

With continued reference to FIG. 9, in another illustrative configuration, the site may include at least one air quality monitor 100. For example, the at least one air quality monitor 100 may include a first air quality monitor 100 positioned at a first location, which may be a north boundary of the site. The at least one air quality monitor 100 may include a second air quality monitor positioned at a second location, which may be a south boundary of the site distant from the first location. The at least one air quality monitor 100 may include at least one chemical sensor 210 (refer to FIG. 2). The chemical sensors 210 may be configured to sense at least one set of attached parameters related to at least one location at which the at least one air quality monitor may be installed. The set of attached parameters may include a concentration of a target chemical gas emitted by the at least one device on site. The at least one air quality monitor 100 may be further configured to transmit the at least one set of attached parameters to the first server.

With continued reference to FIG. 9, in another illustrative configuration, the SCADA system 418 may be installed at the site and connected to the at least one sensor in a configuration similarly illustrated by FIG. 8. The SCADA systems may be configured to acquire the SCADA data as illustrated in FIG. 8 and may include historical data regarding emissions from the at least one air quality monitor 100 and the operational factors from the at least one sensor connected to an at least one device deployed at the site. In another configuration, the set of SCADA data may further include at least one physical factor associated with the at least one device on site. The set of SCADA data may be further transmitted to the first server.

Figure 10:
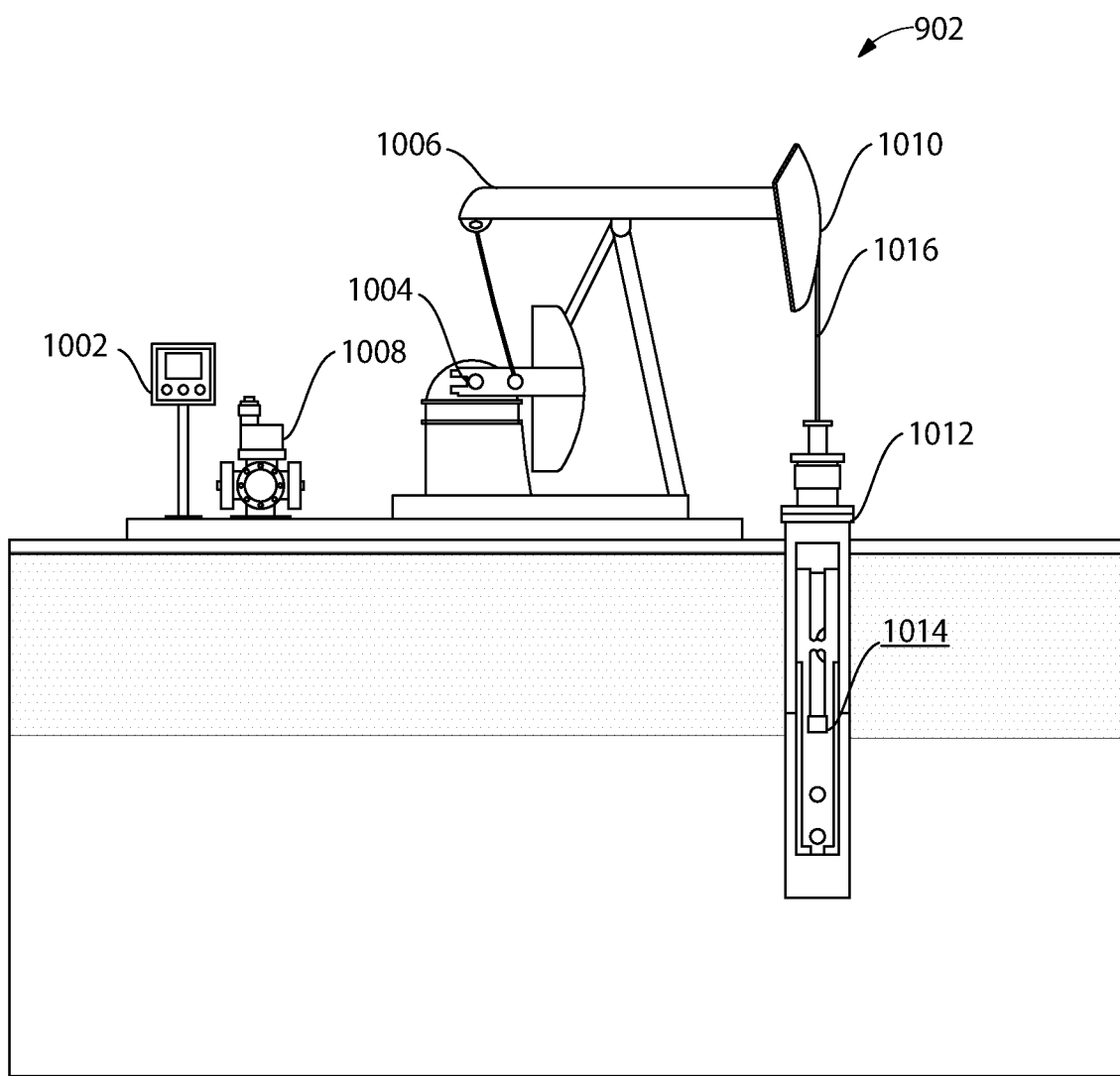
FIG. 10 illustrates an exemplary configuration of supervising and monitoring the operation of the pumpjack deployed at the site.

Referring to FIG. 10, another exemplary configuration 1000 illustrates the supervision and monitoring of the operation of a pumpjack 902. The pumpjack 902 may include a motor 1008, a gearbox 1004, a walking beam 1006, a horse head 1010, a bridle 1016, a pump 1012 and a piston 1014 positioned in the pump 1012. The pumpjack 902 may be connected to a control unit 1002. In the same configuration, the SCADA system 418 may be hard-wired or wirelessly connected to the control unit 1002. The control unit 1002 may include a user interface and a display. A site operator may access the user interface to manually adjust the operation of the pumpjack 902. The operation of the pumpjack 902 may include output from the motor 1008, which may drive the gearbox 1004. Driving the gearbox 1004 may further actuate the walking beam 1006. As illustrated by FIG. 10, the horse head 1010 may be connected to the walking beam 1006. Further, the bridle 1016 may be extended from the horse head 1010, and bridle 1016 may be connected to the pump 1012. Actuation of the walking beam 1006 may further oscillate the horse head 1010 in a vertical direction, thereby operating the pump 1012 such that the piston 1014 in the pump 1012 may oscillate in tandem with the horse head. The actuation of the piston 1014 may lift or excavate the emulsion from the oil well. The control unit 1002 may be configured to control the operation of the pumpjack 902 via, for example, the output of the motor 1004, the gear ratio and output speed from the gearbox 1004 or the actuation speed of the walking beam 1006, which may further impact the oscillation speed of the horse head 1010, the bridle 1016 and the pump 1012. Operational parameters such as speed (in RPM or meters/second) and frequency (cycles per second) may be acquired as operational factors by the SCADA system 418. Further, a peak load on the walking beam 1006, a depth at which the pump 1012 maybe drilled into the oil well and a diameter of the piston 1014 may account for the physical factors acquired by the SCADA system 418.

Figure 11:
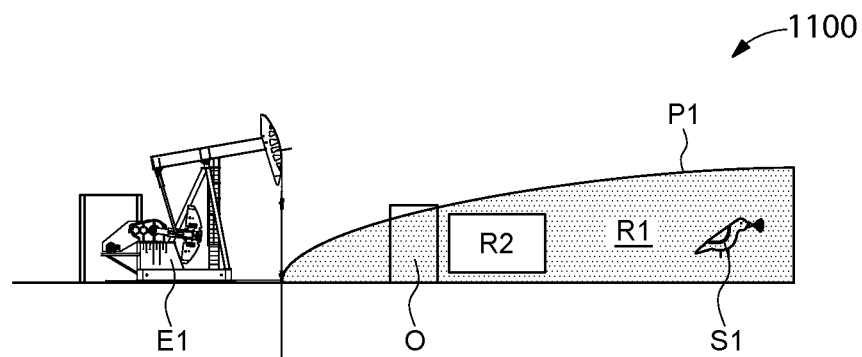
FIG. 11 illustrates a front view of an example site that includes an emission source.
Figure 12:
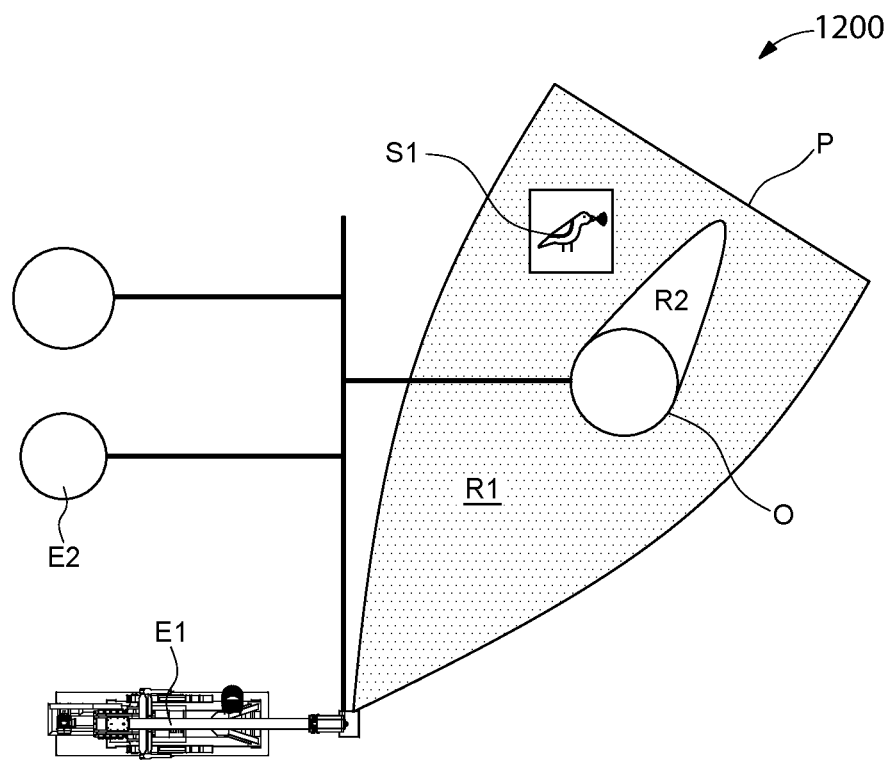
FIG. 12 illustrates a top view of an example site that includes an emission source.
Figure 13:
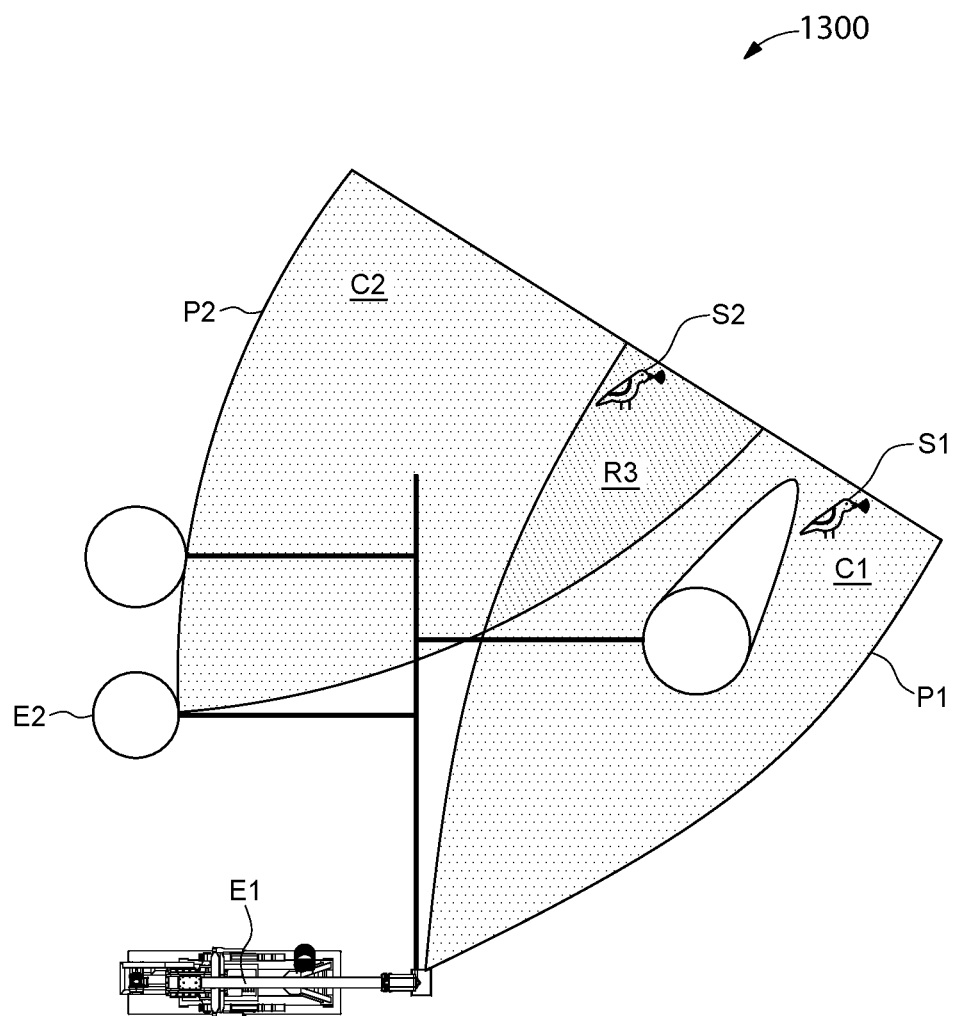
FIG. 13 illustrates a top view of a scenario with respect to an example site that includes multiple emission sources.

In an illustrative configuration, FIG. 11 illustrates a front view 1100 of the site that includes an emission source. FIG. 12 illustrates a top view 1200 of the site that includes an emission source. FIG. 13 illustrates a top view 1300 of another example site scenario in which the mixing of multiple target compounds takes place. The site may include multiple potential emission sources E1, E2, etc. Further, the site may include a sensor S1. In the scenario depicted in FIGS. 11-13, a target compound C1 may be emitted from source E1 and may form a plume P1 covering a region R1. Further, an obstruction O is present which may obstruct the plume P1. As such, the obstruction may result in a region R2 within the region R1 over which the target compound C1 is not present or is minimally present. The sensor S1, which may be lying within the region R1 but outside the region R2, may detect the target compound C1.

FIG. 13 illustrates a top view 1300 of another example site scenario in which the mixing of multiple target compounds takes place. As shown in the FIG. 13, the site may include multiple potential emission sources E1, E2, etc. Further, the site may include the sensors S1 and S2. Target compound C1 is emitted from the source E1 and forms the plume P1. Further, a target compound C2 is emitted from the source E2 and forms a plume P2. The plumes P1 and P2 merge in a region R3. As such, the region R3 includes both the target compound C1 and the target compound C2. The sensor S1, which may be lying outside the region R3, may detect only the target compound C2. The sensor S2 lying in the region R3 detects both the target compounds C1 and C2 and therefore generates a confounding signal.

In one configuration, the confounding signal may be used to generate at least one signal from information regarding the identification of the concentration of the target gas. The air quality monitor data processing module 121 (which may be on board S1 and S2) may be configured to analyze the confounding signals and to identify one or more gases irrespective of their concentration. The sensor S1 may use spectrophotometry to identify the characteristics of the one or more gases and to thereby classify the gases represented by the confounding signal. After classification, the sensor S1 and S2 may be configured to separate the signals and may further transmit the signals to the first server.

Figure 14A:
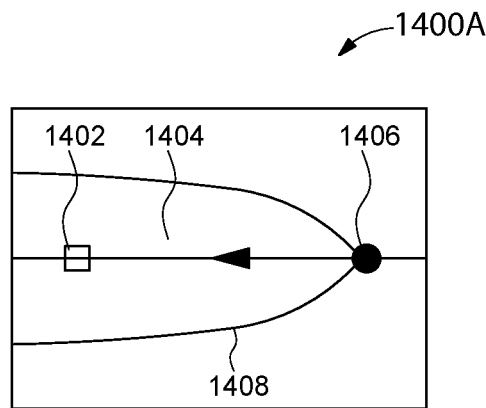
FIG. 14A-14D illustrate multiple cases of the transport of a compound from a source to a sensor, based on wind direction, wind speed, and dynamic wind effect.
Figure 14D:
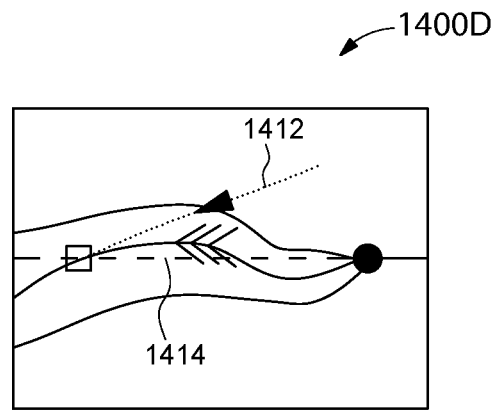
Figure 14B:
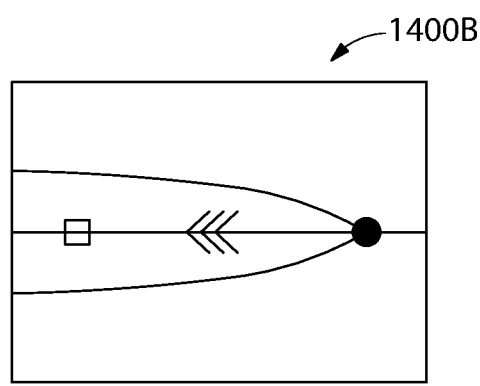
Figure 14E:
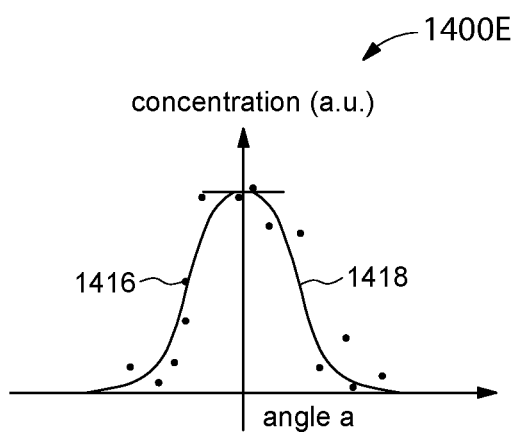
FIG. 14E illustrates a graph related to the concentration across the cross section of an emission plume.
Figure 14C:
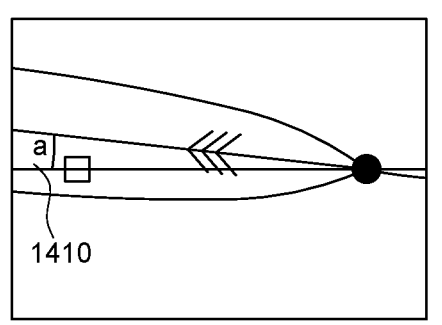

The fundamental aspects of plume detection are depicted in FIGS. 14A-14E. FIG. 14A presents a symbolic top view 1400A of the transport of an emission plume 1408 from a source 1406 to a sensor system 1402 via transport denoted by streamline 1404. In reality, the plume 1408 may not be contiguous and may have a complex three-dimensional shape. FIG. 6A presents the transport in the case of a steady, medium-speed wind pointing directly at the sensor system 1402. FIG. 14B illustrates a similar symbolic top view 1400B but with a faster wind speed. FIG. 14C illustrates another symbolic top view 1400C showing the effect 1410 of a change in wind direction by angle "a." FIG. 14D gives yet another symbolic top view 1400D showing the effect of a tortuous streamline 1414. FIG. 14E gives a symbolic representation 1400E of a plume cross-section constructed by using the wind direction to "scan" across the plume.

Comparing FIGS. 14A and 14B, it can be observed that an increase in speed may result in a narrower plume since the plume spread is determined by the balance between diffusion, turbulent mixing and advection. At higher wind speeds, horizontal advection becomes the dominant force, and this changes an observed concentration at the sensor system 1402. In particular, the maximum concentration observed across the plume may be higher in the case of higher wind speeds. However, higher wind speed can also result in more turbulent mixing in some conditions, which may influence this result. In particular, this can result in a large variance in the measurement of maximum concentrations. The differences between the low-speed and high-speed cases clearly highlights the importance of wind speed in transport and the consequent need to measure wind speed in conjunction with the concentrations of the emitted compounds.

In FIG. 14C, the average wind transport is shifted angularly relative to the direct source-to-sensor line seen in 14A and 14B. Angle 627 is denoted "a." In idealized conditions, an increase in "a" may result in a reduction of the observed plume concentration. The concentration in an idealized plume is maximum at the center. In practice, due to turbulence, the plume may be branched, and its cross-section profile may not follow a regular pattern like the one shown in FIG. 14E. FIG. 14E presents an idealized profile of the cross section of the plume as measured by the sensor system 1402. The sensor system 1402 may sample the plume at different angles and register an associated concentration point 1416. When sufficient numbers are obtained, a fit of a point cloud 1418 can be obtained. If the measurements occur in idealized conditions when the wind speed, temperature and other parameters beside wind direction are stable, the plume flux may be calculated using a simple mass conservation equation by multiplying the area concentration of the plume cross section by its normal speed and by estimating the plume concentration in the height direction. This approach may be taken using plume theory for the estimation of the plume geometry and using a mobile sensor across the plume cross section to estimate the average plume concentration.

One illustrative configuration instead uses shifts in wind direction to estimate the plume average concentration as depicted in FIG. 14E. Another more precise configuration is given in the description of the inverse model used to estimate emission source and flux. The wind may change dynamically during transport from the source to the sensor system 1402 as shown in FIG. 14D. FIG. 14D shows a case in which the transport from source to sensor is on average directed as denoted in an average flow direction 1414, but it may have a dynamically tortuous path. Moreover, a wind direction as sensed by the sensor system 1402 is shown as vector 1412. This shows that in a case with dynamic wind or a case in which the topology influences the actual path taken by air flow, the source position may not be given directly by the wind direction measurement at the sensor system or source. This highlights the need to model the air flow in the vicinity of the sensor in order to better understand the transport of the emission from a source to a sensor system when dynamic effects, obstructions, topology, or other factors may influence the transport.

One of the major problems is that air quality monitoring systems are expensive and typically require expertise to operate properly. Real-time air quality monitoring at a finer scale may be cost prohibitive because air quality monitoring instruments can be expensive. Therefore, such problems motivate the minimization of the air quality monitoring setup on site. This is done by removing the air quality monitors which may be redundant and non-contributing. Air quality monitors that may be redundant are identified using a simulation model or a digital twin. The simulation model may be created using output from an air-quality-monitor-minimizing machine learning model. The air-quality-monitor-minimizing machine learning model may be trained using the at least one set of attached parameters sensed by the at least one air quality monitor 202 and the set of SCADA data. By way of an example, as explained earlier, the at least one air quality monitor 202 may include a first air quality monitor positioned at a first location and configured to generate a first set of attached parameters. Similarly, the second set of attached parameters may be generated by the second air quality monitor positioned at the second location. The centralized computing unit 432 may be connected to the first server and may be configured to obtain the at least one set of attached parameters sensed by the at least one air quality monitor 202 and the set of SCADA data to train an air quality monitor-minimization machine-learning model (hereinafter referred as "AQM-minimization machine-learning model"). The AQM-minimization machine-learning model may be configured to generate a trained AQM-minimization parameter. The centralized computing unit 432 may be configured to obtain the trained AQM-minimization parameter and to generate an emission-simulation model of the target substance. Using the emission-simulation model, the at least one set of attached parameters sensed by the at least one air quality monitor 202 and the set of SCADA data may be monitored iteratively over a pre-defined time period. Based on the monitoring of the at least one set of attached parameters sensed by the at least one air quality monitor 202 and the set of SCADA data, the emission-simulation model may be refined to a refined emission-simulation model. The refined emission-simulation model may be analyzed to determine the redundant or non-contributing air quality monitor from the at least one air quality monitor 202. The redundant or non-contributing air quality monitor from the at least one air quality monitor 202 may be removed accordingly.

Figure 15:
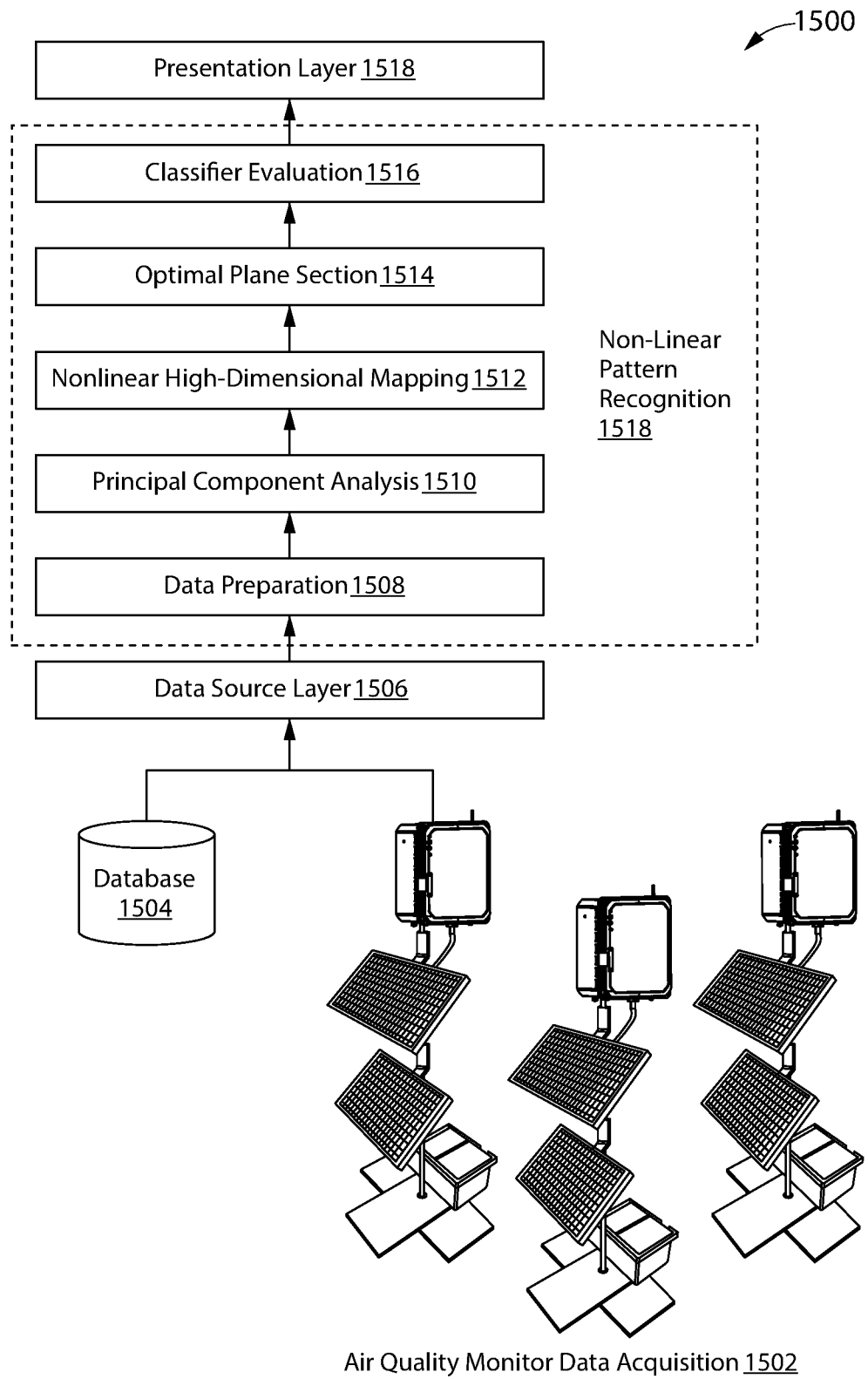
FIG. 15 illustrates a layout of implementation of training the AQM-minimization machine-learning model.

Each of the methods described herein may be performed by hardware, software and/or firmware in accordance with the machine learning process, which may contain computer-executable instructions executed by the central computing unit 432 or an independent processor externally connected to the first server to perform functions relating to the methods described herein or, optionally, in conjunction with other processes. The AQM-minimization machine-learning model may be trained in accordance with pattern recognition of the air quality monitors 202 (using methods adapted from those found in Shi-qi Bao et al., 2016). The training of the pattern recognition model is illustrated by layout 1500 of FIG. 15. The historical data from the air quality monitors 202 may be acquired from the air quality monitor data acquisition 1502, and the set of attached parameters, as well as various other atmospheric characteristics, may be acquired from a database 1504.

The block 1506 illustrates a data source layer which may be configured to source the historical data from air quality monitor data acquisition 1502, the set of attached parameters and a variety of other atmospheric data. Further, the sourced data may be pre-processed in the data preparation layer illustrated by block 1508. The data preparation layer may include the following steps:

Understanding the problem: This step identifies various associated problems for which the machine learning model (in this case the AQM-minimization machine-learning model) may be trained. This step collates all the issues pertaining to redundancy and non-contributing air quality monitors.

Data Collection: The data may be collected from the data source layer. This step may ensure that the data sourced from the data source layer relates to diverse regions in the site and is not solely obtained from a single air quality monitor.

Profiling and Data Exploration: The sourced data may be analyzed to identify trends, outliers, exceptions, incorrect, inconsistent, missing or skewed information, etc. Although source data will provide all model findings, it may contain unseen biases. Data exploration helps to identify problems such as collinearity and to draw attention to situations in which data set standardization or other data transformations might be necessary.

Data Cleaning and Validation: This step may help identify and resolve issues related to inconsistencies, outliers, anomalies, incomplete data, etc. Data cleaned in this step may be analyzed to find valuable patterns and information since it is free from irrelevant data. It is essential to build high-quality models, and missing or incomplete data are the main obstacles.

Data Formatting: This step ensures a proper and consistent data format. Data incorrectly formatted may increase the number of errors generated by the AQM-minimization machine-learning model.

Data Quality Inspection: This step involves an analysis of data quality to identify any redundant data, error or outlier still present in the data.

Feature engineering and selection: Feature engineering is the selection, manipulation and transformation of raw data so as to reveal valuable features or identify the most relevant variables for supervised machine learning. Feature engineering may yield an enhanced predictive model with more accurate predictions. It may involve imputation, the filling in of missing data in the datasets. Feature engineering may further involve encoding, which may convert non-numeric values into numeric form.

Data Splitting: After feature engineering and selection, the data may be split into a training data set and an evaluation data set. Training data may be stored in the database and may be used to train and update the model over a pre-defined period of time. The evaluation data may be further processed using principle component analysis.

The block 1510 may illustrate a principle component analysis layer. Principle Component Analysis (PCA) is an unsupervised learning algorithm that may be used for exploratory data analysis and predictive modeling. The evaluation data from the data preparation layer may be analyzed via PCA to identify high-variance patterns in the dataset. The patterns in the dataset may be further analyzed in a Non-Linear High-dimensional mapping layer illustrated by block 1512. This may be done to record distances between data points in the sourced data so as to retain them during processing. The data may be further analyzed by an optimal plane selection layer illustrated by block 1514. This layer may be configured to optimize the data by resampling and randomly splitting the data points in the dataset so as to prevent bias. Further, the optimized data may be used to evaluate the performance of classifiers in the classifier evaluation layer 1516. The classifier evaluation layer illustrated by block 1516 may include the four metrics accuracy, confusion matrix, AUC-ROC (Area Under the Curve-Receiver Operator Characteristic) and Cross-Entropy Loss. The classifier evaluation layer may be configured to test accuracy, to validate the dataset, to reduce noise and to assess the data.

The block 1518 may illustrate a presentation layer which acquires data from the classifier evaluation layer and uses data from the air quality monitors 202 to determine which of the at least one air quality monitors may not be contributing to the data.

The assessed data may be the trained AQM-minimization parameter. The centralized computing unit 432 may be configured to acquire the trained AQM-minimization parameter to generate an emissions-simulation model which may in turn be a digital twin of real-time emissions and configured to predict the emissions occurring on site. To improve the accuracy of the emission-simulation model, the set of SCADA data and the at least one set of attached parameters may be monitored and updated in the dataset 1504 over a predefined period of time. Based on the monitoring, the emission-simulation model may be refined iteratively to yield a refined emission-simulation model. Further, the refined emissions-simulation model may be configured to generate an emission output prediction. The predicted emissions may be analyzed with the set of SCADA data and the at least one set of attached parameters, and the data may be further analyzed to identify the air quality monitors located in close proximity to the predicted emissions that may be contributing to the data. The air quality monitors which may not be present in the vicinity of the predicted emissions may be flagged as redundant or non-contributing air quality monitors. A decision tree may be deployed with the emission-simulation model and may identify the redundant and non-contributing air quality monitor and remove from consideration such air quality monitors from among the at least one air quality monitors 202.

The present disclosure contemplates systems and methods which may be implemented or controlled by at least one controller so as to perform the actions herein described. For example, in some configurations, the controller, whether part of a sensor, computing device, etc., may be configured to process data from sensors, users or operators or to model, calculate or perform at least one simulation using any of the data sets, tables or maps described. It may also be configured to perform any or all described algorithms and any others similarly suitable or to control the operation of any disclosed parts or components in a manner necessary or appropriate for the proper function, operation and/or performance of any disclosed systems or methods. Examples of such systems and methods are illustrated by U.S. patent application Ser. No. 17/813,585 filed by the same Applicant, which is incorporated herein by reference.

The utilization of the at least one set of attached parameters and the set of SCADA data may not be restricted to only air quality minimization methods. The at least one set of attached parameters and the set of SCADA data may be further utilized to determine the emission location of the target gaseous chemical and to quantify the emission of the target gaseous chemical. The emission location and the quantification of the emission of the target gaseous chemical may be illustrated in detail with reference to FIGS. 16-24.

In an illustrative configuration, the centralized computing unit 432 may be configured to acquire at least one set of attached parameters from the at least one air quality monitor 202, and with the set of SCADA data may be further configured to train an emissions-location machine learning model. The emissions-location machine-learning model may generate a trained emissions-model parameter. The centralized computing unit 432 may be further configured to generate an emissions-simulation model of a plume of the target gaseous chemical using the trained emissions-model parameter. A in the case of an emissions-simulation model, the at least one set of attached parameters and the set of SCADA data may be monitored over a predefined period of time. Using data obtained from the monitoring, the emissions-simulation model may be refined iteratively over a predefined time period to create a refined emissions-simulation model. The refined emissions-simulation model may be analyzed with the set of SCADA data and the at least one set of parameters to locate the sources of emissions in the site.

In an exemplary configuration, the simulation model of an emission plume created by the emissions-location simulation model may be a Gaussian Plume Model. An aspect of the system may use a reduced-order model rather than a full dispersion advection transport model for the simulation of the transport of the trace gas of interest. In particular, Gaussian Plume modeling may be used. The Gaussian plume model uses a Gaussian approximation of the plume geometry to approximate dispersion. The model assumes a flat terrain and a well-mixed dispersion process. The Gaussian Plume is a reduction of a steady state solution to the flow equations for the case of a simple terrain geometry. Therefore, a small number of parameters suffices to describe the model. Such parameters might include the source-to-sensor distance and direction, the wind direction, the height of the source and the height of the sensor. Internal parameters include the dispersion widths in the horizontal and vertical directions through the intermediary of the standard deviation of the Gaussian shape. A simple reduction involves the assumption of identical standard deviations for both vertical and horizontal terms. Some approximation of the dispersion width can be obtained using Pasquel curves that may depend on the atmospheric stability class at the time of transport and the distance between source and sensor. One configuration of the present disclosure directly estimates the stability class and or the dispersion standard deviation using the measured standard deviation of the wind at the sensor location on a time scale corresponding to the time of transport from the sensor to the source. This standard deviation is calculated over many samples using the wind direction change during a period of interest. For example, one might use one sample per second taken over a period of one minute to calculate the wind standard deviation. It is then possible to use the horizontal wind standard deviation to calculate the stability class and to then use this value to calculate the dispersion standard deviation. Alternatively, the standard deviation of horizontal wind can be used to directly approximate the plume dispersion width.

When the internal dispersion terms are obtained, the other inputs such as the trained emission-location simulation model parameter, the set of SCADA data and the average direction of wind during the observation period can be used to solve the Gaussian plume equation. Note that the direct Gaussian plume equation relates the flux at the source to a concentration at a selected point. An inverse Gaussian plume equation permits us to relate the concentration at a point to the flux at the evaluated emission source. Because the position of the source and the measurements at the site setup can be determined, and because wind speed, wind direction and concentration may have been measured continuously, the flux of an emission source may be estimated using the inverse Gaussian equation.

In an illustrative configuration, the centralized computing unit 432 may be configured to acquire at least one set of attached parameters from the at least one air quality monitor 202, and with the set of SCADA data it may further be configured to train an emission-quantification machine learning model. The emission-quantification machine-learning model learning model may generate a trained emission-quantification model parameter. The centralized computing unit 432 may be further configured to use the trained emission-quantification-model parameter to generate an emission-quantification simulation model of a plume of the target gaseous chemical. As in the case of an emissions-simulation and emissions-location model, the at least one set of attached parameters and the set of SCADA data may be monitored over a predefined period of time. Using data from the monitoring, the emission-quantification simulation model parameter may be refined iteratively over a predefined time period to create a refined emission-quantification simulation model. The refined emission-quantification simulation model may be analyzed with the set of SCADA data and the at least one set of parameters so as to locate emission sources and quantify the emissions.

In an illustrative configuration, the emission-quantification machine learning model may be executed by a Quantification Algorithm. The quantification algorithm may be used to quantify and detect leaks through the use of continuously monitored concentration and wind data. There are four major steps in the algorithm: localization, event detection, background calculation, and an analysis of atmospheric stability. The localization step uses the location of the sources and detectors to calculate the probability of a detector seeing an event or leak from each sensor. Emission plumes, for example methane plumes of equivalent size, are compared with the peak events at each sensor. The most probable source will be identified, and the source will collapse if there is no event identified. The probabilities associated with each detector then provide a weighted average of the flux rate at each source.

During event detection, the methane plumes "seen" by the at least one air quality monitors 202 are isolated so that each individual event can be identified. The background calculation involves estimating the background concentration associated with each detector when no event is detected. The background concentration is used as a baseline to determine the significance of an event when there is a spike in methane readings. In the last step, the atmospheric stability is predicted from wind speed and direction to account for the spreading of the plume.

Localization and Atmospheric Stability: The Gaussian plume model is the basis of the quantification algorithm and is the reason for some of the major modeling choices such as the use of a multivariate normal distribution of concentration and a radial basis coordinate system. The effects of wind speed and direction, mixing, and atmospheric stability are accounted for in the Gaussian plume model.

Figure 16:
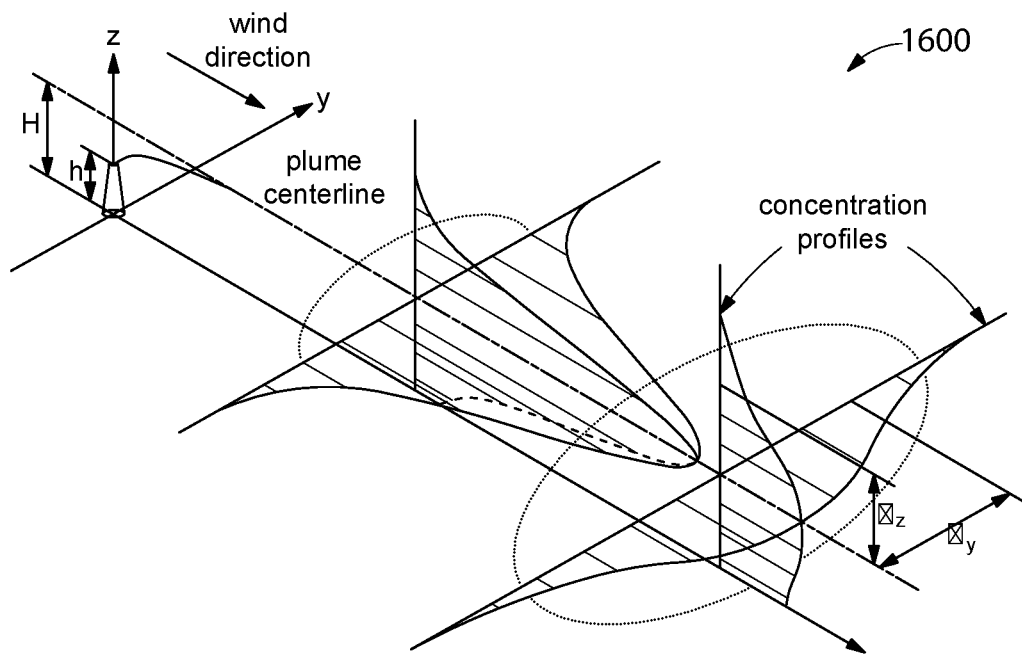
FIG. 16 illustrates an example Gaussian plume model that includes a plume modeled as radially extending with horizontal and vertical spreading.

A representation 1600 of a Gaussian plume model (adapted from J. M. Stockie, 2011) is illustrated in FIG. 16. FIG. 16 depicts a plume of a target gas such as methane modeled as radially extending with horizontal and vertical spread. For an emission rate Q g/s and wind velocity u m/s, the concentration distribution profile known as the Gaussian plume solution associated with data from the at least one air quality monitor 202 at a height of z meters and a source at a height of H meters is provided by the equations $$C(r, y, z) = \frac{Q}{4\pi u r}\exp\left(-\frac{y^2}{4r}\right)\left(\exp\left(-\frac{(z-H)^2}{4r}\right) + \exp\left(-\frac{(z+H)^2}{4r}\right)\right) \quad (2.1)$$

$$r = \frac{1}{2}\sigma^2(x) \quad (2.2)$$

$$\sigma^2(x) = ax^b \quad (2.3)$$

$$x = R\cos(\theta - \theta_0), \text{ and } y = R\sin(\theta - \theta_0). \quad (2.4)$$

In equation (2.1), the first term $Q/4\pi u r$ represents the initial condition or initial flux. The second term $\exp(-y^2/4r)$ represents the spread of the plume away from the y-axis. The third and fourth terms $\exp-(z-H)^2+\exp-(z+H)^2/4r$ represent the change in the plume as a function of height. The parameter G is the standard deviation of the concentration distribution, and r represents its variability. Variables y and z are the Cartesian coordinates while a and b are the diffusion parameters related to the atmospheric stability class. A relationship between the time of day, Pasquill-Gifford stability class and the diffusion parameters can be determined. In equation (2.1), the concentration distribution profile is projected to radial basis coordinates.

A function T dependent on wind direction may be defined using the equations $$T_1 = \frac{1}{2\pi u (aR^b)^2}, \quad (2.5)$$

$$T_2 = \exp\left(-\frac{R^2\sin^2\left(\frac{\pi(\theta - \theta_0)}{180}\right)}{2(aR^b)^2}\right), \quad (2.6)$$

$$T_3 = \exp\left(-\frac{(z-H)^2}{2(aR^b)^2}\right) \text{ and} \quad (2.7)$$

$$T_4 = \exp\left(-\frac{(z+H)^2}{2(aR^b)^2}\right). \quad (2.8)$$

Figure 17:
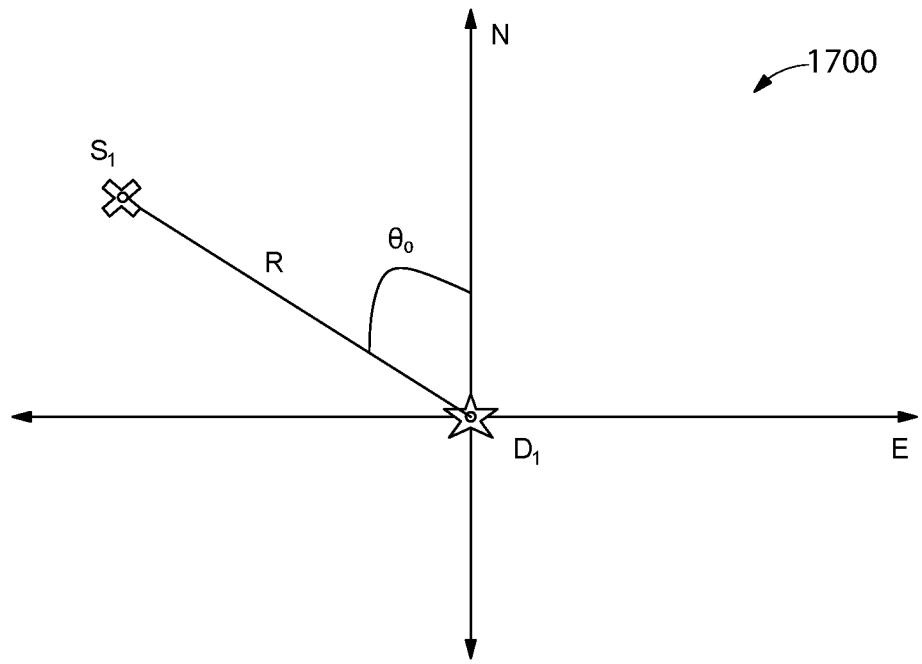
FIG. 17 illustrates a graphical representation illustrating radial distance and angle between a source and a detector.

During localization, there is a probability p(n,m) that a detector n=1, 2, . . . , N can "see" a source m=1, 2, . . . M at a given time. This probability is a function of wind speed and direction. The angle $\theta_0$ and radial distance R between the source and detector are measured, and then the flux from source m is computed using concentration data from detector n. FIG. 17 is a graphical representation 1700 showing radial distance R and angle $\theta_0$ between source S1 and detector D1. The conditional probability is then expressed as $$P(S_m|D_n,t_k)=p(n,m) \text{ for } n=1,2,\ldots,N, m=1,2,\ldots M, k=1,2,\ldots J. \quad (2.9)$$

The probability $P(S_m|D_n,t_k)$ in (2.9) is the probability that source m caused a reading at time $t_k$ at detector n. The probability curves are given for all possible paths of the Gaussian plume in radial coordinates. The input parameter $\theta_0^{n,m}$ represents the angle between the specific source m and detector n. The function T is dependent on wind direction so that $$T(\theta_j^{n,m}) = \frac{T_1 \times T_2(\theta_j^{n,m}) \times (T_3 + T_4)}{\rho_{gas}}, j = 1, 2, \ldots, J \text{ and} \quad (2.10)$$

$$\theta^{n,m} = (-89 + \theta_0^{n,m}, 89 + \theta_0^{n,m}), m = 1, 2, \ldots, M, n = 1, 2, \ldots, N. \quad (2.11)$$

In addition, the condition is set that if $\theta_j^{n,m}>360$ or $\theta_j^{n,m}<0$ then $\theta_j^{n,m}$—is replaced by $\theta_j^{n,m}$ modulo 360.

The next step is to normalize (2.14) at time $t_k$, k=1, 2, . . . ,J given some wind direction $\theta_k^{n,m}$ and wind speed $u_k$. We obtain the expressions $$P(S_m | D_n, t_k) = \left(\hat{T}(\theta_1^{n,m}), \ldots, \hat{T}(\theta_J^{n,m})\right) \text{ at time } t_k \text{ for } k = 1, \quad (2.12)$$

$$2, \ldots, J, m = 1, 2, \ldots, M, \text{ and } n = 1, 2, \ldots, N$$

$$P(B | D_n, t_k) = 1 - \sum_{m=1}^{M} P(S_m | D_n, t_k) \text{ and} \quad (2.13)$$

$$\hat{T}(\theta_i^{n,m}) = \frac{T(\theta_i^{n,m})}{\sum_{j=1}^{J} T(\theta_j^{n,m})}, i = 1, 2, \ldots, J. \quad (2.14)$$

Figure 18:
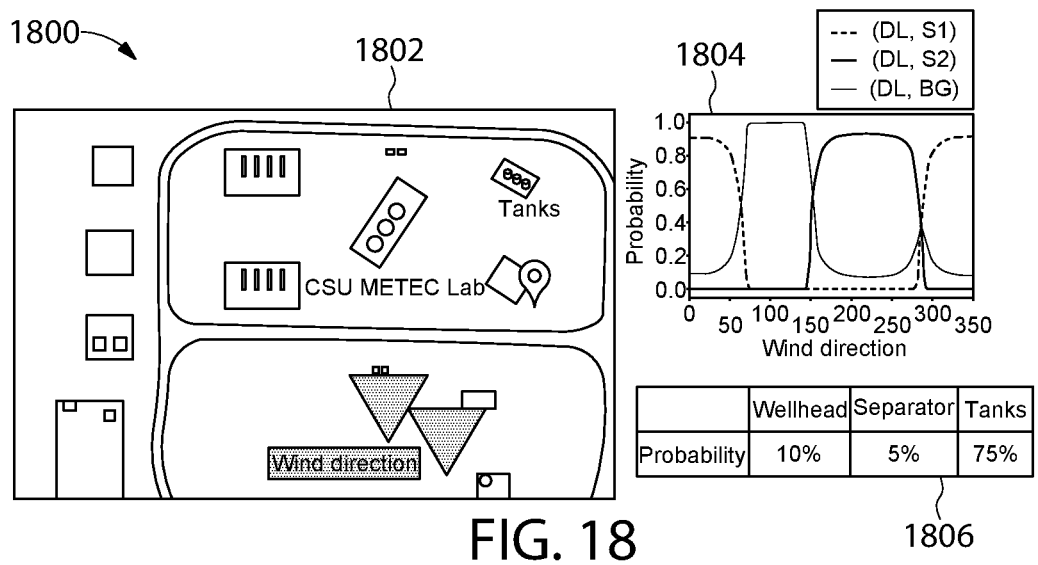
FIG. 18 illustrates an example of analysis performing localization of a site (e.g., Colorado State University's METEC Lab experimental site) with the probability curves given as a function of wind direction.

FIG. 18 shows a schematic representation 1800 of an example of localization for a site 1802 (e.g., Colorado State University's METEC Lab experimental site) with probability curves 1804 given as a function of wind direction and a probability table 1806.

The functions associated with localization and atmospheric stability may compute Radial Gaussians, fluxes, BNL dispersion coefficients, quantities related to geometry or probabilities related to sites.

The next phase of the quantification algorithm uses each set of concentration data to identify events corresponding to the respective detectors. A preliminary analysis considered 1-minute date at 3-minute intervals to see if their concentration peaked. A peak in concentration is analyzed by using the difference formula to approximate the gradient or slope of the concentration curve. If the gradient exceeds a threshold of 0.75, the time period is classified as an "event" with a nonzero flux rate; otherwise, it is classified as "no event" with a negligible flux rate. The start and end times of the event must also be specified. An event is said to start if the change in concentration is greater than some $\delta_t$, and it is said to end when the change is less than $-\delta_t$. In this way, the event is represented as a symmetric curve with the same slope at the beginning and end of the event.

Figure 19:
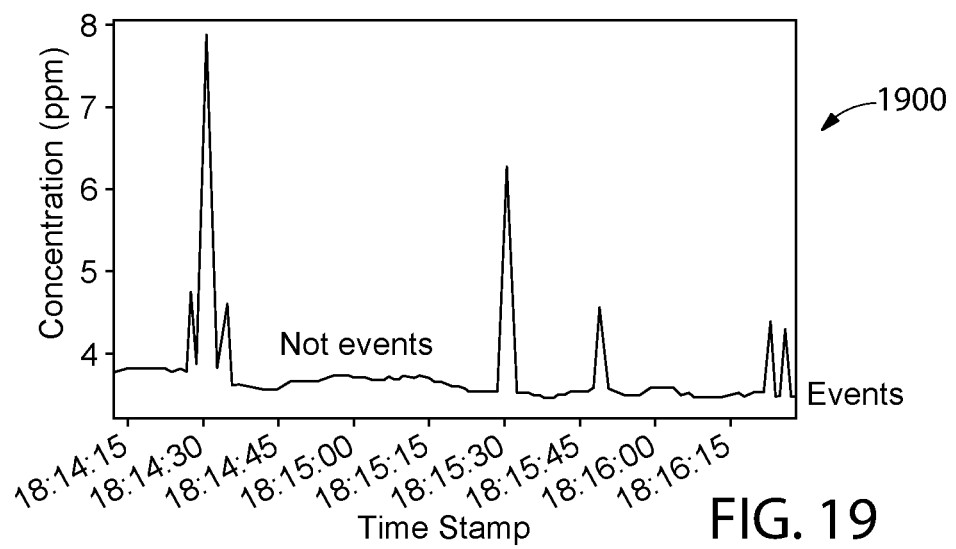
FIG. 19 illustrates a graphical representation illustrating example of five events detected along with background concentration.
Figure 20:
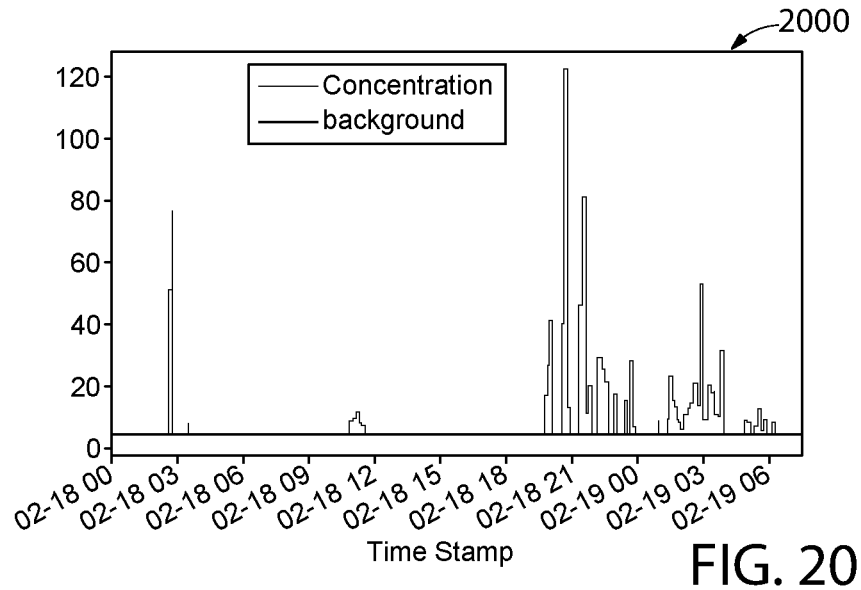
FIG. 20 another a graphical representation illustrating example of five events detected along with background concentration.

The baseline concentration must first be represented by a continuous line. To determine the line, the background concentration is calculated from data corresponding to a wind direction between 25 degrees and $-25$ degrees from $\theta_0$. Data obtained within 15 minutes before or after an event is removed, and then a continuous, 5-minute rolling average is taken. If there is no concentration data moving forward, the backward fill is applied to populate missing values forward in time and forward fill is applied to propagate the last observation forward. The wind speed is filtered so that it cannot drop below 0.5 m/s or exceed 10 m/s. FIGS. 19 and 20 depict five sample events and an example background concentration, respectively.

With reference to FIGS. 19 and 20, graphical representations 1900 and 2000 of results from (a) event detection and (b) background concentration are depicted. The associated functions for event detection and background calculation may be quantify_and_detect_leaks and quantify, respectively.

In some configurations, total hourly flow rate may be determined using either (i) a maximum-probability-based method or (ii) the total weighted average method. For method (i) in (4.1), the total hourly flow rate is calculated as the average of hourly sensor-based flow rates from the most probable source. This average is restricted to sensors with conditional probabilities higher than 75% or to the sensor with the highest probability reading if no other sensor has a probability reading higher than 75%. This method works best if only one source is active and the rest are inactive with negligible or no emission reading. The maximal and minimal flow rates at each sensor are provided if the sensor has a specific flow rate over 75%. For method (ii) in (4.2), the flow rate of each source is given by the weighted average of all partial flow rates. The weights are given by the hourly conditional probabilities associated with each sensor that has probabilities higher than 100/M (100 per million). The flow rate over all sources is then summed to form a total flow rate for sources that have a total probability of leak over 100/M. This method is more efficient at accounting for multiple sources but less so for a single emitting source.

Method (i): $\tilde{Q}_m = Q_m(P_{>0.75}(S_m \mid t_{60})), m = 1, 2, \ldots, M,$ (4.1)

Method (ii): $\tilde{Q} = \sum_{m=1}^{M} P_{>\frac{100}{M}}(S_m \mid t_{60}) Q_m,$ (4.2)

$P(S_m \mid t_{60}) = \dfrac{\sum_{n=1}^{N} C(D_n, T) P(S_m \mid D_n, T)}{\sum_{n=1}^{N} C(D_n, T)}$ (4.3)

METEC Round 2 Testing and Validation Findings and Results of MVP1 Quantification Model: Following a field-testing campaign in a real-world environment at a site (such as the Methane Emissions Technology Evaluation Center (METEC) at Colorado State University), illustrative results from the development, testing and implementation of methods for quantifying methane emissions from oil and gas facilities using sensor nodes and an analytics platform are presented. The analytics platform integrates detector data, meteorological conditions and cloud analytics to detect and quantify methane emissions for remote locations. This first minimum viable product for quantification (MVP1) has been or will be updated with the results from subsequent tests.

An installation illustrative of the present disclosure was used to perform three days of around-the-clock, live methane emissions tests to investigate the diurnal effect on quantification methods. The design of the experiment included a total of forty-four test conditions (experiments) wherein programmed methane releases were introduced from actual natural gas site structures including gas processing units, well heads and storage tank batteries. A total of eight sensor nodes forming a larger sensor network were deployed at the fence line of a 202 ft×280 ft site with a detector-to-source distance ranging from 69 to 212-ft. The duration of each test was 60 minutes, and each test was followed by 15 minutes without methane release to re-establish baseline for the next test. Each test was repeated three times to examine various quantification models and to ensure reproducible, consistent results. Methane release rates ranged from a low of 0.05 to a high of 0.84 g/s, which is a wide range representing average well pad emissions. Wind speed and direction may be measured using ultrasonic wind sensors installed in some of the sensor nodes.

Figure 21:
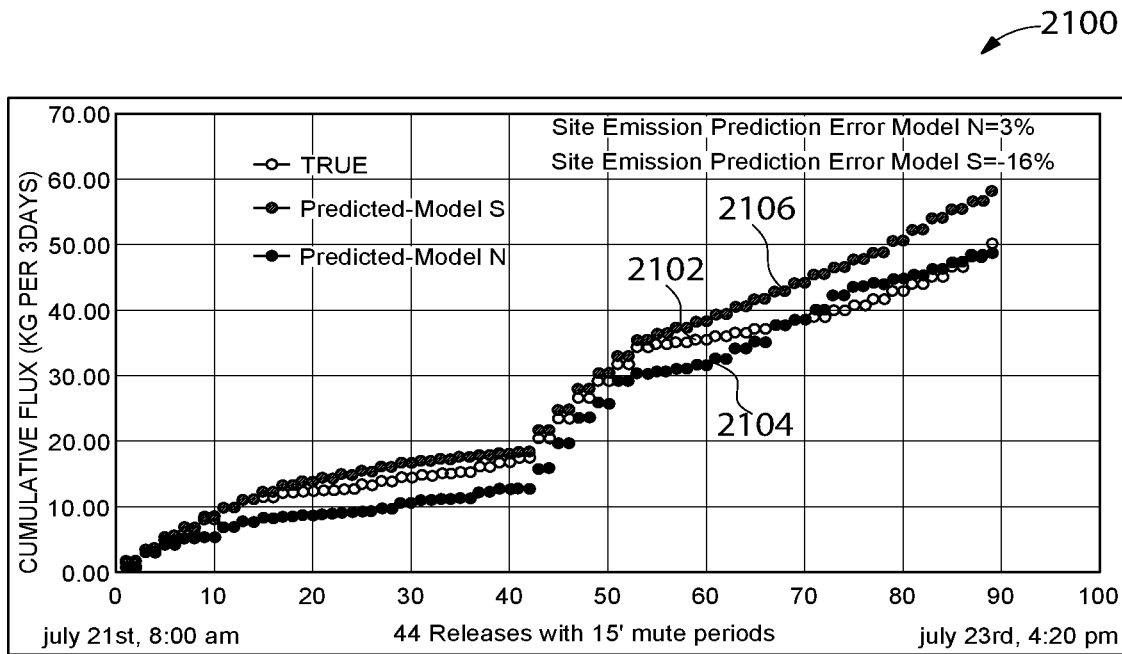
FIG. 21 a graphical representation illustrating example of five events detected along with background concentration.

FIG. 21 illustrates a plot 2100 comparing predicted emission quantifications and the actual quantification at the METEC site over 3 days. The plot 2100 illustrates a plurality of points 2102 for actual quantified emissions flux, a plurality of points 2104 for a predicted model N generated by the quantification algorithm and a plurality of points 2106 for a predicted model S generated by the quantification algorithm. As illustrated, the plurality of points 2106 depicting predicted model S may have a higher deviation with an error of 16% compared to the plurality of points 1604 depicting predicted model N and its error of 3%. Therefore, for the prediction of emissions, the model N may have a higher significance than the model S.

Figure 22:
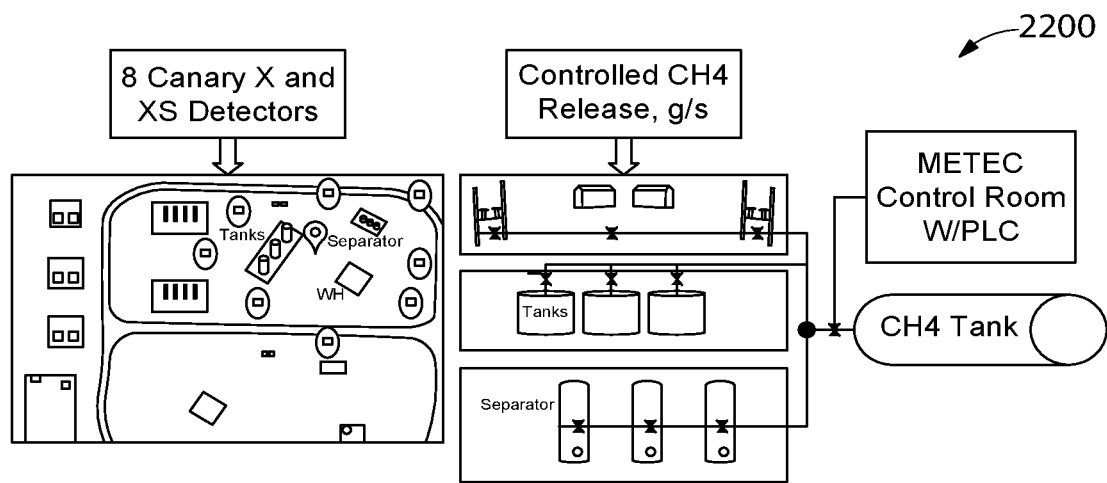
FIG. 22 illustrates a workflow diagram showing a framework of quantification, in accordance with an illustrative configuration of the present disclosure.

FIG. 22 depicts a workflow diagram 2200 that demonstrates a framework for quantification. As shown in the quantification workflow diagram of FIG. 22, as field testing progresses, time series data from individual detectors are streamed to Amazon Web Servers (AWS) in real time. The data may include signals from the sensing element as it responds to local methane concentrations at the location of the detector in addition to wind speed in m/s and wind direction measurements (0 to 360 degrees). Detector data are pushed to AWS for pre-processing before being passed to the developed model for emission rate and source location predictions. When the data is downloaded to local servers, it is passed on to an extraction, transformation and loading (ETL) computation pipeline in preparation for the prediction algorithm. Before being fed into the model, the concentration data (ppm) is augmented by the GPS coordinates of the individual sensors and a single data file corresponding to the timespan (typically one hour) of a given test.

Figure 23:
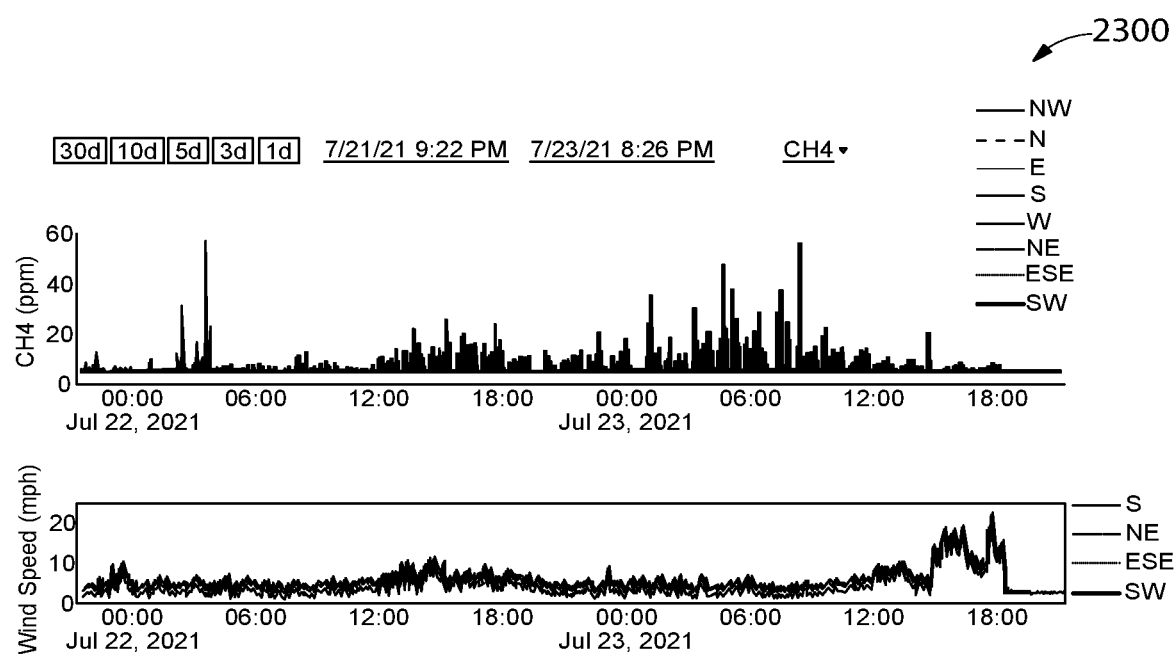
FIG. 23 illustrates an example wind rose diagram defined by a weather data for a site (e.g., METEC site)

Initial detector placement is decided prior to the testing campaign by studying multiple wind rose diagrams created from historical weather station data to identify the most likely dominant wind directions around the test site. The visualization of time series and hourly aggregated statistics about concentration, wind speed and wind direction from all detectors and weather sensors enable the user to assess node engagement, to adjust the experimental setup and, if necessary, to align sensors with the dominant methane dispersion directions as determined by the prevailing wind. FIG. 23 illustrates an example plot 2300 of methane dispersions, i.e., the influence of the wind on methane emissions. As seen in the plot, the quantity of methane detected may be highest between midnight and dawn, especially when the wind speed is at its lowest (between 0 and 10 m/s). Lower wind speeds may account for a lower degree of methane emission dispersion. Further, referring to the plot 2300, it may be seen that higher-speed winds between afternoon and evening may disperse the methane emissions and result in low detection and quantification of the methane gas.

Plume Dispersion Model for Quantification of Methane Emissions: In a real environment, an industrial plume may propagate and diffuse from the moment an emission is released from a point source as shown in FIG. 12. This transport process is the combination of the diffusion (due to turbulent eddy motion) and advection (due to the wind) that define the term "dispersion" (Stockie, 2011). The released contaminant will be transported through the air in an axisymmetric pattern in the idealized case. A method used to model this phenomenon may be derived from the advection-diffusion equation, and it yields a Gaussian distribution profile that decays with distance. A dispersion model is essentially a computational procedure for predicting concentrations downwind of a pollutant source. It is constructed using knowledge of the emissions characteristics (stack exit velocity, plume temperature, stack diameter, etc.), terrain data (surface roughness, local topography, nearby buildings, etc.) and the state of the atmosphere (wind speed, stability, mixing height, etc.) (MacDonald, 2003).

The complexity of the plume source inversion arises from the need to recover information about the source emission rate(s) and the locations using concentration signatures from a few detectors. These emissions are related through a highly nonlinear and high-dimensional turbulent dynamic that pervades the near-surface atmosphere. A number of analytical and approximate solutions for atmospheric dispersion may be derived under a wide range of assumptions, boundary conditions and parameter dependencies. One of these solutions is the Gaussian plume solution, which is an approximate solution for single point-source emissions and is given by $$C(x, y, z) = \frac{Q}{2\pi U \sigma_y \sigma_z} * \exp\left(-\frac{y^2}{2\sigma_y^2}\right) * \left[\exp\left(-\frac{(z-H)^2}{2\sigma_z^2}\right) + \exp\left(-\frac{(z+H)^2}{2\sigma_z^2}\right)\right]$$

where
  s y=S.D. of horizontal distribution of plume concentration=axb (m)
  s z=S.D. of vertical distribution of plume concentration=cxd (m)
  C=Concentration at the detector (kg/m3)
  H=Effective height of emission source (m)
  U=Wind speed along x-axis, assuming invariable with height (m/s)
  Z=Detector height above ground (m).

Data Post-Processing: The plume model outputs may include predicted release rates (or instantaneous fluxes) at each detector. The predicted release rates from each detector may be grouped to form a big sample of flux data called the "population." After obtaining a full time series flux for each detector, bootstrap resampling may be performed to quantify the random errors and provide a confidence range for the statistics reported. The mean flux for each detector may be calculated and added to the population. Further, summary statistics and an estimation of the precision of the reported statistics may be provided by using bootstrap resampling as described immediately below.

As already explained in conjunction with FIGS. 14A-14E, the flux of an emissions plume may be determined upon receipt of a predetermined number of plume samples at a plurality of angles from the plurality of air quality monitors (i.e., sensors systems 1402) installed at the site. Further, an associated concentration point may be registered using data from the plurality of angles. A fit of a point cloud may also be obtained. When the measurements occur under idealized conditions, the plume flux may be calculated using a mass conservation equation by multiplying an area concentration of the plume cross section by its normal speed and by estimating the plume concentration in the height direction. The site parameters may include wind speed, wind direction, temperature and others.

The quantification framework may be applicable to more than one air quality monitors from among the at least one air quality monitors 202. The quantification of the emissions from the each of the air quality monitors 202 may be analyzed with the set of attached parameters associated with each of the respective air quality monitors and the SCADA data in accordance with a rule. The rule may be as elementary as crossing a threshold, or it might be more complicated and derived over time using machine-learning models. The comparison may be done using the centralized computing unit 432 or at a remote location (e.g., the internet/web hosting server). One exemplary aspect is the assessment of a signal-to-noise (SNR) ratio, which may be explained in conjunction with FIG. 24.

Figure 24:
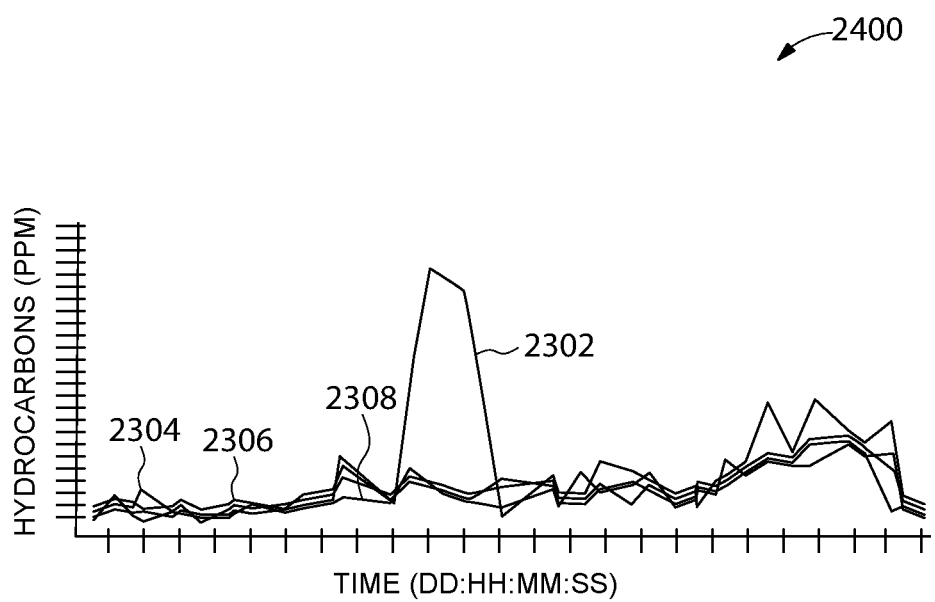
FIG. 24 illustrates a graphical representation of example SNRs associated with different sensors deployed at a site.

FIG. 24 shows a graphical representation 2400 of example SNRs associated with different sensors (air quality monitors 202) at the site. For example, an SNR for the first air quality monitor may be depicted by a curve 2302, an SNR for the second air quality monitor may be depicted by a curve 2304, an SNR for the third air quality monitor may be depicted by a curve 2306 and an SNR for another air quality monitor may be depicted by a curve 2308. Furthermore, a threshold SNR of 0.7 may be selected. With this threshold SNR, the air quality monitors with SNR<0.7 may be considered redundant or non-contributing and hence may be removed from the site.

In one illustrative configuration, a regional atmospheric parameter for the site may be procured from a second server. In some configurations, the regional atmospheric parameter for the site may be the height of a pressure boundary layer (hPRBL). As such, the hPRBL may be procured from the second server, which may be the High Resolution Rapid Refresh (HRRR) model maintained by National Oceanic and Atmospheric Administration (NOAA). As will be appreciated by those skilled in the art, a pressure boundary layer (PRBL)—also known as the atmospheric boundary layer (ABL) or peplosphere—is the lowest part of the atmosphere. The NOAA HRRR model is an improved observation model for land surface that is updated using a combination of satellite, radar, commercial airplane and weather balloon data.

Atmospheric parameters can be interpolated using numerical weather prediction (NWP) models and actual data procured from a variety of observing systems and instruments (e.g., radar, lidar, sonar, remote stations, flight data or satellite images/data). Examples of procured/predicted atmospheric parameters include: time of day, date and physical measurement or indirect calculation of cloud, dew point temperature, wind speed/max-speed/time-average/at-height, height of pressure boundary layer (hPRBL), surface visibility, precipitation types (snow/ice-pellets/freezing-rain/rain), vertical velocity/mean-velocity, surface pressure, best 4-layers lifted index, snow depth, water equivalent accumulated snow depth, temperature, component of wind, component of wind shea low-level/deep-level, surface lifted index, radar reflectivity maximum/composite/echo-top, radar vertically-integrated liquid water, cloud fraction high-level/mid-level/low-level cloud, lightning, storm relative helicity, maximum of updraft helicity over layer 2 to 5 km AGL, maximum updraft/downdraft velocity and total column integrated graupel.

In one illustrative example, the numerical weather-prediction model may be the High Resolution Rapid Refresh (HRRR) model processed/supplied by the National Oceanic and Atmospheric Administration (NOAA). The HRRR is an interval-updated (hourly updated) assimilation and model of atmospheric parameters and weather-related reporting. The HRRR (and other systems) are used for various applications including those related to aviation (and transportation in general), severe weather and energy. Details of the HRRR and other atmospheric modeling are available for download from the International DOI Foundation at haps://doi.org/10.1175/MWR-D-15-0242.1. Depending on deployment location or other factors, other numerical weather prediction models may be utilized alone or in combination. While numerical weather prediction models report/calculate/estimate/provide different atmospheric parameters, one particularly useful atmospheric parameter is the height of pressure boundary layer (hPRBL). Through ongoing research, other variables may be incorporated to improve agreement between predicted and actual results. Data from a zero-hour-analysis data set is procured for each numerical weather prediction NWP model run. (This is done hourly for the HRRR model.) The procured data set may consist of three-dimensional data at, in one example, a three-kilometer per-node resolution.

The HRRR is updated every hour and gives detailed weather forecasts and conditions at a 3-kilometer spatial resolution. The processing power required to create the HRRR is substantial and is met using supercomputers whose main output is available via both web-lookup and presentation. For instance, 95 million data points representing the United States are processed and reported every hour. In addition, various data points can be obtained from the National Weather Service (NWS). These data points may include: total cloud, dew point temperature, wind speed at 10 meters (m) above ground-level, percent of frozen precipitation, total precipitation, precipitable water, height, height of cloud top, lifted condensation level, pressure boundary layer height, model terrain height, surface visibility, categorical precipitation types (snow, ice pellets, freezing rain and rain), wind gust speed, vertical velocity, mean vertical velocity, pressure mean sea level, surface pressure, pressure of level from which parcel was lifted, best 4-layers lifted index, snow depth, Water equivalent accumulated snow depth, temperature, component of wind, component of wind sheaLow Level, component of wind sheaDeep Layer, surface lifted index, radar reflectivity, maximum radar reflectivity, composite radar reflectivity, echo top, radar vertically-integrated liquid water, high-level cloud fraction, mid-level cloud fraction, low-level cloud fraction, lightning, storm relative helicity, maximum of updraft helicity over layer 2 to 5 km above ground level, maximum updraft velocity, maximum downdraft velocity and total column integrated graupel.

As will be further appreciated, the behavior of the pressure boundary layer (PRBL) is directly influenced by its contact with a pressure surface. For example, the PRBL usually responds to changes in surface radiative forcing in an hour or less. In this layer, physical quantities such as flow velocity, temperature and moisture display rapid fluctuations (turbulence), and vertical mixing is strong. It should be noted that above the PRBL is the "free atmosphere" in which the wind is approximately geostrophic (parallel to the isobars) whereas within the PRBL the wind is affected by surface drag and turns across the isobars. The hPRBL therefore signifies the height above sea-level to which the pressure boundary layer (PRBL) exists. The hPRBL has proven useful for monitoring operating emissions at a site. For example, when the hPRBL is at a relatively low elevation, emission accumulate at the site. In some instances, when very low hPRBL and stagnation conditions exist, the concentration level of a compound increases at a constant rate. In other words, for such cases, the time:concentration ratio is constant. Because global average methane levels are about 1.876 parts per million, the nominal leakage from operating devices (e.g. pneumatics operating on well-provided gases that include methane ($CH_4$))can be utilized to establish and/or confirm operating emissions. The height of the pressure boundary layer (hPRBL) is further explained in detail in conjunction with FIGS. 26-29.

As mentioned above, the first measured substance concentration and the first set of individual atmospheric readings (also referred to as on-site atmospheric parameters) may be transmitted to the first server. The on-site atmospheric parameters may include physical measurement or indirect calculation of: wind-speed, wind-direction, air-pressure, air-temperature, humidity, etc. The first measured substance concentration may be in parts per million of the substance such as methane, nitrogen, nitrogen oxides, oxygen, ozone, carbon oxides, argon, sulfur oxides, water vapor, etc. In some configurations, the first measured substance concentration and the first set of individual atmospheric readings may be transmitted by the air quality monitor to the first server at an interval (e.g., 1 second). Further, in some configurations, the first measured substance concentration and the first set of individual atmospheric readings may be averaged prior to transmission to the first server. The averaging may be performed over an averaging-time such as a 1-minute interval. It should be noted that the averaging may be performed to create at least one time-averaged, measured-on-site atmospheric parameter. Some examples of time-averaged, measured-on-site atmospheric parameters include: air temperature, relative humidity, barometric pressure, wind-direction, wind stability class, circular standard deviation of past (e.g., 10 minutes) of wind-direction, current wind-speed, time-average wind-speed (5-minute/10-minute/30-minute), the hPRBL, etc. This averaging may in some situations occur on site at an air quality monitor before transmission. Alternatively, the raw data may be directly transmitted. In both cases, the averaging of the measured-on-site atmospheric parameters may be useful for efficiently utilizing resources such as available energy, transmission capacity/bandwidth, etc. The time-averaged, measured-on-site atmospheric parameters may be transmitted over a cellular network to the first server (e.g., a cloud-attached server such as an Amazon Web Services server) for storage, transformation and/or processing. In one configuration, the raw data associated with the measured-on-site atmospheric parameters may be sent to and stored on a Postgres database (a free and open-source relational database management system emphasizing extensibility and SQL compliance).

Figure 25:
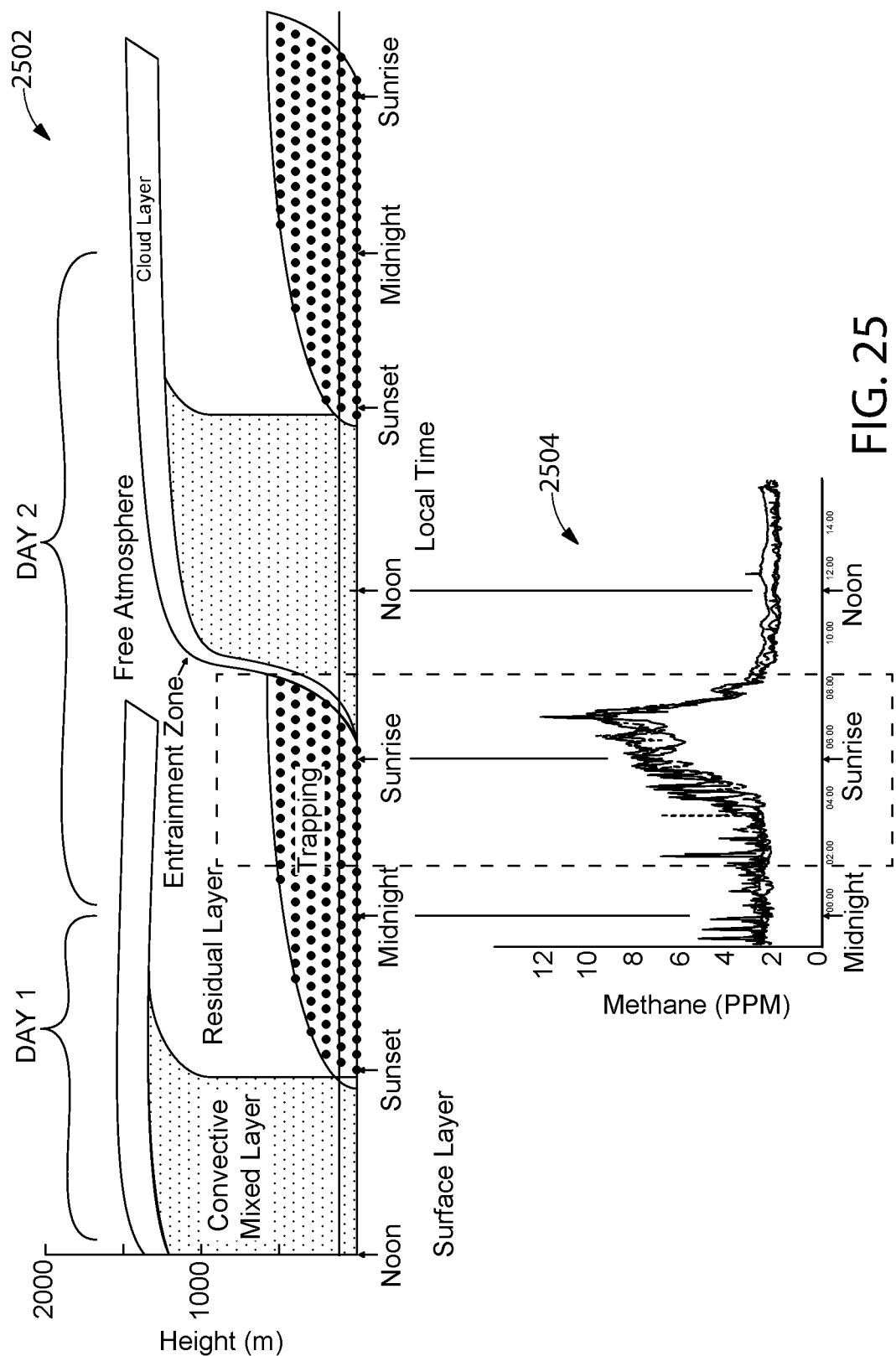
FIG. 25 illustrates a first example graphical representation and a second example graphical representation of a pressure boundary layer (PRBL) for a site, in accordance with some configurations of the present disclosure.
Figure 26:
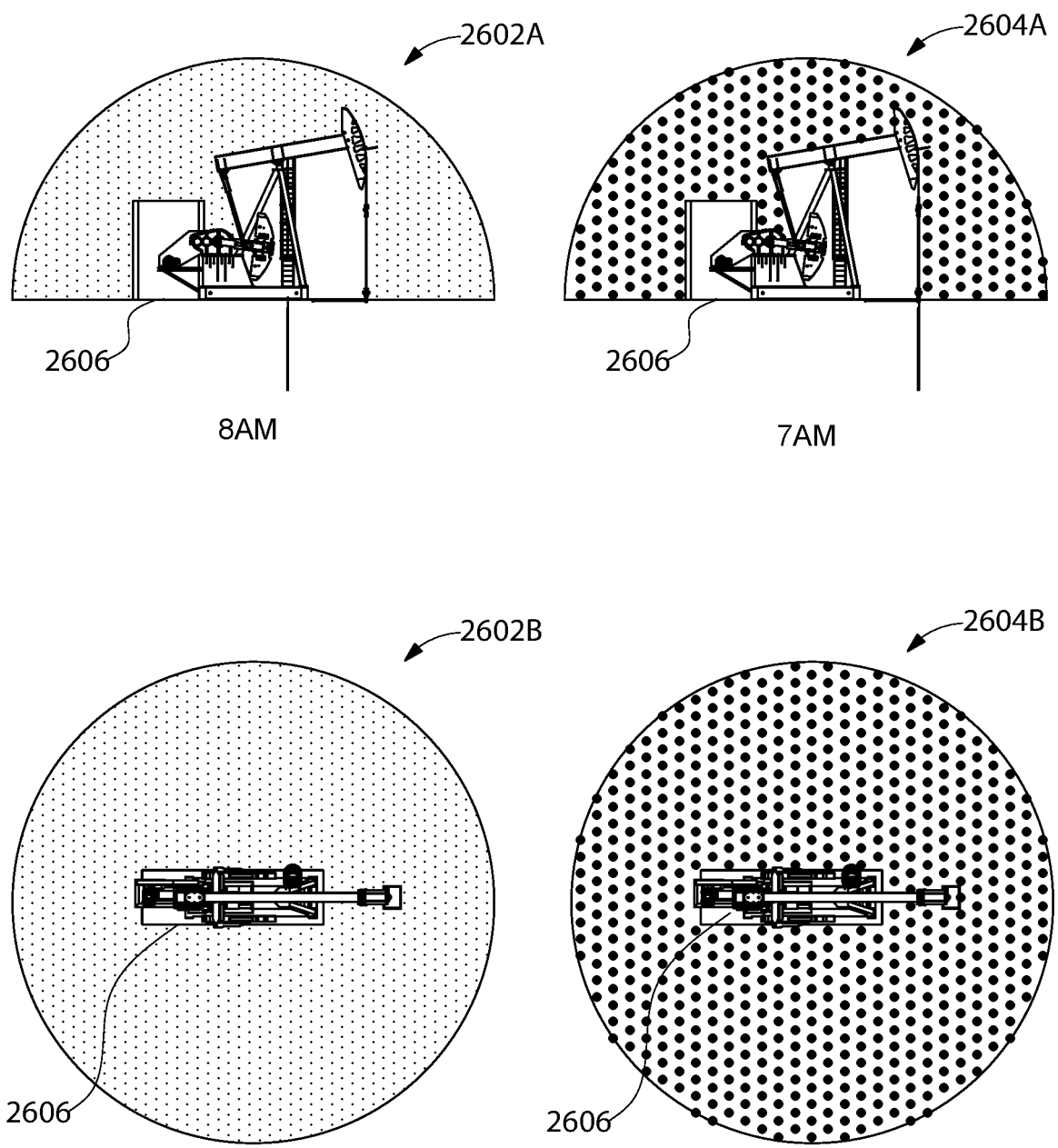
FIGS. 26-27 illustrate two example scenarios (also referred to a trapping conditions) of a consistently leaking emissions source at two different times of the day.

Referring now to FIG. 25, a first example graphical representation 2502 of the pressure boundary layer (PRBL) for a site is illustrated in accordance with some configurations. The first example graphical representation 2502 shows a plot with time-of-day along X-axis and the height of the pressure boundary layer (hPRBL) along y-axis. As can be seen in FIG. 26, the hPRBL varies as the day progresses. For instance, the hPRBL is low between midnight until morning and is relatively higher during the day, i.e., from sunrise until sunset. As will be appreciated, the variation in hPRBL over a 24-hour period is due to the variation in the speed of winds at the site. Since wind speed is relatively higher during the period between the sunrise until sunset, the hPRBL during this period is observed to be higher.

As a result of variation in hPRBL, the concentration of a substance mixed in the atmospheric air (due to emission/ leakage from an emission source present at the site, for example) may also vary. As will be further appreciated, the concentration of the substance may be lower during a period when the average wind speed is high, and the concentration may be higher during a period when the average wind speed period is relatively lower. FIG. 25 shows a second example graphical representation 2504 depicting a graphical plot with substance concentration in the air at the site along the y-axis and time along the x-axis. For example, the substance may be methane (CH4) gas. As shown in the second example graphical representation 2504, during the period between midnight and sunrise, i.e., when the wind speed is low and the hPRBL is also observed to be low, there is a gradual (almost linear) increase in the concentration of the methane (CH4) gas in the atmospheric air surrounding the site. This condition may be referred to as the "trapping condition" and may occur due to wind stagnation. During the emission of the substance from an emission source under the trapping condition, there is a gradual accumulation of the substance in an atmosphere surrounding the site, and there will be a higher first-measured substance concentration of the target substance measured with the first air quality monitor. Therefore, for accurate predictions, it is important to take the trapping condition into consideration. Further, the hPRBL data may indicate a specific time period during a 24-hour period during which such trapping conditions may be observed. As will be appreciated, the measured concentration of the emission under the trapping condition may not provide an accurate representation of the total average emissions since the measured concentration might be higher than the usual measurements owing to the emission trapping or trapping condition. This is further explained in detail in conjunction with FIGS. 26-27.

Figure 27:
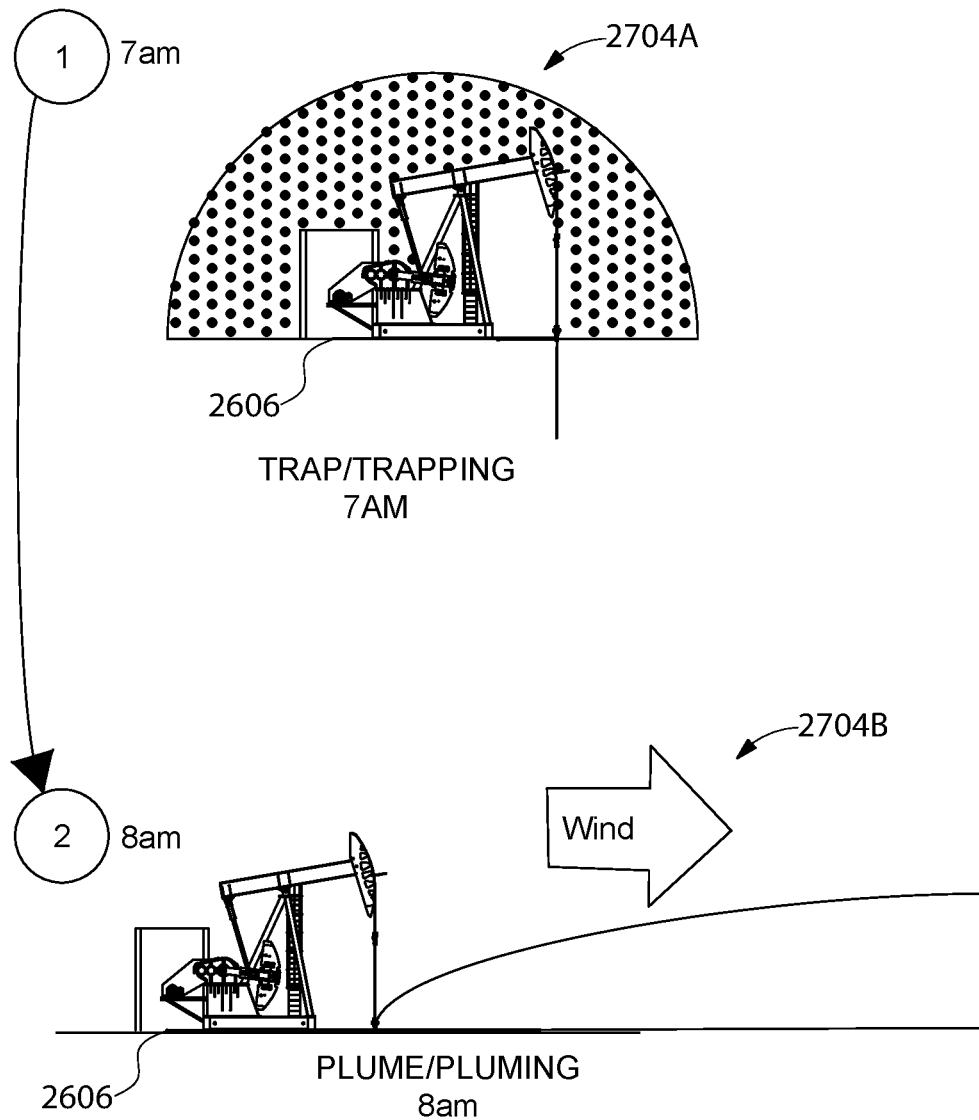

We now refer to an illustrative configuration shown in FIGS. 26-27. Two example scenarios (also referred to as trapping conditions) with a consistently leaking emissions source 2606 at two different times of the day are illustrated. FIG. 26 shows a schematic front view 2602A of the emission source 2606 along with its immediate surroundings and a schematic top view 2602B of the emission source 2606 along with its immediate surroundings at a first time (8 AM) of the day. FIG. 27 further shows a schematic front view 2704A of the emission source 2606 along with its immediate surroundings at a first time (7 AM) and a schematic front view 2704B of the emission source 2606 along with its immediate surroundings at a second time (8 AM) of the day. It should be noted that the hPRBL at the first time (7 AM) of the day is higher than the hPRBL at the second time (8 AM) of the day. This may be due to lower wind speeds at the first time (7 AM) of the day as compared to the second time (8 AM) of the day. As such, the concentration of the substance in the immediate surroundings of the emission source 2606 is lower during the first time (7 AM) as compared to the second time (8 AM). FIG. 27 illustrates a schematic front view 2704A of the emission source 2606 along with its immediate surroundings at the second time (8 AM) and the schematic front view 2704A of the emission source 2606 along with its immediate surrounding at the first time (7 AM) of the day. As can be seen, due to higher wind speeds at the first time (7 AM), the hPRBL is raised. Consequently, the concentration of the substance reduces as compared to the second time (8 AM) of the day.

The height of pressure boundary layer (hPRBL) has proven useful for the monitoring of operating emissions at a site. For example, when the hPRBL is at a relatively low elevation, emission accumulate at the site. In some instances, when very low hPRBL and stagnation conditions exist, the concentration level of a compound increases at a constant rate. In other words, the time:concentration ratio is constant. Because global average methane levels are about 1.876 parts per million, the nominal leakage from operating devices (e.g., pneumatics operating on well-provided gases that include methane) can be utilized to establish and/or confirm operating emissions.

Using the hPRBL effects, the AQM-minimization, emissions-location and emissions-quantification machine-learning models associated with the at least one air quality monitor 202 may be trained and bound accordingly. In other words, trained machine-learning models may carry out the computations associated with reducing the number of air quality monitors, determining the location of an emission source, and quantifying the emissions. The machine-learning models may be trained specifically for each of the at least one air quality monitors provided at the site or may be trained to be specific to the site based on on-site atmospheric parameters and the atmospheric parameters (procured as either raw data or transformed/processed data). By way of an example, the machine-learning models may be based on a gradient tree-boosting algorithm. In particular, the machine-learning models may utilize a FastTreeTweedie algorithm in the ML.NET framework. Alternative machine-learning models such as simple-stress regression models could be used, but the gradient tree-boosting algorithm (decision tree) ensembles may provide better performance and may therefore be preferred. Further, other alternative machine-learning models may include common regression models, linear regression models (e.g., ordinary least squares, gradient descent, regularization), decision trees and tree ensembles (e.g., random forest, bagging, boosting), generalized additive models, support vector machines, artificial neural networks, etc. The machine-learning models may be used to identify the emission sources and also to isolate the correlation between elevated concentrations and atmospheric variables. For example, a machine-learning model configured as a tree-based model with a gradient tree-boosting algorithm may be trained with 10 leaves and 300 trees. The machine-learning model may be trained daily for each air quality monitor on up to 90 days' data. The trained machine-learning models may be used to generate from device measurements a trained AQM-minimization parameter, emissions-location model parameter and the emissions-quantification model parameter for each minute. Using the trained AQM-minimization parameter, emissions-location model parameter and the emissions-quantification model parameter, the corresponding simulation models may be generated and refined iteratively to create refined simulation models as explained in earlier configurations.

Once trained, the machine learning models may be used to obtain AQM-minimization parameters, emissions-location model parameters and the emissions-quantification model parameters. The trained AQM-minimization parameters, emissions-location model parameters and the emissions-quantification model parameters may also include a trained set of atmospheric parameters. The trained set of atmospheric parameters may include a machine-learning-based, measured-substance concentration and a machine-learning-based set of individual atmospheric readings. For example, as explained earlier, an emission-simulation model of a plume may be generated using emissions-location model parameters. The emission-simulation model may generate predicted substance concentrations for a plume in real time or according to an interval (for example, each minute) using the on-site atmospheric measurements at the air quality monitor (AQM) and other procured atmospheric parameters (for example, the variables obtained from hourly-supplied variables by the numerical weather prediction models).

Figure 28:
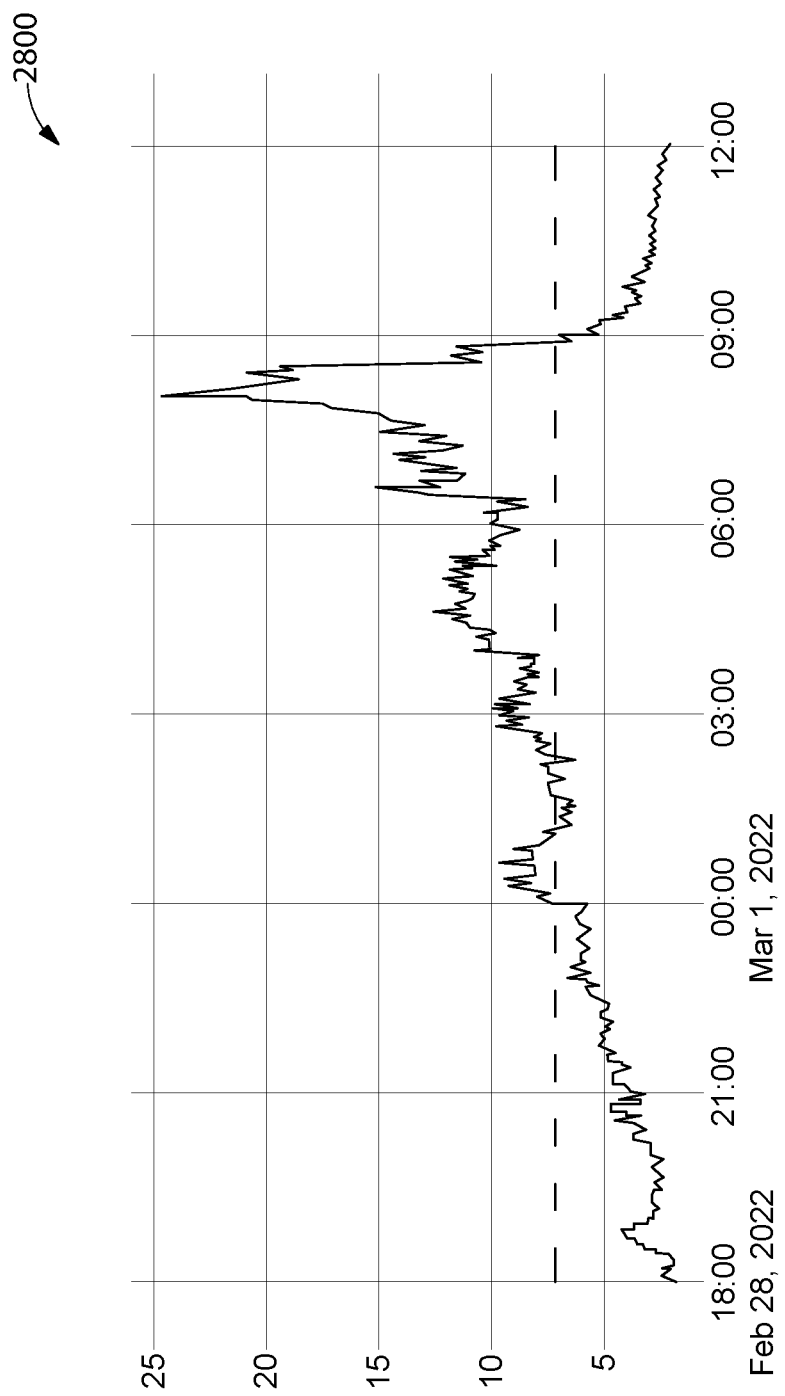
FIG. 28 illustrates a graphical plot of the predicted substance concentrations obtained from the prediction model over a period on a particular day of a year.

FIG. 28 shows a graphical plot 2800 of the first substance concentrations obtained from the emission-simulation model for an exemplary configuration over a period of 18 hours on a particular day of a year (e.g., Feb. 28, 2022). The graphical plot may be generated using the predicted substance concentrations obtained at one-minute intervals from the emission-simulation model. It should be noted that the trained emissions-location model parameters and the emissions-quantification model parameters may be used to generate at least one function. Such functions may give the location of the source of an emission of a target substance, quantifying emissions of the target substance, etc., as will be discussed in detail hereinafter.

Figure 29:
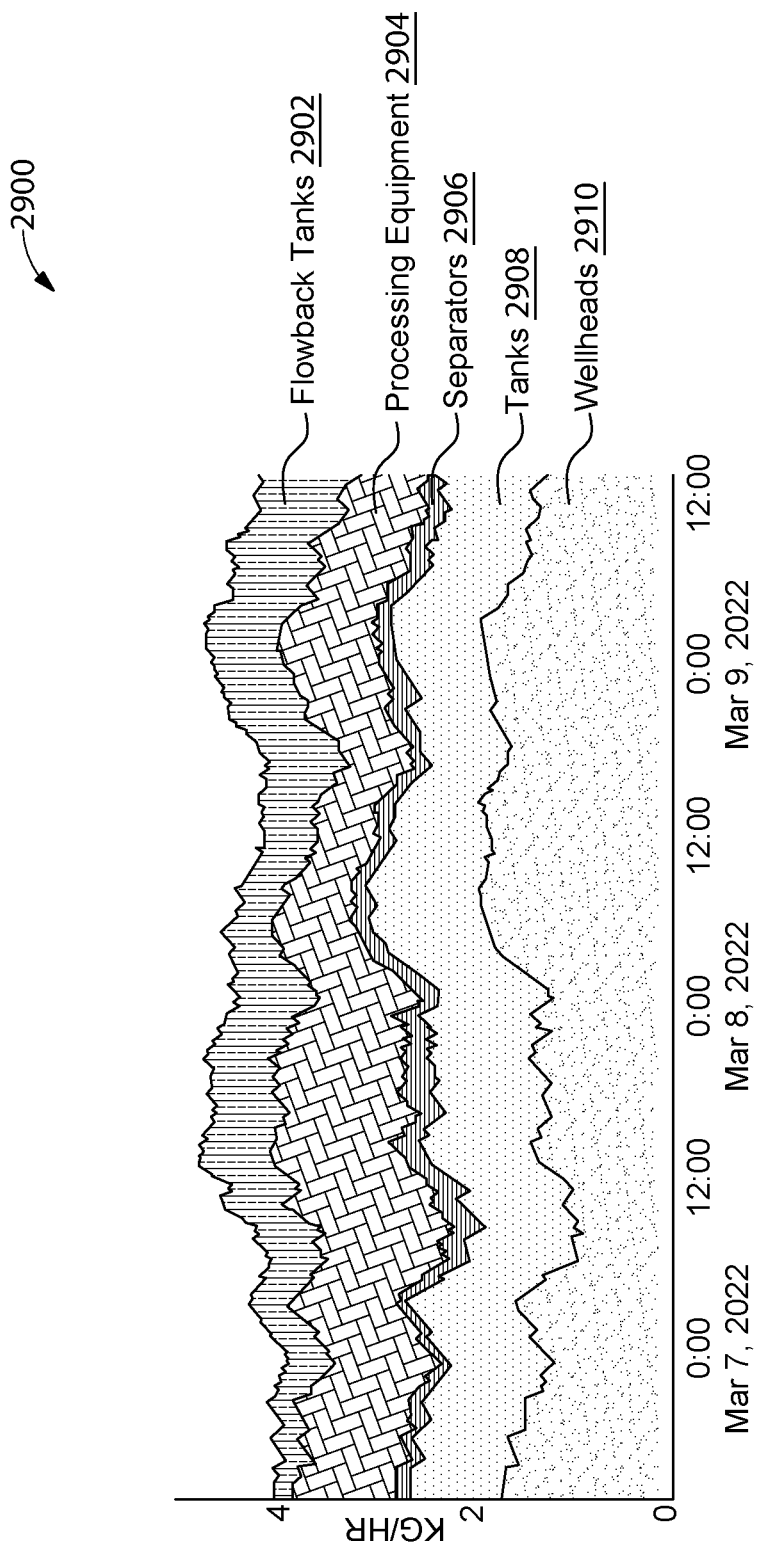
FIG. 29 illustrates another graphical representation of the predicted substance concentrations obtained from the prediction model over a period of time.

As will be understood, the total emissions at a site (e.g., an oil well) may be a combination of operating emissions and fugitive emissions. The operating emissions and fugitive emissions at the site may include emissions from wellheads, tanks, separators, processing equipment, flowback tanks, etc. FIG. 29 depicts another graphical representation 2900 of the predicted substance concentrations obtained from the prediction model over a period of 72 hours (e.g., from Mar. 7, 2022 to Mar. 9, 2022). The graphical representation 2900 may be generated using the predicted substance concentrations obtained at one-minute intervals from the prediction model. Further, the graphical representation 2900 shows the contribution to the overall predicted substance concentrations from each of the different types of emission source. The different types of emission source may include flowback tanks 2902, processing equipment 2904, separators 2906, tanks 2908 and wellheads 2910. Further, as plotted along the y-axis of the graphical representation 2900, the contribution of each of the different types of emission source is represented in kilograms/hour (kg/hr). The on-site emissions are often difficult to ascertain because there are off-site sources such as global atmospheric levels (e.g., 1.9 parts per billion of methane), nearby tanks, nearby wells, passing locomotives, nearby painting facilities, etc. As will be further understood, in most situations, an emissions source generates a plume (largely based on wind—direction and wind speed), and the distribution of the plume is complicated. In order to determine the location of the emission source at the site, at least one air quality monitor may be placed at each of a variety of locations. The at least one air quality monitor measures various on-site atmospheric parameters including the measured-substance concentration of the target substance and a set of individual atmospheric parameters. The set of individual atmospheric readings may include at least one of the following: barometric pressure, air temperature or humidity level.

Figure 30:
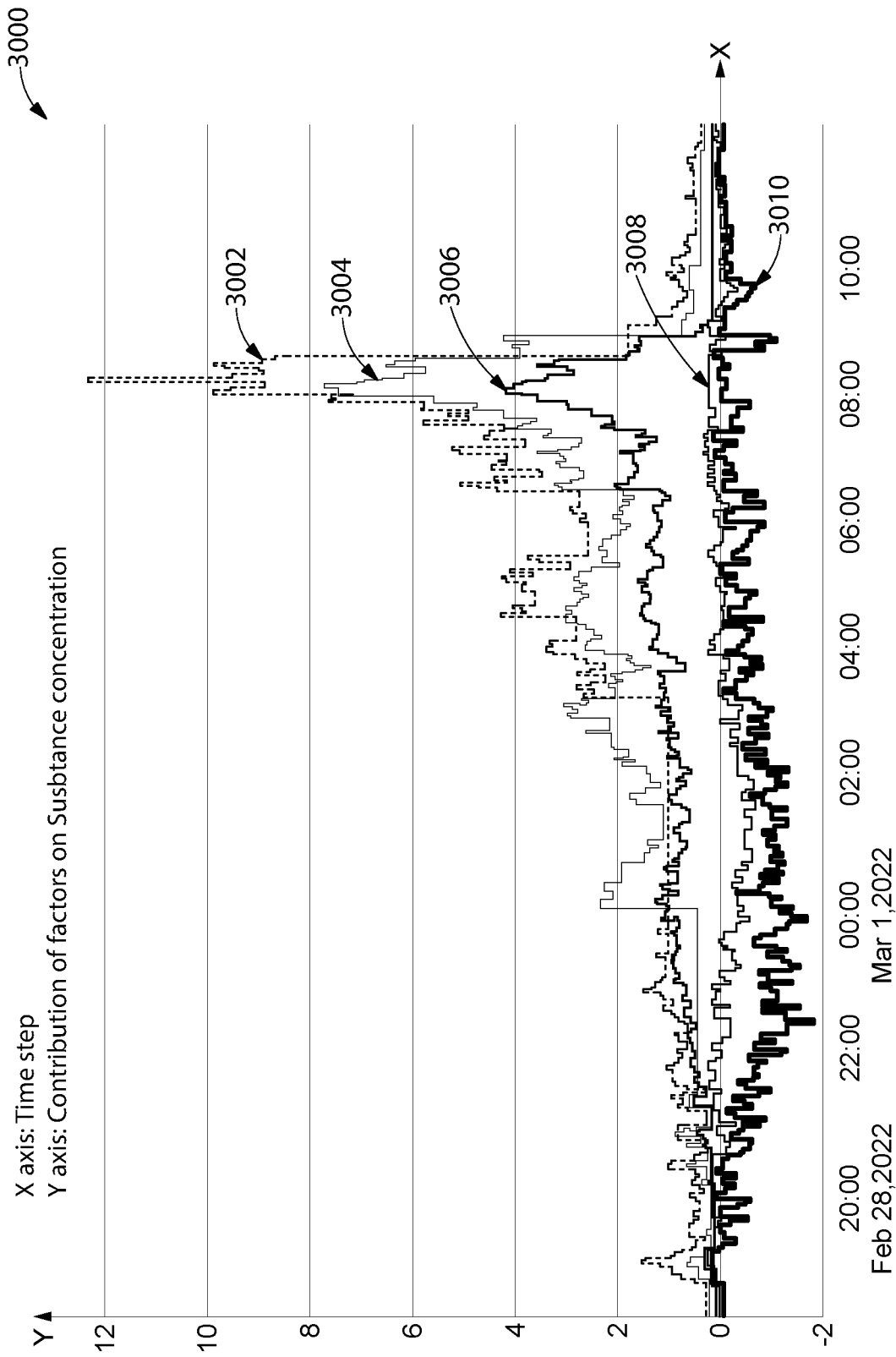
FIG. 30 illustrates a graphical representation of contribution of the six features with respect to time of the day.
Figure 32:
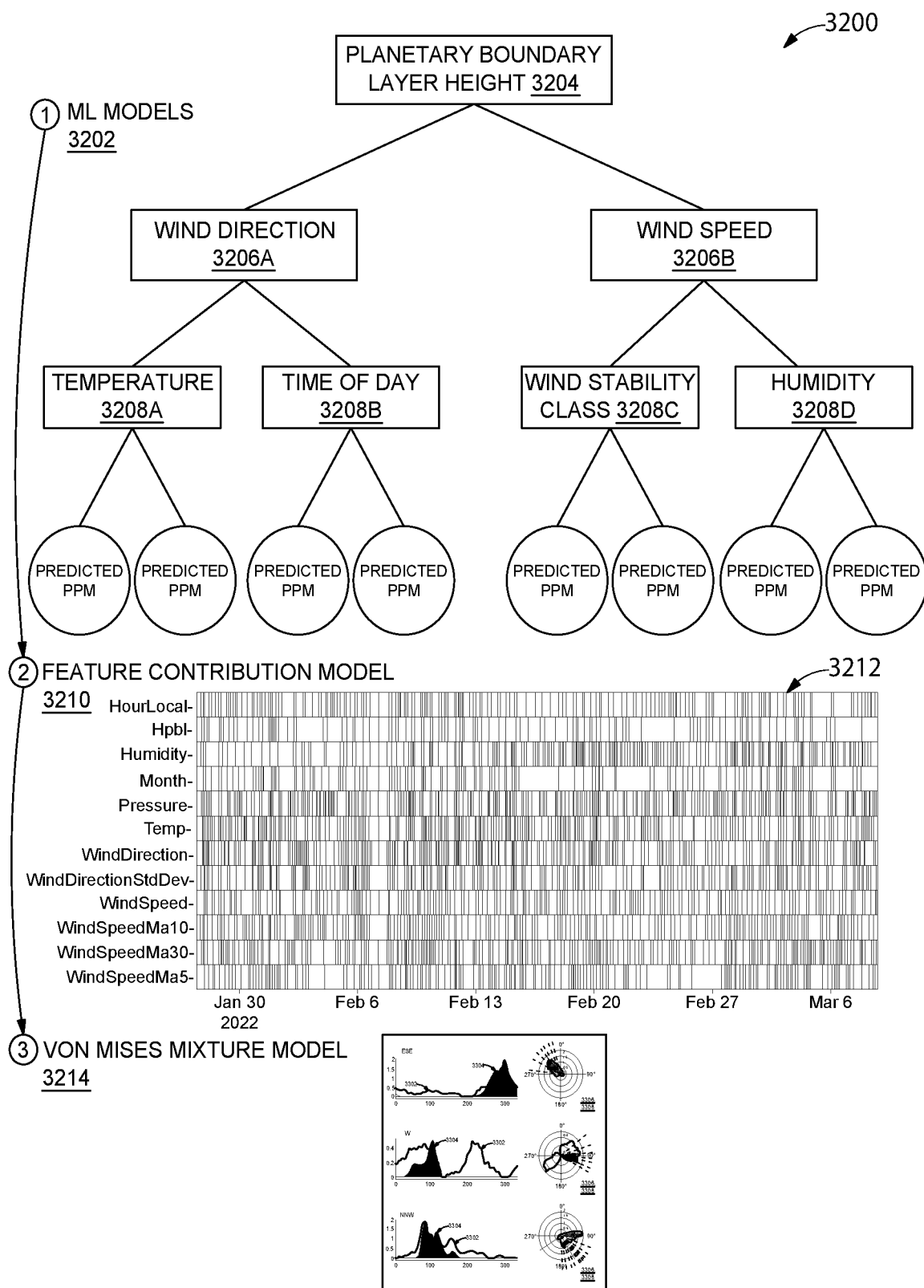
FIG. 32 illustrates a process overview diagram of a process for quantifying emissions of a target substance at a site.

Note that at least one of the atmospheric readings may make some contribution to the plurality of the predicted substance concentrations of the prediction model. For example, FIG. 30 illustrates a graphical representation 3000 of contributions (labeled along the y-axis) from five features with respect to time of the day (x-axis). In FIG. 30, the graphical representation 3002 shows the influence on the substance concentration prediction of the model. Further, the graphical representation 3000 shows contributions from five features at each time step. As can be seen in FIG. 32, some features may make a higher contribution at a given time of day. The five features may include a feature-1 of wind direction (shown by line 3002), a feature-2 of wind speed (shown by line 3004), a feature-3 of barometric pressure (shown by line 3006), a feature-4 of air temperature (shown by line 3008) and a feature-5 of humidity level (shown by line 3010).

As will be further appreciated, isolating wind-direction's effect on the pollutant concentration predictions requires the use of statistical methods when training the regression model. Isolating the effect of wind direction allows one to remove of the effects of ambient atmospheric concentrations of the targeted pollutant, the height pressure boundary layer (hPRBL), wind-speed, temperature, humidity, etc. This can be done without understanding or modeling the phenomena behind atmospheric concentration and/or the effects of hPRBL, wind-speed, temperature, humidity, etc. Instead, the model uses large amounts of data to train the simulation models to accurately predict the measured pollutant concentration from the values of other known parameters. The model then uses the simulation models to determine what portion of the predicted concentrations can be attributed to the wind-direction alone.

For machine-learning regression models configured as tree-based models, the contribution of a feature may be determined by exploring the opposite sub-tree for each decision node containing the given feature, i.e., by comparing the results when making the "wrong" decision at each node containing the feature with the results when making the "right" decision. Some alternative configurations involve fixing values of all-but-one feature and incrementing the wind-direction feature around the full circle, i.e., 360 degrees, thereby generating a new prediction for each wind-direction. The value predicted at the actual measured wind-direction is then compared to the predicted values at all other directions to determine the wind-direction contribution.

Figure 31:
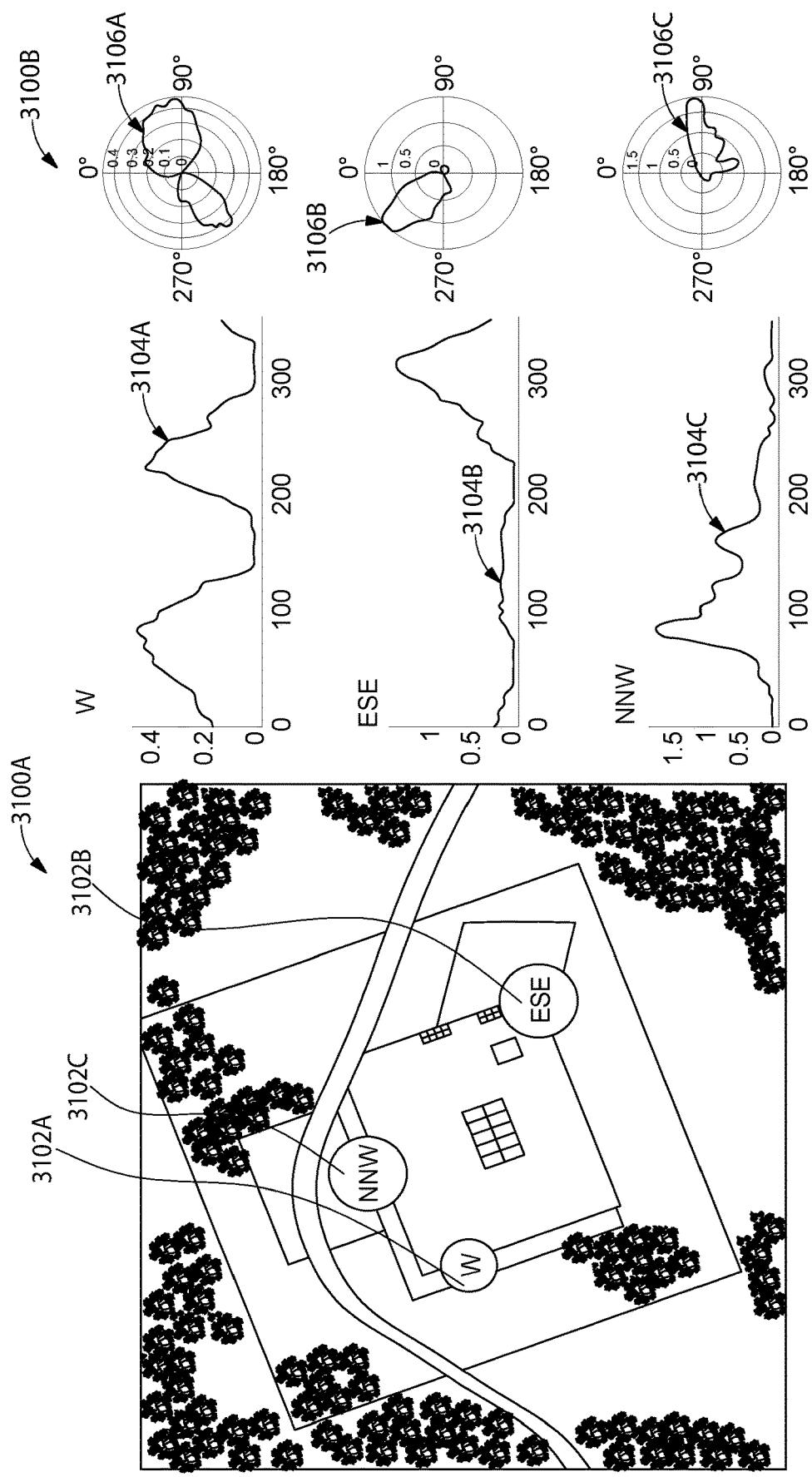
FIG. 31 illustrates a topological view of a site.

FIG. 31 depicts a topological view of a site 3100A in accordance with some configurations and polar plots 3100B indicating weighted means of predicted substance concentrations grouped in a predetermined number of wind-direction buckets. The polar plots indicate a concentration associated with each wind direction bucket from 0 to 360 degrees. As shown in FIG. 31, the site includes three air quality monitors 3102A (W), 3102B (ESE) and 3102C (NNW). Corresponding to each air quality monitor is a line chart showing elevated concentration (ppm) as a function of measurement angle and the associated polar plot. In particular, for the air quality monitor 3102A (W), the line chart 3104A and a polar chart 3106A is shown. For the air quality monitors 3102B (ESE), the line chart 3104 and a polar chart 3106B is shown. For the air quality monitor 3102C (NNW), the line chart 3104C and a polar chart 3106C is shown. The line charts 3104A, 3104B, 3104C and the polar plots 3106A, 3106B, 3106C help visualize the circular distribution of the wind-direction effect.

By way of an example, the emissions-quantification machine learning model may be used to predict the methane concentration for a time period such as the last 10 days. The time period may be selected so as to ensure that data representing the wind blowing in every direction is obtained. Further, the wind-direction contribution value may be calculated for all of the predictions. The wind-direction contribution value may be an amount in parts per million (ppm) that the individual wind-direction affected the predicted ppm. All the predictions may be then grouped into 72 wind buckets (one bucket for every 5 degrees of the full circle's 360 degrees) based on the wind direction from the individual measurements. Further, a weighted Methane Mean may be calculated for each 5-degree bucket. A value function may be defined as: FeatureContribution[WindDirection]+ActualCh4−PredictedCh4. It should be noted that the function may be weighted with a recency bias. If no wind data is available for a specific wind bucket, the missing data may be filled in by interpolating it from the surrounding buckets for which data is available. In this way, for each of three air quality monitors, a weightCh4Mean value associated with a 5-degree wind bucket is obtained. These values are represented in the line charts 3104A, 3104B, 3104C and the polar charts 3106A, 3106B, 3106C.

In some configurations, the plurality of representative circular normal distributions associated with emission sources may be derived from representative Von Mises distributions using the corresponding (Gaussian) plume models. The Von Mises distributions represent linear relationships between the leak flux (the term leak and emission may have been used interchangeable in this disclosure) at a given emission source and the expected measured substance concentration at the air quality monitor. The Von Mises distributions take into account the distance between the leak source and air quality monitor, the angular distance between wind-direction and source-to-device bearing, and the average wind-speed and atmospheric stability class for each wind-direction bin.

Referring now to FIG. 32, a process overview diagram of a process 3200 for quantifying emissions of a target substance at a site is illustrated in accordance with some configurations of the present subject matter. As already explained above, a first set of on-site parameters may be measured with the first air quality monitor over a period of time to obtain a plurality of individual measurements of each. The plurality of individual measurements of the first set of onsite atmospheric parameters may include a first measured substance concentration of the target substance measured with the first air quality monitor and a first set of individual atmospheric readings. The first measured substance concentration and the first set of individual atmospheric readings may be transmitted to the first server. Further, a regional atmospheric parameter for the site such as a height of the pressure boundary layer (hPRBL) may be procured from a second server.

As shown in FIG. 32 at a first step 3202, at least one machine learning model associated with the first air quality monitor may be trained to carry out computations for the quantification method. By way of an example, the machine learning model may be based on a gradient tree-boosting algorithm. A machine learning model may utilize a FastTreeTweedie algorithm in the ML.NET framework. The machine learning models may be used to generate a simulation model which may in turn be used for identifying the emission sources, quantifying the emissions and isolating correlation between elevated concentrations and atmospheric variables. For example, a machine learning model configured as a tree-based model and a gradient tree-boosting algorithm may be trained with 10 leaves and 300 trees. Further, the machine learning model may be a hierarchy-based model. For example, as shown in FIG. 32, a first hierarchy level may include the parameter hPRBL 3204, a second hierarchy level may include the parameters wind direction 3206A and wind speed 3206B, and a third hierarchy level may include the parameters temperature 3208A, time of the day 3208B, wind stability class 3208C and humidity 3208D. Using the simulation model, a plurality of predicted substance concentrations of the target substance corresponding to the first air quality monitor may be obtained using the atmospheric measurements from the air quality monitor (AQM) and other procured atmospheric parameters.

A plot of weighted means of the plurality of predicted substance concentrations grouped in a predetermined number of feature groups may be generated. The predetermined number of feature groups together may be representative of feature values over a predetermined range. In some configurations, each feature group may be associated with a wind-direction bucket. As such, a predetermined number of wind-direction buckets together may be representative of wind-directions over a full circle, i.e., wind-directions over 360 degrees. As such, in some configurations, a plot may be generated depicting the weighted means of the plurality of predicted substance concentrations grouped in a predetermined number of wind-direction buckets together with representative wind-directions that together cover a full circle. The plot may depict various different feature groups including the wind-direction buckets. As will be understood, each feature group may make some contribution to the plurality of the model's predicted substance concentrations. Therefore, at step 3210, the contribution of each of a plurality of parameters to the model's predicted substance concentrations may be calculated and a graphical representation 3212 thereby plotted. For example, the plurality of parameters (as represented on the y-axis of the graphical representation 3212) may include wind speed, wind direction, temperature, pressure, month (i.e., time of the year), humidity, hPRBL and hour (i.e., time of the day). Thus, the graphical representation 3212 of the predicted contributions of the parameters (features) to substance concentration with respect to time of the year (x-axis) may be plotted. As can be seen, some of the parameters (features) may make higher contributions at a particular time of the year/month. By isolating the contribution of each parameter on the predicted pollutant concentration and leveraging statistical methods used in the training of the regression model, the effects of ambient atmospheric concentrations of the targeted pollutant may be removed. The prediction model relies on the statistical analysis of large amounts of data to train the machine learning model to accurately predict the measured pollutant concentration from the values of other known parameters. The prediction model then uses the machine learning model to determine what portion of the predicted concentration can be attributed to only the wind-direction.

The relative contribution of each parameter may be obtained from the machine learning model by the analysis of an opposite sub-tree for each decision node associated with the parameter. For example, assessing the wind-direction contribution may involve varying a value associated with a wind-direction while fixing values associated with the other parameters. Further, assessing the wind-direction contribution may involve obtaining from the simulation model a predicted target substance concentration for each value of wind-direction. Furthermore, assessing the wind-direction contribution may require comparing predicted substance concentrations with measured target substance concentrations and determining the wind-direction contribution by making comparisons.

The contribution of each parameter may be adjusted corresponding to the plurality of predicted substance concentrations by using at least one adjustment factor. The plurality of adjusted contribution values may be grouped into a predetermined number of feature groups. For each of the predetermined feature groups, a weighted mean of the plurality of associated predicted substance concentrations may be determined. Further, a mapping may be generated of the weighted mean of the plurality of predicted substance concentrations grouped in each feature group. Further, for each emission source of the plurality of emission sources in a location map of the site, a simulated plume model may be generated based on the wind-direction. The simulated plume model may depend on the various atmospheric conditions prevailing at the site. Further, for each emission source of the plurality of emission sources, a plurality of representative circular normal distributions may be calculated for each air quality monitor. The plurality of representative circular normal distributions may be calculated using the simulated plume model by setting a plurality of presumed flux values to that obtained from the simulated plume model. For example, the plurality of representative circular normal distributions may be derived from representative Von Mises distributions for all of the plurality of emission sources at the site using the corresponding (Gaussian) plume models.

At step 3414, an analysis may be performed of the plurality of representative circular normal distributions vis-a-vis the mapping to identify a relevant representative circular normal distribution from the at least one representative circular normal distributions. For example, as already explained above, at step 3414, the analysis may be performed of the lines charts corresponding to the circular distribution of the features (e.g., wind-direction) and line graphs depicting the Von Mises distributions. In order to perform the analysis, the line charts and the line graphs are mapped onto each other to identify the most fitting Von Mises representation. This Von Mises representation indicates the target emission source. The distance to the emission source may also be determined using the above analysis and the location map. Further, the total emission of the target substance at the site may be quantified by aggregating the plurality of emission sources.

Figure 33:
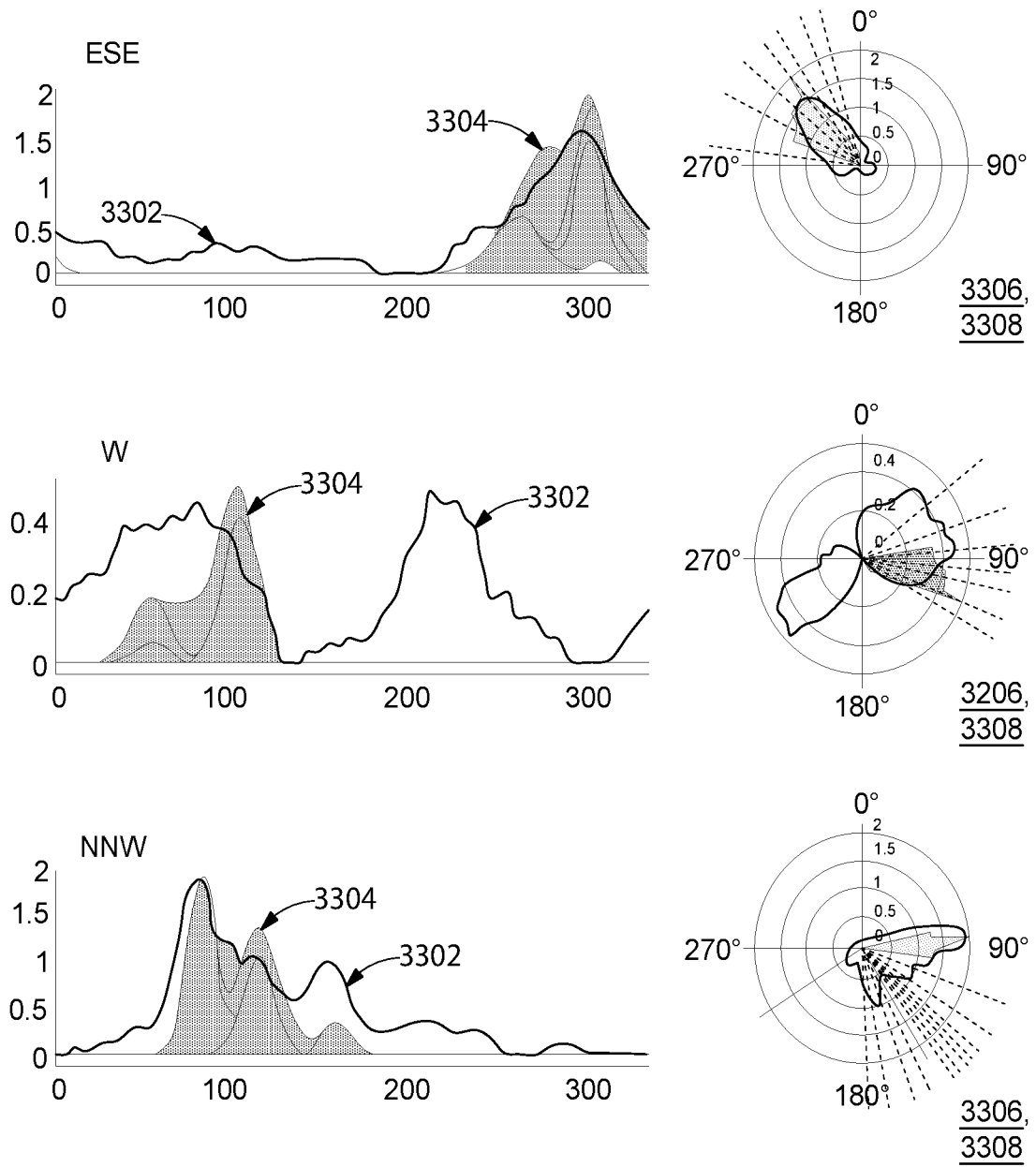
FIG. 33 illustrates a graphical representation of the combination of lines charts and line graphs of the graphical representations of the Von Mises distributions.

In regard to an illustrative configuration, FIG. 33 depicts a graphical representation of the combination 3302 of line charts (corresponding to the line charts 3104A, 3104B, 3104C of FIG. 31) and 3304 of line graphs associated with the graphical representations of the Von Mises distributions (corresponding to the analysis of FIG. 32). FIG. 33 further shows a graphical representation of the combination 3304 of line graphs associated with polar plots (corresponding to the polar charts 3106A, 3106B, 3106C (of FIG. 31)) and polar graphical representations of the Von Mises distributions (corresponding to the analysis of FIG. 31). In order to perform the analysis, the line charts 3302 and the line graphs 3304 may be mapped on to each other to identify the most fitting Von Mises representations with respect to the line charts. The most fitting or relevant Von Mises representations may be identified from among all of the Von Mises representations. In other words, the best fit is identified between the Von Mises representation associated with each emission source and the respective mapping of the weighted means of the plurality of the predicted substance concentrations. This Von Mises representation indicates the target emission source. Referring to FIG. 33, the air quality monitor signal in the NNW direction shows the best fit to its Von Mises representation, which may signify the most accurate identification of the target substance emission source. This analysis may be performed using a plurality (e.g., 1000) of combinations of plumes and adjusting their weights (fluxes) to find the best fit. As such, the simulated plume fluxes may be adjusted across all emission sources to match the elevated concentrations associated with each wind-direction. Alternatively, the heights of the Von Mises representations may be adjusted to fit the line charts.

Figure 34A:
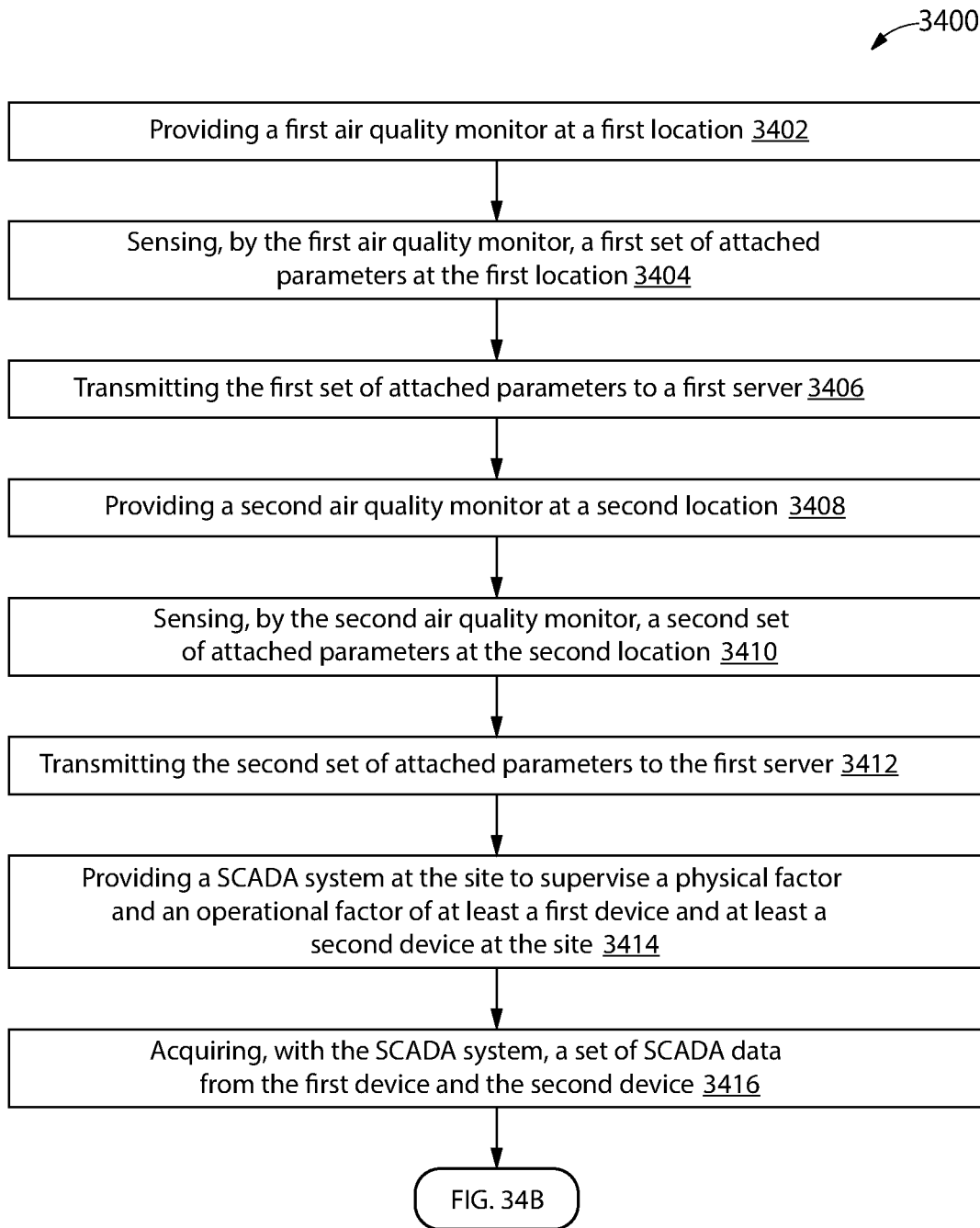

Referring now to FIGS. 34A-34B, an air quality monitor minimization method 3400 for reducing at least one air quality monitor from a site is illustrated in accordance with some configurations of the present subject matter. The air quality monitor minimization method 3400 may be performed using the measurements of target substance concentration from the at least one air quality monitor provided at the site and a set of individual atmospheric readings. The simulation of a plume of the target gas may be generated using a trained machine learning model and may be used to reduce the number of air quality monitors at the site and for the quantification of the total emissions at the site that result from emission/leakage from at least one emissions source present at the site.

At step 3402, a first air quality monitor may be provided. The first air quality monitor may include a first sensor responsive to the target substance and a first location at which the first air quality monitor is located on the site. At step 3404, a first set of attached parameters may be measured with the first air quality monitor over a period of time to obtain a plurality of individual measurements of each parameter of the first set of attached parameters. The plurality of individual measurements of the first set of attached parameters may include a first measured substance concentration of the target substance measured with the first air quality monitor. The plurality of individual measurements of the first set of attached parameters may further include a first set of individual atmospheric readings. The first set of individual atmospheric readings comprises at least one atmospheric reading at the first location selected from the following: a barometric pressure, an air temperature, a humidity level, a wind-direction or a wind-speed. For example, the wind-direction and the wind speed may be obtained from an anemometer provided on the site.

At step 3406, the first set of attached parameters may be transmitted to a first server. At step 3408, a second air quality monitor may be provided. The second air quality monitor may include a first sensor responsive to the target substance and a second location at which the second air quality monitor may be located. At step 3410, a second set of attached parameters may be measured with the second air quality monitor over a period of time to obtain a plurality of individual measurements of each parameter of the second set of attached parameters. At step 3412, the second set of attached parameters may be transmitted to the first server.

At step 3414, a SCADA system 418 may be provided at the site. The SCADA system 418 may be connected to at least one device on the site which may be but is not limited to being a first device that may include pressure sensors and a second device that may include pressure vessels, separators, drills and the like. The SCADA system may be configured to monitor and supervise at the least one device and, preferably, physical factors and operational factors of the at least one device.

At step 3416, a set of SCADA data may be acquired from the at least one device. The set of SCADA data may correspond to historical data on operations of the at least one air quality monitor 202 and the physical factors and operational factors of the at least one device. At step 3418, the set of SCADA data may be transmitted to the first server by the SCADA system 418.

At step 3420, an AQM-minimization machine-learning model may be trained. The AQM-minimization machine-learning model may be a pattern recognition machine learning model, and that model may be configured to identify patterns of emissions occurring in the site. The AQM-minimization machine-learning model may generate a trained AQM-minimization model parameter. The centralized computing unit 432 may be connected to the first server and may be configured to acquire the trained AQM-minimization model parameter. At step 3422, using the trained AQM-minimization, an emission-simulation model may be generated by the centralized computing unit 432. The emission-simulation model may be a digital twin of the real-time emissions occurring on the site and may be configured to predict the emissions in the site.

At step 3424, the first set of attached parameters, the second set of attached parameters and the set of SCADA data may be monitored over a predefined period of time. The centralized computing unit 432 may be configured to monitor the first set of attached parameters, the second set of attached parameters and the set of SCADA data to record any change of emissions occurring in the site. The first set of attached parameters, the second set of attached parameters and the set of SCADA data may be updated based on the monitoring. At step 3426, based on the updated first set of attached parameters, the second set of attached parameters, and the set of SCADA data, the emission-simulation model may be refined iteratively.

At step 3428, the refined emission-simulation model may be analyzed to determine a redundant or non-contributing air quality monitor. The refined emissions-simulation model may be configured to generate an emission output to predict emission in the site. The predicted emissions may be analyzed with the set of SCADA data and the at least one set of attached parameters and may be further tracked to identify the air quality monitors located in close proximity to the predicted emissions. The air quality monitors which may not be present in the vicinity of the predicted emissions may be flagged as redundant or non-contributing air-quality monitors. At step 3430, the redundant or non-contributing air-quality monitors from the first air quality monitor and the second air quality monitor may be removed.

Figure 35:
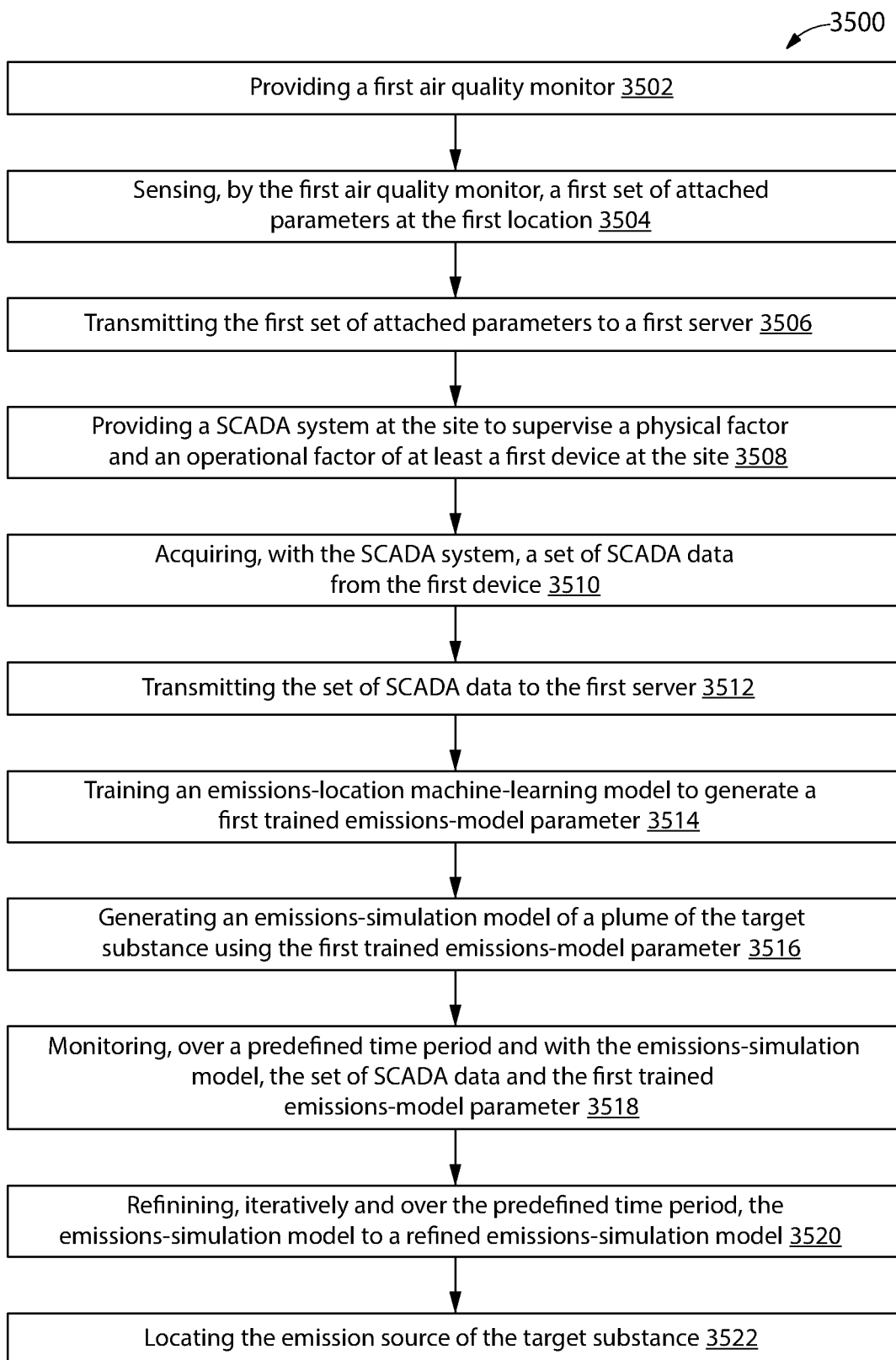
FIG. 35 illustrates a flowchart of emission location method for identifying an emission source of a target substance at the site.

In regard to an illustrative configuration, FIG. 35 depicts a flowchart 3500 for an emission-location method. The emission-location method 3400 may be performed using the target substance concentration measurements from the at least one air quality monitor provided at the site and a set of individual atmospheric readings. The simulation of a plume of the target gas may be generated using a trained machine learning model and may be used to locate emissions at the site.

At step 3502, a first air quality monitor may be provided. The first air quality monitor may include a first sensor responsive to the target substance and a first location at which the first air quality monitor is located on the site. At step 3504, a first set of attached parameters may be measured with the first air quality monitor over a period of time to obtain a plurality of individual measurements of each parameter of the first set of attached parameters. The plurality of individual measurements of the first set of attached parameters may include a first measured substance concentration of the target substance measured with the first air quality monitor. The plurality of individual measurements of the first set of attached parameters may further include a first set of individual atmospheric readings. The first set of individual atmospheric readings comprises at least one atmospheric reading at the first location selected from among: a barometric pressure, an air temperature, a humidity level, a wind-direction, or a wind-speed. For example, the wind-direction and the wind speed may be obtained from an anemometer provided on the site.

At step 3506, the first set of attached parameters may be transmitted to a first server. At step 3508, a SCADA system 418 may be provided at the site. The SCADA system 418 may be connected to at least one device on the site which may be but is not limited to being a first device that may include pressure sensors and a second device that may include pressure vessels, separators, drills, and the like. The SCADA system may be configured to monitor and supervise the at least one device and, preferably, physical factors and operational factors of the at least one device.

At step 3510, a set of SCADA data may be acquired from the at least one device. The set of SCADA data may correspond to historical data on operations of the at least one air quality monitor 202 and the physical factors and operational factors of the at least one device. At step 3512, the set of SCADA data may be transmitted to the first server by the SCADA system 418.

At step 3514, an emissions-location machine learning model may be trained. The centralized computing system 432 connected to the first server may be configured to acquire the first set of attached parameters and the set of SCADA data to train the emissions-location machine learning model. The machine-learning models may be based on a gradient tree-boosting algorithm. In particular, the machine-learning models may utilize a FastTreeTweedie algorithm in the ML.NET framework. Alternative machine learning models such as a simple-stress regression model could be used, but the gradient tree-boosting algorithm (decision tree) ensembles may provide better performance and may therefore be preferred. Further, other alternative machine learning models may include common regression models, linear regression models (e.g., ordinary least squares, gradient descent, regularization), decision trees and tree ensembles (e.g., random forest, bagging, boosting), generalized additive models, support vector machines, artificial neural networks, etc. The output generated from the trained emissions-location machine learning model may be a first trained emissions-model parameter.

At step 3516, using the first trained emissions-model parameter, an emissions-simulation model may be generated. The centralized computing unit 432 may be connected to the first server and may be configured to acquire the trained AQM-minimization model parameter. The emission-simulation model may be a digital twin of the real-time emissions occurring on the site and may be configured to predict the emissions in the site.

At step 3518, the first set of attached parameters, the second set of attached parameters and the set of SCADA data may be monitored over a predefined period of time. The centralized computing unit 432 may be configured to monitor the first set of attached parameters, the second set of attached parameters and the set of SCADA data and to record any change of real-time emissions occurring in the site. Based on the monitoring, the first set of attached parameters, the second set of attached parameters and the set of SCADA data may be updated. At step 3520, based on the updated first set of attached parameters, the second set of attached parameters and the set of SCADA data, the emissions-simulation model may be refined iteratively. At step 3522, the refined emission-simulation model may be analyzed with the set of SCADA data and the first set of attached parameters to determine the location of the emissions.

Figure 36:
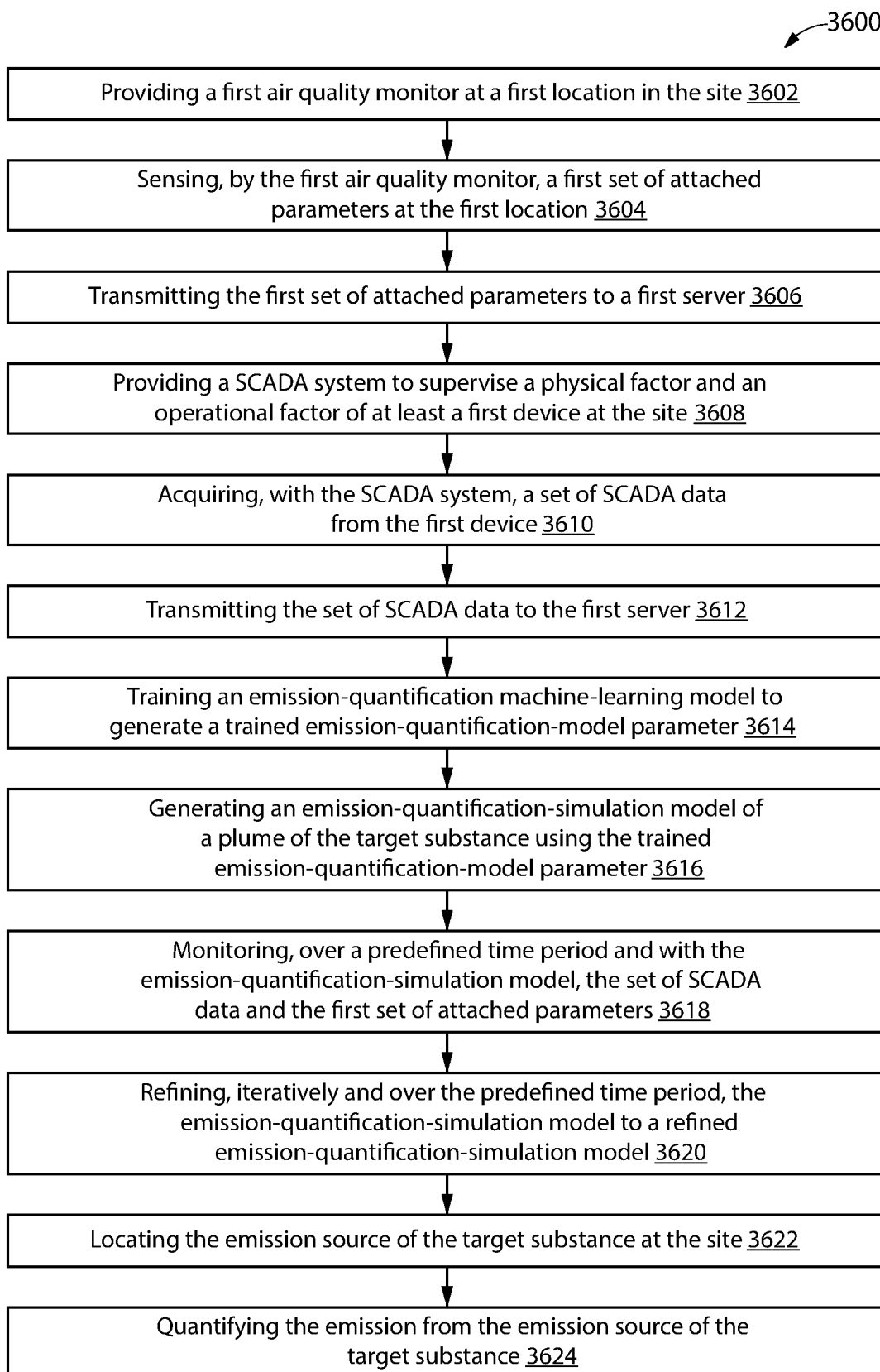
FIG. 36 illustrates a flowchart of emission quantification method for quantifying an emission from an emission source of a target substance at the site.

Referring now to FIG. 36, a flowchart 3600 depicts an operating emissions quantification method for quantifying emissions of a target substance at a site. At step 3602, a first air quality monitor may be provided. The first air quality monitor may include a first sensor responsive to the target substance and a first location at which the first air quality monitor is located on the site. At step 3604, a first set of attached parameters may be measured with the first air quality monitor over a period of time to obtain a plurality of individual measurements of each parameter of the first set of attached parameters. The plurality of individual measurements of the first set of attached parameters may include a first measured substance concentration of the target substance measured with the first air quality monitor. The plurality of individual measurements of the first set of attached parameters may further include a first set of individual atmospheric readings. The first set of individual atmospheric readings comprises at least one atmospheric reading at the first location selected from among a barometric pressure, an air temperature, a humidity level, a wind-direction and a wind-speed. For example, the wind-direction and the wind speed may be obtained from an anemometer provided on the site.

At step 3606, the first set of attached parameters may be transmitted to a first server. At step 3608, a SCADA system 418 may be provided at the site. The SCADA system 418 may be connected to at least one device on the site that may be but is not limited to being a first device that may include pressure sensors and a second device that may include pressure vessels, separators, drills and the like. The SCADA system may be configured to monitor and supervise at the least one device and, preferably, physical factors and operational factors of the at least one device.

At step 3610, a set of SCADA data may be acquired from the at least one device. The set of SCADA data may correspond to historical data on operations of the at least one air quality monitor 202 and the physical factors and operational factors of the at least one device. At step 3612, the set of SCADA data may be transmitted to the first server by the SCADA system 418.

At step 3614, an emissions-quantification machine learning model may be trained. The centralized computing system 432 connected to the first server may be configured to acquire the first set of attached parameters and the set of SCADA data to train the emissions-quantification machine-learning model. The machine-learning models may be based on a gradient tree-boosting algorithm. In particular, the machine-learning models may utilize a FastTreeTweedie algorithm in the ML.NET framework. Alternative machine learning models such as a simple-stress regression model could be used, but the gradient tree-boosting algorithm (decision tree) ensembles may provide better performance and may therefore be preferred. Further, other alternative machine learning models may include common regression models, linear regression models (e.g., ordinary least squares, gradient descent, regularization), decision trees and tree ensembles (e.g., random forest, bagging, boosting), generalized additive models, support vector machines, artificial neural networks, etc. The output generated from the trained emissions-location machine learning model may be a first trained emissions-model parameter.

At step 3616, using the first trained emissions-model parameter, an emissions quantification-simulation model may be generated. The centralized computing unit 432 may be connected to the first server and may be configured to acquire the trained emissions-quantification model parameter so as to train the emission quantification simulation model.

At step 3618, the first set of attached parameters, the second set of attached parameters and the set of SCADA data may be monitored over a predefined period of time. The centralized computing unit 432 may be configured to monitor the first set of attached parameters, the second set of attached parameters and the set of SCADA data to record any change of real-time emissions occurring in the site. Based on the monitoring, the first set of attached parameters, the second set of attached parameters and the set of SCADA data may be updated. At step 3520, based on the updated first set of attached parameters, the second set of attached parameters and the set of SCADA data, the emissions-quantification simulation model may be refined iteratively. At step 3622, the refined emissions-quantification simulation model may be analyzed to determine the location of the emissions. Further, at step 3624, the emissions from the located emissions sources may be quantified based on the refined emission-quantification simulation model, the set of SCADA data and the trained emission-quantification model parameter.

In an alternative configuration, the at least one set of attached parameters, the set of SCADA data, the atmospheric readings and the output from the aforementioned simulation models may be encrypted using blockchain technology. Blockchain technology is an advanced database mechanism that allows transparent information sharing in a network through the use of distributed ledgers. In a process control system for an oil site, a distributed ledger may be maintained by nodes. The nodes may receive transactions, i.e., the sharing of data between field devices such as one or more sensors connected to the compressors, separator units, pumpjacks, controllers, operator workstations or other devices operating within the oil site. In some scenarios, additionally, the transactions may involve process parameter values such as operational factors and physical factors. The transactions may be broadcast to the distributed ledgers.

The recorded process parameter values and product parameter values may then be retrieved to verify the emissions occurring at the site. Additionally, regulatory data may be recorded in the distributed ledger. For example, in response to a triggering event such as an alarm, an error, a leak, a repair event, a process milestone, a corrective action, etc., process control elements such as field devices or controllers may generate transactions that include data from the triggering event such as the time at which the event occurred, the duration of the event, process parameter values for process plant entities involved in the event, product parameter values for products involved in the event, etc. The regulatory data would then be recorded in the distributed ledger so that regulatory agencies can review the data.

The distributed ledgers may be utilized to execute smart contracts. Process control systems can deploy smart contracts to the distributed ledger to exchange value as might be done upon the receipt of quantified emission data. Smart contracts may also be deployed to the distributed ledger to allow machines such as field devices to transact by themselves, i.e., exchange data therebetween without human intervention. For example, according to the terms of a smart contract, a computing device on a first oil site may automatically provide a predetermined token amount to a computing device on a second oil site upon receiving indications from one or more field devices on the first oil site that an emission had been recorded.

By utilizing distributed ledgers on an oil site and, in some scenarios, smart contracts, each process plant or a network of process plants may provide a trusted, secure, and immutable record of transactions within the oil site. The secure, immutable, and trustless nature of distributed ledgers is particularly important for process control systems since cyber intrusions may lead to damage, destruction and/or the loss of not only an at least one device at the site but also the loss of human life. Due to the difficulty of changing the recorded data in the distributed ledgers, the at least one set of attached parameters, the set of SCADA data, the atmospheric readings and the output from the aforementioned simulation model may be encrypted and subsequently decrypted using a unique key which may be available to the systems engaged in the transaction.

In another alternative configuration, at least one maximum power point tracking (MPPT) controller may be included. For example, an MPPT controller may be included in an air quality monitor via a roll-over procedure. In case of a failure of one of the MPPT controllers, one of the MPPT controllers may send a ticket to the operator to replace the failed MPPT controller. Further, in some configurations, the battery voltage may be connected to an interface (input/output (I/O)) pin of a microcontroller to enable transmission of the battery health data to the operator. Moreover, a change in the energy level of the battery may be signaled. For example, if the air quality monitor system is deployed with a signal-booster that has a power status level, the controller could sense the low power status of the battery and therefore decrease or altogether turn off the signal boosting. In some example configurations, a cellular booster may be used. Such boosters may be provided by any of a variety of vendors such as Wilson Electronics, LLC of Cottonwood Heights, Utah, USA.

Specific details are given in the above description to provide a thorough understanding of the configurations. However, it is understood that the configurations may be practiced without these specific details. For example, circuits may be shown in block diagrams in order not to obscure the configurations in unnecessary detail. In other instances, well-known circuits, processes, algorithms, structures and techniques may be shown without unnecessary detail in order to avoid obscuring the configurations.

Also, it is noted that the configurations may be described as a process which is depicted as a flowchart, a flow diagram, a swim diagram, a data flow diagram, a structure diagram or a block diagram. Although a depiction may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in the implementation of the methodologies described herein. For example, software codes may be stored in a memory. Memory may be implemented within the processor or external to the processor. As used herein the term "memory" refers to any type of long term, short term, volatile, nonvolatile or other storage medium and is not to be limited to any particular type of memory, number of memories or type of media upon which memory is stored.

The controllers, computing devices, server devices and other components of systems can include machine-readable media and at least one processor, programmable logic controllers, distributed control systems, secure processors, memory and the like. Secure storage may also be implemented as a secure flash memory, secure serial EEPROM, secure field programmable gate array or secure application-specific integrated circuit. Processors can be standard central processing units or secure processors. Secure processors can be special-purpose processors that can withstand sophisticated attacks that attempt to extract data or programming logic. A secure processor may not have debugging pins that enable an external debugger to monitor the secure processor's execution or registers. In other configurations, the system may employ a secure field programmable gate array, a smartcard or other secure devices. Other types of computing devices can also be used.

Memory can include standard memory, secure memory, or a combination of both memory types. By employing a secure processor and/or secure memory, the system can ensure that both data and instructions are highly secure. Memory can be incorporated into the other components of the controller system and can store computer-executable or processor-executable instructions including routines executed by a programmable computing device. In some configurations, the memory can store programs for preset configurations. Stored programs (e.g., simulation programs, calibration programs, graphic mapping programs, etc.) can be modified by a subject, operator or remote manager to provide flexibility.

The present disclosure contemplates methods, systems, and program products on any machine-readable media for accomplishing various operations. The configurations of the present disclosure may be implemented using existing computer processors or by a special-purpose computer processor for an appropriate system incorporated for this or another purpose or by a hardwired system. Configurations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions. The machine-readable media can be part of sensors, computing devices or other components disclosed herein.

Unless the word "or" is expressly limited to mean only a single item exclusive from the other items in reference to a list of two or more items, then the use of "or" in such a list is to be interpreted as including (a) any single item in the list, (b) all of the items in the list or (c) any combination of the items in the list. The term "comprising" is used throughout to mean including at least the recited feature(s) such that any greater number of the same feature and/or additional types of other features are not precluded. It will also be appreciated that specific configurations have been described herein for purposes of illustration but that various modifications may be made without deviating from the technology. Further, while advantages associated with certain configuration of the technology have been described in the context of those configuration, other configurations may also exhibit such advantages, and not all configurations necessarily need to exhibit such advantages to fall within the scope of the technology. Accordingly, the disclosure and associated technology can encompass other configuration not expressly shown or described herein. In general, in the following claims, the terms used should not be construed to limit the claims to the specific configuration disclosed in the specification and the claims but should be construed to include all possible configuration along with the full scope of equivalents to which such claims are entitled. Accordingly, the claims are not limited by the disclosure.

As used herein, the term 'intermittent' (and related variants such as, for example, 'intermittently') refers to something that happens at irregular or occasional intervals, not continuous or constant. The term can be used in various contexts, such as in telemetry to describe the transmission of data that alternates periods of transmission with radio-silence. Intermittent is often used to describe a characteristic of a system or process that is not consistent or steady, but rather occurs in stops and starts.

Implementation of the techniques, blocks, steps and means described above may be done in various ways. For example, these techniques, blocks, steps and means may be implemented in hardware, software or a combination thereof. For a digital hardware implementation, the processing units may be implemented within at least one application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof. For analog circuits, they can be implemented with discreet components or using monolithic microwave integrated circuit (MMIC), radio frequency integrated circuit (RFIC) and/or micro electro-mechanical systems (MEMS) technologies.

Furthermore, configurations may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded or transmitted via any suitable means including memory sharing, message passing, token passing, network transmission, etc.

The methods, systems, devices, graphs and/or tables discussed herein are examples. Various configurations may omit, substitute or add various procedures or components as appropriate. For instance, in alternative configurations, the methods may be performed in an order different from that described, and/or various stages may be added, omitted and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration and the like encompasses variations of ±20% or ±10%, ±5% or +0.1% from the specified value as such variations are appropriate in the context of the systems, devices, circuits, methods and other implementations described herein. "Substantially" as used herein when referring to a measurable value such as an amount, a temporal duration, a physical attribute (such as frequency) and the like also encompasses variations of ±20% or ±10%, ±5% or +0.1% from the specified value as such variations are appropriate in the context of the systems, devices, circuits, methods and other implementations described herein.

As used herein, including in the claims, "and" as used in a list of items prefaced by "at least one of" or "at least one of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred configurations of the disclosed systems, methods and/or machine-readable media have been described in detail herein, it is to be understood that the inventive concepts may be otherwise variously embodied and employed and that the appended claims are intended to be construed to include such variations except as limited by the prior art. While the principles of the disclosure have been described above in connection with specific apparatuses and methods, it is to be clearly understood that this description is made only by way of example and not as limitation on the scope of the disclosure.

What is claimed is:

1. An emission quantification method for quantifying an emission from an emission source of a target substance at a site, the emission quantification method comprising:
   providing a first air quality monitor comprising:
      a first sensor responsive to an emissions event of the target substance; and
      a first location at which the first air quality monitor is located on the site;
   sensing, by the first air quality monitor, a first set of attached parameters at the first location;
   transmitting the first set of attached parameters to a first server;
   providing a supervisory control and data acquisition system (SCADA system) at the site, the SCADA system configured to:
      supervise a physical factor and an operational factor of at least a first device at the site; and
      acquire the physical factor and the operational factor from the first device at the site;
   acquiring, with the SCADA system, a set of SCADA data from the first device;
   transmitting the set of SCADA data to the first server;
   training a emissions quantification machine learning model with:
      the first server,
      the first set of attached parameters sensed by the first air quality monitor, and
      the set of SCADA data,
      wherein the emissions quantification machine learning model generates a trained emissions quantification model parameter;
   generating an emissions quantification simulation model of a plume of the target substance using the trained emissions quantification model parameter;
   monitoring, over a predefined time period and with the emissions quantification simulation model, the set of SCADA data and the first set of attached parameters;
   refining, iteratively and over the predefined time period, the emissions quantification simulation model based on monitoring to a refined emissions quantification simulation model;
   locating the emission source of the target substance at the site with:
      the refined emissions quantification simulation model,
      the set of SCADA data, and
      the trained emissions quantification model parameter; and
   quantifying the emission from the emission source of the target substance at the site based on the refined emissions quantification simulation model, the set of SCADA data and the trained emissions quantification model parameter.

2. The emission quantification method of claim 1, further comprising:
   providing a second air quality monitor comprising:
      a second sensor responsive to the emissions event of the target substance; and
      a second location at which the second air quality monitor is located on the site;
   sensing, by the second air quality monitor, a second set of attached parameters at the second location;
   transmitting the second set of attached parameters to the first server;
   providing a supervisory control and data acquisition system (SCADA system) at the site, the SCADA system configured to:
      supervise a physical factor and an operational factor of at least a first device and at least a second device at the site; and
      acquire the physical factor and the operational factor from the first device and the second device at the site;
   acquiring, with the SCADA system, a set of SCADA data from the first device and the second device;
   transmitting the set of SCADA data to the first server;
   training an emissions quantification machine learning model with:
      the first server;
      the first set of attached parameters sensed by the first air quality monitor;
      the second set of attached parameters sensed by the second air quality monitor; and
      the set of SCADA data,
      wherein the emissions quantification machine learning model generates a trained emissions quantification model parameter;
   generating an emissions quantification simulation model of a plume of the target substance using the trained emissions quantification model parameter;
   monitoring, over a predefined time period and with the emissions quantification simulation model, the set of SCADA data, the first set of attached parameters and the second set of attached parameters;
   refining, iteratively and over the predefined time period, the emissions quantification simulation model based on monitoring to a refined emissions quantification simulation model;
   locating the emission source of the target substance at the site with:
      the refined emissions quantification simulation model,
      the set of SCADA data, and
      the trained emissions quantification model parameter; and
   quantifying the emission from the emission source of the target substance at the site based on the refined emissions quantification simulation model, the set of SCADA data and the trained emissions quantification model parameter.

3. The emission quantification method of claim 2, further comprising:
   analyzing, using the emissions quantification simulation model, to determine a redundant or non-contributing air quality monitor from the first air quality monitor and the second air quality monitor; and
   reducing one or more of the first air quality monitor and the second air quality monitor, by removing the redundant or non-contributing air quality monitor.

4. The emission quantification method of claim 2, wherein sensing, with the first air quality monitor, the first set of attached parameters comprises:
   sensing, with the first air quality monitor, a substance concentration of the target substance at the first location; and
   sensing, with the first air quality monitor, a set of atmospheric readings,
   wherein training the emissions quantification machine learning model further comprises training with:
      the substance concentration of the target substance at the first location; and
      the set of atmospheric readings.

5. The emission quantification method of claim 4, wherein sensing the set of atmospheric readings comprises:
   sensing at least one atmospheric reading from a set of atmospheric readings comprising:

a barometric pressure,
an air temperature, and
a humidity level.

6. The emission quantification method of claim 2, wherein transmitting at least one of the first set of attached parameters and the second set of attached parameters to the first server further comprises:
increasing a power of transmission, when the first air quality monitor and the second air quality monitor are intermittently transmitting at least one of the first set of attached parameters and the second set of attached parameters to the first server.

7. The emission quantification method of claim 1, wherein training the emissions quantification machine learning model further comprises a set of atmospheric parameters, comprising:
a machine learning based measured substance concentration; and
a machine learning based set of individual atmospheric readings.

8. The emission quantification method of claim 1 and further comprising:
obtaining a location map of a plurality of emission sources at the site, each emission source comprising:
a source location; and
an emissions range;
wherein training the emissions quantification machine learning model is bound by the source location and the emissions range of each emission source.

9. The emission quantification method of claim 1 and further comprising:
procuring a weather prediction model on a second server, wherein the weather prediction model comprises:
height of a pressure boundary layer (a hPRBL);
wherein training the emissions quantification machine learning model further comprises training with:
the hPRBL acquired from the second server.

10. The emission quantification method of claim 9, wherein the second server is High Resolution Rapid Refresh (HRRR) maintained by National Oceanic and Atmospheric Administration (NOAA).

11. An emission quantification system for quantifying an emission source of a target substance at a site, the emission quantification system comprising:
a first air quality monitor comprising:
a first sensor responsive to an emissions event of the target substance; and
a first location at which the first air quality monitor is located on the site;
wherein the first air quality monitor is configured to:
sense a first set of attached parameters at the first location; and
transmit the first set of attached parameters to a first server;
a supervisory control and data acquisition system (SCADA system) installed at the site, the SCADA system configured to:
supervise a physical factor and an operational factor of at least a first device at the site;
acquire the physical factor and the operational factor from the first device at the site;
generate a set of SCADA data from the first device; and
transmit the set of SCADA data to the first server; and a processing unit connected to the first server, configured to:
train an emissions quantification machine learning model with:
the first server;
the first set of attached parameters sensed by the first air quality monitor; and
the set of SCADA data,
wherein the emissions quantification machine learning model generates a trained emissions quantification model parameter;
generate an emissions quantification simulation model of a plume of the target substance using the trained emissions quantification model parameter;
monitor, over a predefined time period and with the emissions quantification simulation model, the set of SCADA data, and the first set of attached parameters;
refine, iteratively and over the predefined time period, the emissions quantification simulation model based on monitoring of the set of SCADA data and the first set of attached parameters to a refined emissions quantification simulation model; and
quantify, the emission source of the target substance at the site based on the refined emissions quantification simulation model, the set of SCADA data and the trained emissions quantification model parameter.

12. The emission quantification system of claim 11, further comprising:
a second air quality monitor comprising:
a second sensor responsive to the emissions event of the target substance; and
a second location at which the second air quality monitor is located on the site,
wherein the second air quality monitor is configured to:
sense a second set of attached parameters at the second location; and
transmit the second set of attached parameters to the first server;
a supervisory control and data acquisition system (SCADA system) at the site, the SCADA system configured to:
supervise a physical factor and an operational factor of at least a first device and at least a second device at the site;
acquire the physical factor and the operational factor from the first device and the second device at the site; and
acquire a set of SCADA data from the first device and the second device;
wherein the SCADA system is configured to transmit the set of SCADA data to the first server; and
a processing unit connected to the first server, configured to:
train an emissions quantification machine learning model with:
the first server;
the first set of attached parameters sensed by the first air quality monitor;
the second set of attached parameters sensed by the second air quality monitor; and
the set of SCADA data,
wherein the emissions quantification machine learning model generates a trained emissions quantification model parameter;
generate an emissions quantification simulation model of a plume of the target substance using the trained emissions quantification model parameter;
monitor, over a predefined time period and with the emissions quantification simulation model, the set of SCADA data, the first set of attached parameters and the second set of attached parameters;

refine, iteratively and over the predefined time period, the emissions quantification simulation model based on monitoring of the set of SCADA data, the first set of attached parameters and the second set of attached parameters to a refined emissions quantification simulation model; and locate the emission source of the target substance at the site with:
  the refined emissions quantification simulation model,
  the set of SCADA data, and
  the trained emissions quantification model parameter.

13. The emission quantification system of claim 12, wherein the processing unit is further configured to:

analyze, using the emissions quantification simulation model, to determine a redundant or non-contributing air quality monitor from the first air quality monitor and the second air quality monitor; and reduce, one or more of the first air quality monitor and the second air quality monitor, by removing the redundant or non-contributing air quality monitor.

14. The emission quantification system of claim 12, wherein the second air quality monitor is configured to sense the second set of attached parameters, wherein the second set of attached parameters comprises:
  a substance concentration of the target substance at the second location; and
  a set of atmospheric readings,
  wherein training the emissions quantification machine learning model further comprises training with:
    the substance concentration of the target substance at the second location; and
    the set of atmospheric readings.

15. The emission quantification system of claim 14, wherein the set of atmospheric readings comprises:
  at least one atmospheric reading from a set of atmospheric readings comprising:
  a barometric pressure,
  an air temperature, and
  a humidity level.

16. The emission quantification system of claim 12, wherein the first air quality monitor and the second air quality monitor are configured to:
  increase a power of transmission, when the first air quality monitor and the second air quality monitor are configured to transfer, intermittently, the first set of attached parameters and the second set of attached parameters to the first server.

17. The emission quantification system of claim 12, wherein the first air quality monitor is configured to sense the first set of attached parameters, wherein the first set of attached parameters comprises:
  a substance concentration of the target substance at the first location; and
  a set of atmospheric readings,
  wherein the emissions quantification machine learning model is further trained with:
    the substance concentration of the target substance at the first location; and
    the set of atmospheric readings.

18. The emission quantification system of claim 17, wherein the set of atmospheric readings comprises:
  at least one atmospheric reading from a set of atmospheric readings comprising:
  a barometric pressure,
  an air temperature, and
  a humidity level.

19. The emission quantification system of claim 11, wherein training the emissions quantification machine learning model further comprises a set of atmospheric parameters, wherein the set of atmospheric parameters comprises:
  a machine learning based measured substance concentration; and
  a machine learning based set of individual atmospheric readings.

20. The emission quantification system of claim 11, wherein the processing unit is further configured to:
  obtain a location map of a plurality of emission sources at the site, each emission source comprising:
    a source location; and
    an emissions range;
    wherein the emissions quantification machine learning model is trained, and bound by the source location and the emissions range of each emission source.

* * * * *